(12) United States Patent
Tonkovich et al.

(10) Patent No.: US 12,256,679 B2
(45) Date of Patent: Mar. 25, 2025

(54) EASY GROWING KITS FOR MICROGREENS AND OTHER PLANTS

(71) Applicant: Tonkomo, LLC, Gilbert, AZ (US)

(72) Inventors: Anna Lee Tonkovich, Gilbert, AZ (US); Eric Daymo, Gilbert, AZ (US); Bailey Daymo, Gilbert, AZ (US); Robert Daymo, Gilbert, AZ (US)

(73) Assignee: Tonkomo, LLC

( * ) Notice: Subject to any disclaimer, the term of this patent is extended or adjusted under 35 U.S.C. 154(b) by 22 days.

(21) Appl. No.: 16/950,603

(22) Filed: Nov. 17, 2020

(65) Prior Publication Data

US 2021/0345562 A1 Nov. 11, 2021

Related U.S. Application Data

(60) Provisional application No. 62/936,594, filed on Nov. 17, 2019.

(51) Int. Cl.
*A01G 24/50* (2018.01)
*A01G 13/02* (2006.01)
*A01G 24/44* (2018.01)

(52) U.S. Cl.
CPC .............. *A01G 24/44* (2018.02); *A01G 13/02* (2013.01)

(58) Field of Classification Search
CPC .... A01G 13/02; A01G 13/0268; A01G 20/20; A01G 24/44
USPC ...................................................... 47/32.3, 56
See application file for complete search history.

(56) References Cited

U.S. PATENT DOCUMENTS

| | | | |
|---|---|---|---|
| 4,292,760 A * | 10/1981 | Krave | A01G 24/48 47/84 |
| 4,299,054 A * | 11/1981 | Ware | A01G 31/02 47/84 |
| 4,319,644 A * | 3/1982 | Young | A01B 1/20 172/375 |
| 4,407,092 A * | 10/1983 | Ware | A01G 31/02 47/64 |
| 4,950,166 A | 8/1990 | Williams | |
| 5,224,295 A | 7/1993 | Izzard | |
| 6,681,521 B1 * | 1/2004 | Holloway | A01C 1/042 47/56 |
| 11,083,126 B2 * | 8/2021 | Richman | A01G 31/00 |

(Continued)

FOREIGN PATENT DOCUMENTS

| | | | | |
|---|---|---|---|---|
| CN | 109152340 A | * | 1/2019 | ............. A01G 24/44 |
| KR | 20040085832 A | * | 10/2004 | ........... H05K 5/0247 |

(Continued)

OTHER PUBLICATIONS

Merged translation of KR 101846211 B1 (Year: 2018).*

(Continued)

*Primary Examiner* — David J Parsley
*Assistant Examiner* — Danielle A Clerkley
(74) *Attorney, Agent, or Firm* — Frank Rosenberg

(57) ABSTRACT

The invention provides highly nutritious microgreens in a manner that is highly efficient and easy-to-use even for consumers who are unfamiliar with growing plants. The invention provides plant growing apparatus, plant growing systems including water and plants, plant growing kits, and methods of growing plants. The invention reduces the frequency of watering and produces microgreen yields with surprisingly little water.

16 Claims, 26 Drawing Sheets

(56) References Cited

U.S. PATENT DOCUMENTS

| | | | | |
|---|---|---|---|---|
| 2006/0185235 A1* | 8/2006 | Bono | .................... | A01C 1/044 |
| | | | | 47/56 |
| 2007/0062113 A1* | 3/2007 | Rubin | .................. | A01G 24/35 |
| | | | | 47/59 S |
| 2014/0305040 A1 | 10/2014 | Hall | | |
| 2017/0172082 A1* | 6/2017 | Weiss | .................... | A01G 31/02 |

FOREIGN PATENT DOCUMENTS

| | | | | |
|---|---|---|---|---|
| KR | 200482126 Y1 * | 12/2016 | ............ | A01G 9/023 |
| KR | 101846211 B1 * | 4/2018 | .......... | A01K 1/0107 |
| WO | 2012072273 A1 | 6/2012 | | |
| WO | WO-2015110554 A1 * | 7/2015 | ............ | A01C 1/044 |
| WO | WO-2018133903 A1 * | 7/2018 | ............... | A01C 1/02 |

OTHER PUBLICATIONS

AeroGarden—https://www.aerogarden.com/ [ Accessed Oct. 17, 2022 ].

https://homeguides.sfgate.com/can-use-promote-root-growth-75498.html [Accessed Oct. 17, 2022].

https://www.ctahr.hawaii.edu/mauisoil/c_placement.aspx [Accessed Oct. 17, 2022].

AgriLlfe. Texas A&M University: See https://cdn-ext.agnet.tamu.edu/wp-content/uploads/2017/02/fertilizing-a-garden.pdf.

Machine translation of Korean patent KR 200482126 Y1.

* cited by examiner

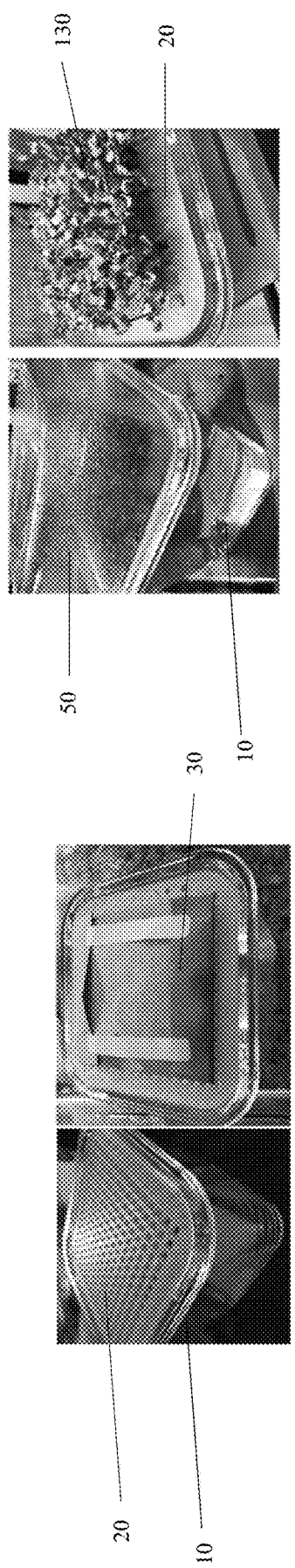

EASY GROWING KITS FOR MICROGREENS AND OTHER PLANTS

RELATED APPLICATIONS

This application claims the priority benefit of U.S. Provisional Patent Application Ser. No. 62/936,594 filed Nov. 17, 2019.

SUMMARY

Grow kits are described that simplify operation such that water is added once before germination and harvest in some cases. The user does not need to spritz, or otherwise spray seeds or add water several times per day to allow seeds to germinate, nor does the user need to remember to add water again before harvesting microgreens which may occur from about 5 to 14 days or longer after adding water. For larger plants, the user may need to increase the water level in the reservoir every 1 to 3 weeks after germination to accommodate an 8 to 26-week growing cycle. An inclusive seed mat is prepared that contains a porous grow media, nutrient, seeds, and a cover. A wrap which serves as a corral may be included to create a guide to preferentially allow water to pass through the grow media and dissolve associated salt-based nutrient into the water reservoir located underneath the grow mat. In an alternate embodiment, the grow mat is positioned in or with a holder such that water preferentially flows through rather than around the grow mat.

A unifying theme is ease for the user such that anyone can grow. Water added to the kit or system before germination is sufficient to grow plants. The seed mats include the right amount of nutrient such that the user does not need to know how, or how much, or when to add nutrient. The user has a simplified experience with seed mats that include seeds, grow media, and sufficient nutrient. The user doesn't need to remember to water every day nor buy an expensive watering system. Watering systems that include tubing, a reservoir and a pump also require special cleaning to remove biofilm or other potentially pathogenic biological agents that can build up over time. It is not uncommon to require peroxide, bleach, caustic, or other bactericides to clean the inside of tubing or containers which contain stagnant or low velocity water for long periods of time. Further the inside of confined spaces such as tubing with multiple connections may also have dead zones where unwanted biological activity can occur. The inventive grow kits can be cleaned with hot soapy water and the optional addition of a small amount of vinegar (or other cleaning materials as desired) after each use. The reservoirs may be made of glass or other robust materials which can be cleaned and sanitized in a dishwasher to make for an easy user experience.

In a first aspect, the invention provides a grow kit, comprising: a seed mat comprising a fibrous mat comprising nutrient, a cover, and seeds disposed between the cover and fibrous mat wherein a paper wrap is disposed around the fibrous mat and wherein the paper wrap is configured to be operable to create a corral for the seed mat to temporarily retain water above the seed mat when water is poured onto the seed mat; a bowl; and a mesh tray configured to be seated onto a top portion of the bowl and to hold the seed mat. Kits can be either unassembled or assembled. The invention also includes systems including the components and optionally water, plants, nutrients, temperature, light, and other components or conditions as described anywhere in the specification. The invention includes methods of making a grow kit.

The bowl can be any shape to hold water and, preferably, support the tray. In some alternate embodiments, the tray is supported by tray bales. The kit may also include tray bales, a seed spreader and/or a seed spreading frame. The corral may further incorporate a temporary or removable frame or frames that fully or partially encircle the seed pad to assist the corral to guide water through the seed pad during the seed setting process.

Optional features of the kit may include one or any combination of the following: low Ni content in the components and the plants then produced; a humidity cover; no glue in seed mat; at least 1 cm above seed mat of open space during germination; seed density per area of seed mat at least 300 $g/m^2$ or at least 400 and up to about 1500 $g/m^2$; height of reservoir at least 1 inch; nutrient is disposed on the seed mat but does not cover the seeds; water is added only during seed setting and additional water is needed to harvest. Additional optional features of the invention include any of the features described throughout this description.

In another aspect, the invention provides a kit for growing plants, comprising: a seed mat comprising seeds inside of a porous, fibrous material; a tray configured to support the seed mat; and a seed scraper having an L-shape with one shorter, larger diameter leg and a longer, smaller diameter leg. Preferably, the shorter leg of the seed scraper is in the shape of a triangular prism. Preferably, the scaper is formed entirely from plastic.

In a further aspect, the invention provides a plant growing apparatus (or kit), comprising: a seed mat comprising a fibrous mat and seeds disposed on the top of the fibrous mat; and a seed spreading frame resting on the top of the fibrous mat; wherein the seed spreading frame provides an enclosure having walls having a height of from 0.5 to 5 cm and wherein the frame is not permanently affixed to the mat so that it can be lifted off without damaging the mat; and wherein the seeds are within the walls of the enclosure.

In another aspect, the invention provides a plant growing apparatus (or kit), comprising: a top tray and a bottom tray; the top tray disposed above the bottom tray, the top tray comprising a porous bottom and (preferably nonporous) sides and a lip extending from the sides; a nonporous bottom tray disposed below the top tray comprising a nonporous bottom and nonporous sides; and at least two tray bales (preferably at least four tray bales); wherein each tray bale comprises a clasp at one end and a rest at the other end; wherein the clasp of each tray bale is attached to (or adapted to attach to) the walls of the bottom tray and the lip extending from the sides of the top tray rest in the rests of each tray bale; and wherein the tray bales hold the bottom of the top tray at least 2 cm above the bottom of the bottom tray. In some preferred embodiments, each tray bale has a u-shape or a v-shape. In use, the top tray comprises plant sprouts and the invention includes embodiments in which the apparatus includes plants.

In another aspect, the invention provides a method of growing plants, comprising: placing a seed mat onto a tray that is disposed on the top portion of a bowl; wherein the seed mat comprises a nutrient-containing, porous, fibrous mat; pouring water over seeds that are disposed on the seed mat; wherein the water passes through the seed mat into the bowl; placing a humidity cover over the seed mat and bowl; allowing the seeds to germinate and form sprouts while covered by the humidity cover; and removing the cover and exposing the sprouts to light. The invention also includes methods of growing plants using any of the apparatus described herein.

In some preferred embodiments, the methods can be further characterized by wherein the fresh weight growth is at least 200, or at least 250, or at least 300 or at least 500 or at least 1000, or in the range of 200 to 1200, or 300 to 1000 g/m$^2$/day; and/or a growth efficiency-1 which is the fresh weight (FW) growth rate in g/m$^2$/day divided by the ratio of water consumed (g) per gram of FW harvest is at least 15 or at least 20, or at least 25, or at least 50, or at least 100, or at least 200, or in the range of 15 to 400, or 20 to 300; the growth efficiency-2 is the ratio of Growth rate as defined by FW in grams/m$^2$/d divided by the Seed Weight in grams divided by the ratio of the Water weight consumed in grams per gram of Fresh weight harvested; and/or at least 2, or at least 4, or at least 5, or at least 10, or at least 20 (weight water consumed/fresh weight); a growth rate of at least 40, or at least 50, or at least 80, or at least 100, or in the range of 40 to 120, or 50 to 100 fresh weight/Seed Weight in m$^2$/day; and/or 10 or less or 8 or less or 6 or less (gram water)/(gram fresh weight). In some embodiments, the method results in at least 1 g of plants for every 15 (or 11 or 3 to 11) g of water; obtaining at least 200 g FW/m2 of seed mat geometric surface area; low Ni content in the components and the plants then produced; any previously mentioned features of kit; wherein the step of pouring pushes some nutrient out of the seed pad (typically at least about 10 wt %) and into the bottom of the reservoir where it continues to mix by diffusion into water in the bowl. The kit or method may include a seed scraper having an L-shape with one shorter, larger diameter leg and a longer, smaller diameter leg; which may be used to distribute seeds over the mat or remove seeds stuck to the capillary paper which allows their full or partial return to the seed pad.

The invention (methods, kits, apparatus or systems) may be described as possessing any of the physical characteristics described in the specification including the descriptions or examples. With reference to the examples, the invention be described either in the alternative or additionally by the results described herein within ±10%, ±20%, or ±30% of the properties (i.e., the data) as shown in the examples. For example, a (low thermal mass) system possessing ±10%, ±20%, or ±30% of the (avg) T/time slope of GP1 as shown in the figures; The invention also includes systems and methods wherein water loss over the first 40 or 50 or 60 hours (after the initial water addition) is less than or equal to 5% or less than or equal to 3%; water loss over the first 100 hours (after the initial water addition) is 7-12%; water loss over the first 150 hours (after the initial water addition) is 10-30%; water loss over the first 200 hours (after the initial water addition) is at least 50% or 50-70% (wherein the % is either the percent of the initial water or total water over 200 hours)—alternatively, the method can be described by the amount of fresh, green weight produced divided by the water consumed. In some embodiments, the fresh weight of harvest in grams divided by surface area of the mat in m2 is at least 1000 or at least 2000 or about 1000 to about 15,000. In some embodiments, the growth over at least two days is at least 200 or at least 300 or about 150 to about 2000 FW in g/m$^2$/day. In some embodiments, growth efficiency 2 is at least 1 or at least 2 or at least 5, or about 1 to about 50. In some embodiments, growth efficiency 1 is at least 10 or at least 20, or about 10 to about 400.

The invention in various aspects can be described by one or any combination of the features and/or properties mentioned above or throughout this specification. The invention is often described in conjunction with the term "comprising" but in narrower embodiments can be described using the terms "consisting essentially of" or "consisting of."

BRIEF DESCRIPTION OF THE DRAWINGS

FIG. 2 shows photos of a mesh tray seated on a bowl and a seed pad disposed on the tray.

FIG. 3 shows photos of radish seeds germinating under a glass cover and uncovered for a day.

FEATURES ARE NUMBERED AS FOLLOWS

Figure 1:
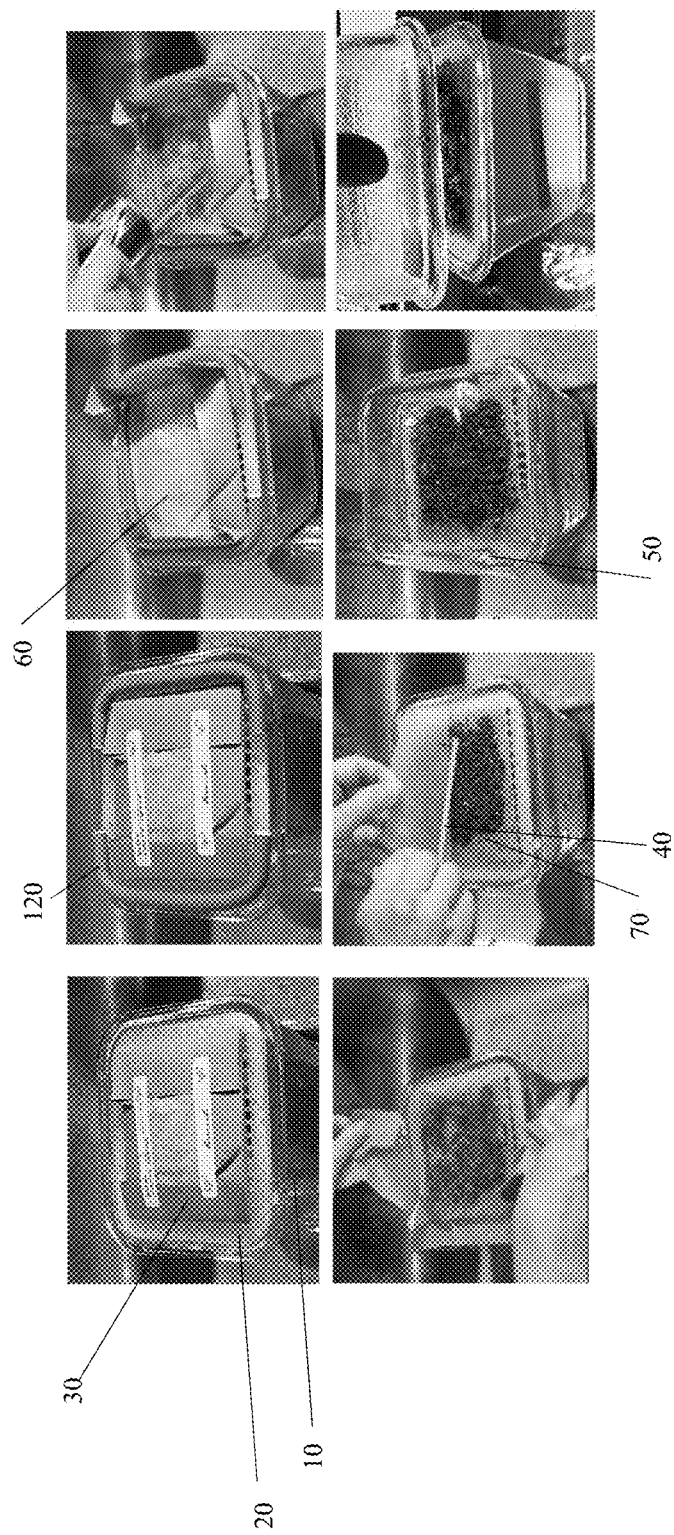
FIG. 1 is a series of eight photographs illustrating the start of the growing process.

10—bowl to hold water and nutrient
20—mesh tray
30—seed pad
40—seed scraper
50—cover for humidity dome
60—capillary paper
70—seed mat
80—seed spreading window tool
90—Tray Bales
100—standard 10×20 microgreen tray
110—guardrail tool
120—bumper
130—microgreens growing in GFY with nutrient
140—Hamama grown greens
150—microgreens growing in GFY without nutrient

DETAILED DESCRIPTION OF THE INVENTION

A seed mat or seed pad 30 includes grow mat or media, nutrient, seeds, and a cover 50 which may comprise one or more parts to retain the seeds. The cover 50 is not glued to the mat or media so that the part can be easily disassembled and cover or covers removed near the start of germination. The nutrient can be obtained from standard sources including hydroponic suppliers, such as General Hydroponics (www.generalhydroponics.com), among others. The nutrient contains Nitrogen, Phosphorous, and Potassium along with micronutrients as needed for vegetative plant growth. The seed mat or pad may be held together with a paper wrap for easy stacking, packaging, shipping, and placing in or on a mesh tray.

The seed mat 70 may comprise two stacked grow media, which are fibrous materials and they may be identical or different in composition or structure. In an alternate embodiment, two grow media are made from the same composition of matter but are disposed in different forms. Mat materials may include hemp, coco coir, jute, bamboo, biopolymer, and similar porous fibrous materials that allow roots to grow through openings to reach water and nutrient solution in a reservoir below the grow mat. The mat may or may not contain an added nutrient.

A seed mat 70 can be set on top of mesh tray which fits inside a bowl. In a preferred embodiment, the mesh tray is substantially square and fits inside a bowl with a substantially square top. The mesh tray has substantially straight pores or openings that allow for roots to grow through and away from the seed mat into the reservoir below that contains water and nutrient. The hydraulic diameter of the array of openings in the mesh tray ranges from about 1 mm to about 50 mm. A preferred range of hydraulic diameter ranges from about 2 mm to about 15 mm. A more preferred range is from about 3 mm to about 10 mm. Alternatively, the seed mat can be round and fits in a mesh pot which then may be put in either a square, rectangular or round container. The mesh tray or reservoir bowl may have rounded corners. In an alternate embodiment, the seed mat is square or otherwise odd shape that fits inside a round, square, or rectangular mesh tray.

In some embodiments, the grow mat fits inside a mesh pot which is then placed inside of a mason jar or other container or reservoir.

The mesh tray may be molded, printed using a 3D printing technology, or otherwise manufactured to allow for structural integrity while also creating a series of openings which allows roots to grow through.

The seed mat may be opened by removing one or more labels to open up the paper wrap which holds the seed mat together during transport. In one embodiment, the label is made from a "post-it note" type or other removal sticky material. In an alternate embodiment, the paper can be brown or of any color or stock/composition. The paper can be post-consumer recycled paper. The seed mat may be enclosed by a single strand of tape or paper with sticky backing which wraps around the mat and seals upon itself.

The label notes have a second use: They can be affixed to the bowls to remind the user what plants they are growing and may include handy growing instructions. The labels may have a QR code, or barcode and the like to allow the user to take a picture whereby information integrates into an app which provides the user guides on setting, uncovering, growth, timing, operation, harvesting, recipes, uses and the like.

After opening up the brown paper—it looks like a "bowl" or a corral to help retain water during the seed setting process so that water substantially flows through the seed pad, the customer will see a white (or other color) capillary (wicking) paper. In an alternate embodiment, paper towels or other porous material that wicks water but does not allow seeds to flow through or egress the seed pad during transport may be used. The form of the brown (or any color) paper—acts like a small bowl or corral when opened before setting seeds—helping to force the water through the seed pad such that it wets the seeds and helps to dissolve the nutrient contained therein. The nutrient, as it dissolves, flows into the reservoir below the mesh tray or mesh pot. The paper corral may be supported with temporary or removable frame or frames also called a bumper 120 or bumpers to assist with keeping the corral or paper bowl upright as water is added during seed setting.

In some embodiments, the seed mat is placed inside the mesh container in a manner that it creates a bowl-like structure to facilitate water flowing substantially through the mat not around it to the reservoir below.

In some embodiments, the user places a second tray with a mesh opening over the opened seed mat to help disperse water as it is poured over the seeds. The second tray also prevents the seeds from spilling off the seed tray during the application of water. The second tray is removed after water addition is complete. In some embodiments, the user may fill up a portion of the reservoir with water, from 1 to 90%, before pouring water over the seed pad such that the seeds are wetted to start germination and the nutrient contained within the seed mat dissolves and flows into the reservoir beneath the tray. In some cases, the user may find it easier to add from 20 to 60% of the water in the reservoir bowl first, then pour water over the seed pad to start the germination process.

Water is poured over the capillary paper—which acts to wick water to help fully wet the grow mat and in turn assist in wetting the seeds contained underneath. In an alternate embodiment, the top cover which may be a capillary paper is removed prior to adding water. It is understood that some seeds may stick to the capillary paper and by removing the capillary paper prior to adding water avoids a step of returning seeds from the paper to the seed mat. In an alternate embodiment, the capillary or other paper that is contained within the seed pad, is removed after the seed pad sits on the first mesh tray. A second mesh tray is placed over the seed area which acts to diffuse or reduce the intensity of water as its poured, especially as poured directly from a faucet. The second mesh tray helps to keep the seeds from pushing off the seed pad, especially as the system becomes wetted. Water is added to the bottom of the first mesh tray or until water overflows the system. After water is added, the second mesh tray is removed and stored for future use. The user may optionally choose to use the seed scraper to adjust the seeds, in the event that they have substantially moved around the seed pad during the water pouring process.

The mesh tray sits inside a reservoir which acts to collect the water as its poured in the system. The height of the reservoir is at least 25 mm and in a range from 25 to 400 mm. The preferable range of reservoir height is from 50 to 200 mm. The height allows for a sufficient water volume to be retained throughout the growth process such that the user only need add water when starting germination before harvesting the edible crop.

Water is added until it reaches the first corner of the bottom of the tray. This may create a small air gap beneath the seed mat and a small air gap above the seed mat. In an alternate embodiment, the water level stops below the tray or a mesh pot such that the roots grow into the water. Optionally, a fill line may be marked on the bowl or mesh tray or pot to denote the appropriate initial water level. In an alternate embodiment, the tray is sized to sit inside the bowl such that the water is added from a faucet or other means of water addition until it fills the bowl, stops slightly below the mesh tray, stops at the bottom or top of the mesh tray, or overflows the bowl. In this embodiment, the mesh tray is designed to fit inside the bowl such that the seed pad remains wetted but is slightly higher than the top of the bowl so that the seeds are not overwatered or sit in standing water even if the bowl overflows during setting.

The capillary paper, if it remains during the addition of water, is removed after water is added to allow oxygen (in air) to reach the seeds in order to start the germination process. In the event that some seeds have stuck to the white capillary paper, then an included tool "seed scraper" is included comprising a "knife-edge" like corner to facilitate scraping of stuck seeds from the capillary paper to push them back to the grow media. The seed scraper also contains a thicker handle to make it easier for the user to hold while scraping seeds back on top of the seed mat.

If the seed mat is not fully wetted, the customer can use the thick end of the seed scraper to push down slightly on the mesh tray, which may have some flexural capability so that water can wick up from the reservoir, in order to more fully wet the seed pad media before germination.

The brown paper is removed, and this is accomplished most easily by ripping in the middle and pulling around both sides. The brown paper has an open section in the bottom (back side and substantially center region of the seed pad) to make the paper easier to remove and still allow growth in the event the user forgets to remove the brown paper. The brown paper wrap can be pre-cut at one location to make it easy for the user to remove after the water is poured. In an alternate embodiment, there is no exterior wrap or brown paper and the user pours water directly over the grow mat which is contained within a mesh tray.

After the water is added and seeds exposed, then a cover (wax-infused cloth, or other soft or hard cover) is placed on the top of the bowl to mostly seal in humidity during germination. The cover (also called a humidity cloth or humidity dome) is held in place with clips at the corner, a rubber band around the edge, or other reasonable method. The cover is preferably hydrophobic to ensure that it does not capture water from the seeds. In one embodiment a cover is placed on top of the bowl without additional sealing methods other than gravity to hold in place. The cover can be a second and inverted bowl, which may be glass or plastic or other suitable material, that sits on top of the first glass bowl to create high humidity during germination and allow sufficient room for seeds to grow substantially unimpeded except for other seeds during germination.

The height of the open region above the seeds during germination is preferentially at least 5 mm and more preferentially from about 10 mm to 300 mm. A most preferred range is from about 15 mm to about 100 mm.

After a preset number of days—around 3 for most seeds, the humidity cloth or cover or dome is removed, and the germinated seeds are then exposed to light. It is recognized that the cover used during germination may allow some light to reach the seeds or it may be substantially transparent to allow light during germination. The number of days with the humidity cover may range from 1 to about 7 depending on how quickly the seeds germinate. Some seeds germinate very quickly, such as radish, while others take much longer, such as cilantro.

The cover also acts to slow down or substantially stop water loss during germination. Data collected show that less than 5% of the starting water is lost during 3 days of germination which allows for sufficient water to be retained in the reservoir during the green growth phase. More preferably, less than 2% of the starting water is lost during the covered phase of germination and in one embodiment from about 0.01% to 2% of the starting water is lost during the covered germination step. As roots grow in the water contained in the reservoir, they pull water into the plant and some water is lost due to transpiration and evaporation after the cover is removed.

The system is designed with the mesh tray to substantially cover most of the open face of the reservoir to reduce evaporation loss such that the starting water in the reservoir is sufficient for the entire growth cycle for microgreens from 6 to 14 days and sufficient for at least the first 14 days of growth for the larger plants.

Microgreens can be grown on the countertop with ambient light, but they will be spindly (long stems and small tops) without the addition of natural light (sunny window or outside) or artificial light (fluorescent or LED). The microgreens preferably have sufficient water in the reservoir bowl for the entirety of the growth cycle (6 to 14 days or more). If the plants are not consumed or only partially consumed, then additional water can be added such as adding to one corner or on the top of the grow media, and the plants will continue to live and grow.

Nutrient:

Nutrient isn't required to grow microgreens, but the plants remain small without the addition of nutrient. Nutrient allows the microgreens to grow faster and become larger. Nutrient is desired to grow baby greens and mature plants. Adding nutrient at very high concentration directly to the seeds may act to inhibit or slow down germination, and the plants when germinated grow short, small roots. Without nutrient or with lower concentration of nutrient, roots grow in search of food. In general, longer and stronger roots lead to healthier and larger plants. For microgreens, the roots should be sufficient to support high growth rates and harvest yields but no larger. It is desired to maximize the growth rate in grams of fresh weight (harvest) per $m^2$ of growing area per day while minimizing the ratio of root weight to fresh weight. It is desired to put as much plant energy into growing using and edible harvest greens but recognized that sufficient roots are required to do so.

In some embodiments, nutrient is placed between two layers of growing media such that the layer consists of the following: a first growing media which is porous to allow roots to grow through and oxygen to diffuse therein, but not so porous to allow granular nutrient to fall through the grow media. Nutrient can be added (sprinkled in one embodiment) on top of the first growing media either on the side of the pad such that is substantially separated from the seeds, in the middle or in any configuration. For some seeds it may be advantageous or otherwise not limiting to add nutrient directly to the seeds. A second growing media can be placed on top of the first growing media such that the nutrient is sandwiched between.

Seeds can be placed on top of the second growing media or on top of the first growing media if only one media is used. Seeds always face the open top when germination starts such that they are allowed sufficient oxygen and room to grow when water is added to start germination. A capillary paper which retains the seeds and nutrient in the seed pad may be placed on top of the seeds. Alternatively, a different type of paper may be used during assembly to cover the nutrient and seeds in the seed pad to avoid substantial loss of material during transport. The layers can be sealed with the use of a paper wrap that is opened before use to create a small bowl or water guide to substantially force most of the water (more than 30%) through the grow media to activate the seeds and dissolve the nutrient into the reservoir beneath the seed mat. In an alternate embodiment, nutrient is placed on one or more sides or half of the grow mat such that it is in part or whole away from the seeds. In some embodiments, nutrient is placed on top of the capillary paper such as in a fold which is then covered with a second piece of capillary paper or a fold-over from a single piece of capillary paper.

It is preferred to have granular nutrient covered such that when the grow mat is sealed, the nutrient is substantially contained therein and does not fall out. The user will not see the loose nutrient when moving the seed mat nor will the nutrient be substantially lost in packaging or during transport. Alternatively, the user can place the nutrient directly into the bowl and is mixed as water added to start the germination process.

The seed mat includes granular nutrient that is preferentially placed on one or more sides of the grow media (fiber sheet) and adjacent to the seeds. The white (or any color) capillary paper covers the seeds and the nutrient. When water is added to start the germination process it also dissolves the nutrient (present in a salt form) and it drips into the reservoir below In an alternate embodiment, a liquid nutrient can be used and is applied to the seed mat first and allowed to dry. The salt nutrient is affixed (dried) to the seed mat and dissolves into the water. Some nutrient may fall on some seeds, but most nutrient flows with the addition of water into the reservoir underneath the mesh tray and seed mat, such that when the roots grow into the reservoir containing water, they find sufficient nutrient below the seed mat.

The seed mats may be made from hemp fibers (www.terrafibre.ca) that were tested as below the detectability limit for heavy metals (Arsenic, Cadmium, Lead, Mercury) and further tested to be below the detection limits for Nickel, less than 100 ppb. A heavy-metal free nutrient can also be used for growing plants, such that those with severe allergies (such as a Nickel allergy) can eat fresh produce without getting an allergic reaction. The greens produced with these kits did not produce any allergic reactions with a tester who has a severe Nickel allergy.

Pictures of one example of the seed setting process are shown in FIG. 1. In an alternate method, a hydrophobic wrap can create a high humidity zone to facilitate germination and reduce lost water to evaporation. As shown in FIG. 1 from left to right on the first row, a seed pad 30 is placed on a mesh tray 20 which is placed inside a bowl 10 that holds water and nutrient. A bumper 120 is placed around the seed pad during the setting process to create a corral when the brown paper is opened and fully exposing the capillary paper 60. Water is added as from a faucet or any other method and is poured over the seed pad 30 and collected in the bowl 10. As shown in the second row of pictures from left to right, after the water is poured over the seed pad 30 and substantially fills the bowl 10, then the brown paper is torn away to fully expose the wetted capillary paper 60. A seed scraper 40 can be used to remove any seeds retained on the capillary paper and push them back on the seed mat 70. A humidity dome 50 is shown as an inverted glass bowl that sits on top of the bowl 10 to reduce most water loss due to evaporation and create a high humidity zone for ease of seed germination. The final picture as shown is removing the humidity dome 50 after 3 days when the seeds have germinated.

In an alternate seed setting process, the seed mat is placed on top of a mesh tray sitting inside a reservoir. The mesh tray is a single height in one embodiment and may be two or more heights in an alternate embodiment. After opening the outer paper, the inner capillary paper is optionally removed, and a second optional mesh tray may be placed on top. The second mesh tray acts to disperse water as it's poured over the seed pad. In an alternate embodiment, the capillary paper remains over the seeds as water is poured over the seed pad. Water may be added from a faucet, watering can, or another suitable device while the reservoir (e.g., a bowl) is sitting on a surface, like at the bottom of a sink. Water is added until it nears (within 1 cm below), reaches, or fills the mesh tray or overflows the bowl. In this embodiment, the mesh tray is designed such that water will overflow (e.g., into the sink) rather than overwater the seed mat. The mesh tray includes a central mesh region through which water flows during setting and roots grow through to reach the reservoir of water and nutrient. The mesh tray has an outer solid region to reduce the open surface area for water evaporation and to fit within the bowl. In one embodiment, the mesh tray includes a series of holes where some or all are smaller than the primary or central mesh region. The smaller holes allow for capillary rise which occurs faster in small dimensions. In one inventive embodiment, the side holes act as an indicator where the water rises and emerges from the holes during the filling process when the water level reaches the bottom of the tray. This creates an indicator for the user to know when to stop adding water. The system is designed in this embodiment such that even if the user forgets to stop or misses the indicator, the bowl will overflow (preferably in the sink) rather than drench or drown the seeds contained on top of the grow mat which sits atop the mesh tray.

As shown in FIG. 2, the openings of one inventive mesh tray 20 are roughly 5 mm×5 mm. The three side holes are nominally 3, 4, and 5 mm in diameter. Other dimension features may also be used, including a protruding feature with a central hole containing a hydraulic diameter less than the mesh opening to make it easier for the user to identify when the water level in the bowl 10 has reached the bottom of the mesh tray 20. Capillary action will allow the liquid to rise up the hole and will do so at a faster rate for a smaller diameter relative to the mesh opening. The distance from the end of the mesh section to the edge of the tray is 12 mm although this distance can be more or less as needed so that the mesh tray fits inside a reservoir bowl and the mesh region is substantially open beneath the seed pad. The mesh region covers at least 50% of the seed pad surface area and preferably 70 to 120%, and more preferably from about 90 to 110%.

As shown in FIG. 3, the humidity dome 50 covers the bowl 10 to maintain sufficient humidity for germination and in the right most picture, the germinated radish seeds 130 are growing on the seed mat 70 placed on top of the mesh tray 20 and ready for additional light.

Tools

A series of tools are preferentially used to assemble the seed pads. This list is not exhaustive but gives examples of assembly methods.

Figure 4:
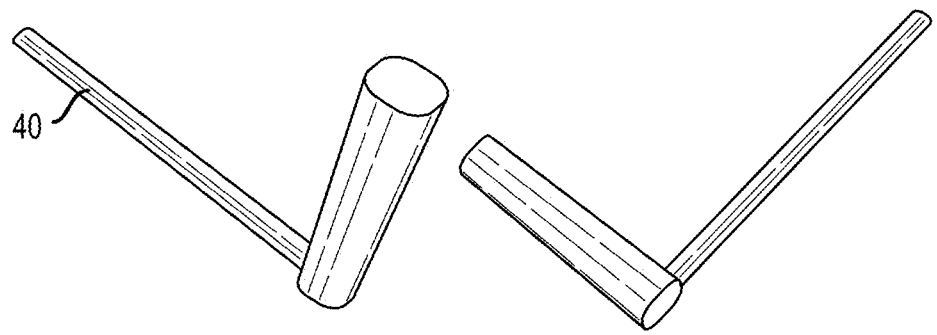
FIG. 4 shows a seed scraper tool.

Seed scraper tool: simple handheld tool 40 with a knife-edge extension to easily scrape any seeds that remain stuck to the capillary paper after adding water. See FIG. 4. This tool can also be used to help lift the mesh tray after or before use by inserting inside of a mesh opening and using as a lever tool. The tool as shown is manufactured using 3D printing of PLA but could also be made by molding or other manufacturing methods.

Figure 5:
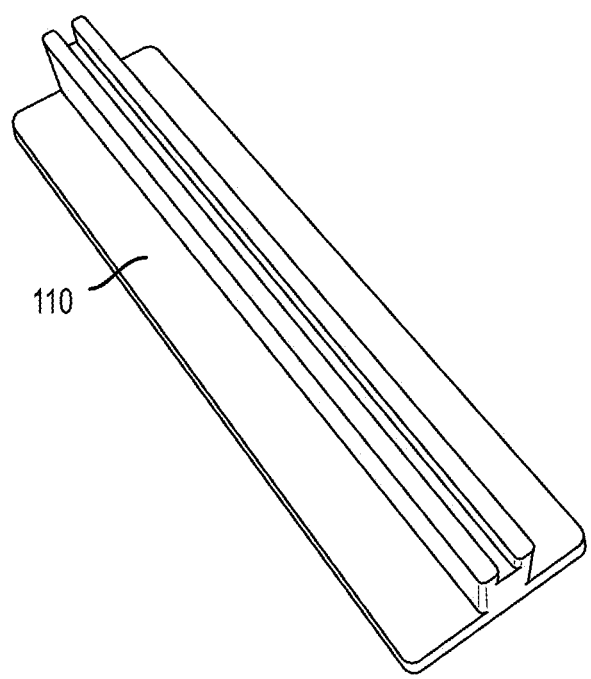
FIG. 5 shows a nutrient addition guardrail tool.

Nutrient addition guardrail tool: nutrient is quickly added to the side of the seed mat using the guardrail 110. The tool has a hand hold on the back side to limit exposure to the nutrient solution while keeping a flat edge that substantially runs the length of the seed pad (more than 50%) such that the nutrient can be placed. The nutrient is added using measuring tools that tap against the side of the guard rail. It takes about 1 to 5 seconds to apply the nutrient to the seed pad in the desired location—along one or more sides of the seed pad as shown in FIG. 5.

Figure 6:
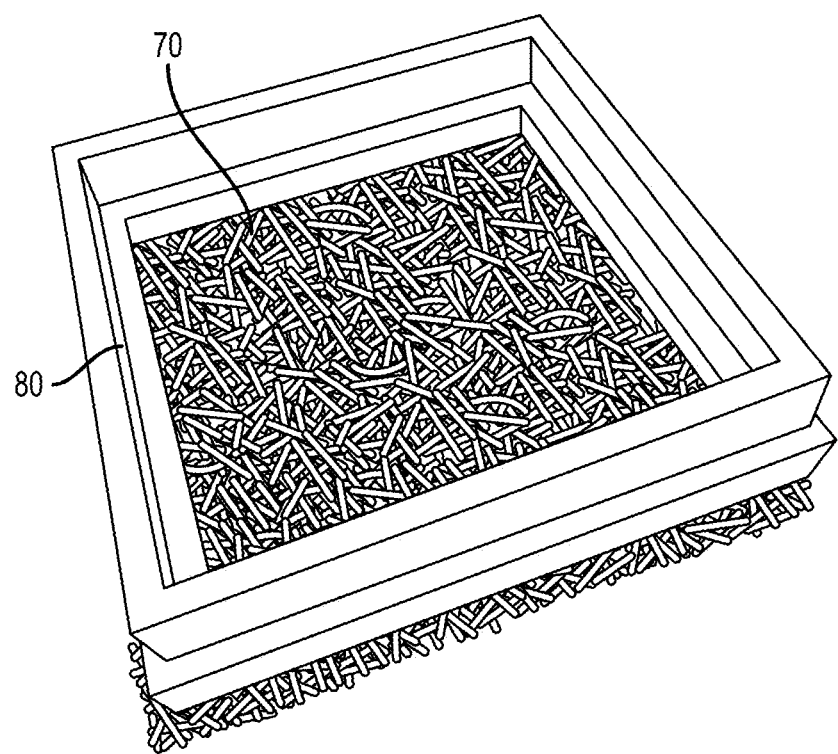
FIG. 6 shows a seed spreading tool.

Seed Spreading window tool: A window frame type tool 80 is placed over the seed mat 70 to create the window to easily add seeds. Seeds are scooped using a measuring tool (e.g., an appropriately sized measuring spoon) and sprinkled inside the window tool on top of the seed mat 70. This easy method of seed application takes around 1 to 5 seconds to complete. Alternatively, this tool can be used as a guide to sprinkle nutrient in the seed area either at one or more sides or on top of the seeds. See FIG. 6. As shown, the seed spreading tool has an outer dimension of about 100 mm and is sitting atop a 100 mm×100 mm hemp mat. The inner side dimension is about 80 mm. It is recognized that smaller or larger seed spreading tools could be made so as to assure that seeds when poured or sprinkled stay on top of the seed mat.

Figure 7:
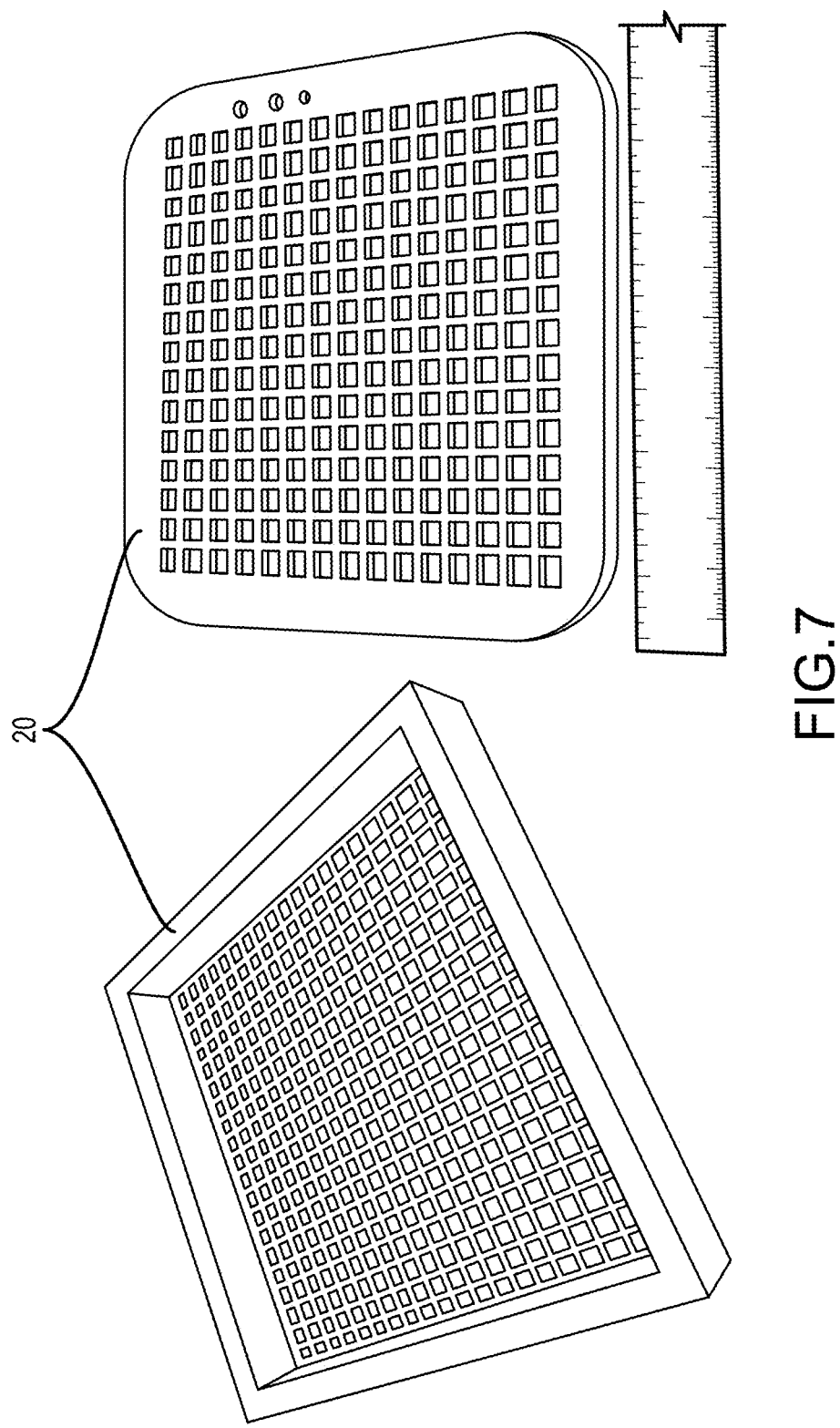
FIG. 7 shows a mesh tray used to hold the seed pad.

Mesh Tray: A mesh tray 20 as shown in FIG. 7 consists of a mesh bottom such that it retains the seed pad but allows roots to easily grow through. The edge of the seed tray is of sufficient height such that an air pocket can be maintained when covered with the wrap during germination. Alternate mesh trays may be uniform in height across the tray (including at the edges) and rely on other means to create an air pocket above the seeds during germination—as seen in a picture of an inverted second bowl on top of the first reservoir bowl to create a humidity dome. The mesh tray 20 sits inside a reservoir such that a height is maintained in the reservoir for sufficient water to last during the germination and growth process. Alternatively, the mesh tray may be two or more heights such that the seed pad when in use sits above the water level in the bowl to maintain an air pocket during germination and growth.

In some preferred embodiments, the invention comprises one or any combination of the following features:
- Seed mat includes seed, nutrient, cover paper, and grow media
- Most or all parts of the seed mat are compostable
- The used seed mats including roots and short stems below the cut point after harvesting have been composted and the produced soil can be re-used to grow other plants.
- There is no glue or adhesive used on the grow mat to hold the seed, nutrient, wicking paper, and grow media together
    - In an alternate embodiment, a sticky paper wraps around the grow mat to seal upon itself to hold the contents of the grow mat together. The sticky tape does not hold or stick well to the fibrous grow media and a compression seal of a rolled or folded grow mat holds the parts together.
- Seed mat is held together for packaging and transport with removable tape (other embodiments used an origami type fold of the brown paper to hold it together, which in turn required no adhesives to seal the seed pad).
- Removable tape seals the brown paper to itself. Optionally, it might overlap (but not stick to) the white capillary paper, and the tape does not touch the grow media or seeds.
- Water may be only added once when setting the seeds before the prescribed harvest date for microgreens and baby greens
- The system is designed to germinate and grow microgreens indoors where the humidity and temperature are controlled. The range of temperature may be from 60 F to 90 F. The range of room humidity may be from 5 to 85%, with a range of about 20 to 40% typical. It is understood that the humidity under the humidity dome may range from 50 to about 100%. In a preferred embodiment, the humidity ranges from about 70 to about 95% inside the dome when the cover is on and germination occurs. The time that seeds experience this high humidity is relatively short, from 1 to about 5 days.
- The system may be used to grow microgreens outside. In a preferred embodiment, the greens are germinated inside. After the cover is removed, the germinated bowl can be kept inside for additional days if so desired and then moved outside to continue growing under natural light. The germinated bowl may be moved outside directly after germination when the cover is removed. The outdoor humidity may range from about 5 to about 100% (raining). Alternatively, germination and or growth may also occur outside or in a greenhouse.

The user may need to add water more frequently if growing outside depending on local temperature and humidity.

In one example, a bowl of microgreens at 5 cm height was taken outside and grown in a partially shaded spot for an additional 10 days where the temperature exceeded 100 F each day with temperatures exceeding 110 F on some days. Water was added to the reservoir daily as the water level dropped, but the plants continued to grow. The additional water loss due to evaporation and transpiration acted like an evaporative cooler to keep the plant foliage temperature below the ambient air temperature.

Water can be added only once to germinate seeds and grow to maturity for microgreens Water is added at germination and additional water is necessary to add for baby greens or mature plants when the water level drops in the reservoir. Water can be added more frequently so as to maintain a more constant water level. Water can be added when the level is within 1-2 cm of the bottom of the reservoir. Water can be added when the water is essentially gone from the reservoir (e.g. no discernable water line in the bowl). Water can be added after the water is evaporated and transpired from the reservoir and the plants have drooped due to water loss. If water is added within a day of plant drooping (a great visual clue for a busy user), then the plants will pull in water and revive for continued growth or harvest.

Low water usage (g water consumed per g fresh weight at harvest) is a result of the inventive process High seed density (g/m2) before germination with corresponding high growth rates as measured by the ratio of FW (fresh weight) to SW (seed weight)

High fresh weight harvest density (g/m2) after the growth cycle

High fresh weight harvest density growth rate as measured in FW g/m2/day

Remaining nutrient water in the bowl reservoir can be re-used on other plants (inside or outside)

Some seed pads can be harvested multiple times (for example, basil and romaine regrow after cutting, while others do not)

Some seed pads can be replanted in soil after harvest to regrow into mature plants (e.g., radish, romaine). The used/harvested radish grew into mature vegetables which was unexpected. It is theorized that there were a few seeds which did not germinate initially, and then did so after planting in soil.

The 3D printed mesh tray that the seed mat sits upon may be compostable (printed in bio-PLA) and reusable (as washed in hot soapy water with optional vinegar or other cleaning media). Alternatively, other materials of construction may be used for the mesh tray.

The 3D printed tray that the seed mat sits upon is designed to maintain an air pocket above the seeds, to ensure seeds have oxygen in order to germinate.

The preferred height of the tray above the seed mat is at least 2 mm with 5 to 10 mm or more preferred.

In an alternate embodiment, the mesh tray is flat and the air pocket for germination is achieved by the use of a second bowl or cover used for a humidity dome. In all cases, the humidity dome cover does not touch the germinating seeds when wetted and set.

The humidity dome is comprised of a piece of cloth coated with a hydrophobic (e.g., bees wax or soy wax or other hydrophobic food grade wax) material, and this humidity dome can be reused many times (and ultimately composted when too worn for continued use).

In an alternate embodiment, the humidity dome is solid such as a glass, plastic, or metal bowl that is inverted and placed on top of the first bowl. This makes it easy for the user to set up the system, observe the seeds during germination if translucent, and know when to move into the second step (i.e., the growth phase after removing the cover and adding light). In one preferred embodiment, the second inverted bowl that serves as a humidity dome during germination, is then placed underneath the first bowl to reduce the distance from the germinated seeds to the light source. This allows for a higher light intensity to boost plant growth. The same part may serve multiple functions.

In an alternate embodiment the second and smaller bowl that inverts as a cover and humidity dome for the larger bowl during the germination stage may also be used to grow microgreens. In this case, the mesh tray that fits inside the taller bowl also fits inside the smaller bowl. Some small microgreens, like celery, may preferentially work when grown in the smaller bowl. The parts are interchangeable such that either the smaller or taller bowl may serve as the reservoir during the growth process or as the humidity dome during germination.

Wicking paper keeps seeds from dispersing when water is applied. However, the wicking paper is removable because without removal it can hold water in place (and drown the seeds by preventing sufficient oxygen during germination).

In an alternate embodiment, the capillary paper can remain on the seeds for 8 to 48 hours which acts a seed soak stage for difficult to germinate seeds such as beets, cilantro, and peas. In this case, the capillary paper would be removed after a present time and optionally the humidity dome replaced on top of the seeds that have an effective pre-soak time.

In an alternate embodiment, the capillary or wicking paper or top cover paper on the seed pad is removed before water is added.

By vacuum sealing the seed mats, including a stack of seed mats, the seeds and nutrient become effectively fixed in place, allowing shipping of the seed mats without disturbing the distribution of seeds or nutrient.

Further, vacuum sealing the seed mats helps to more tightly compress the fibrous material and seeds such that when setting, the pad and seeds are more easily wetted and as a result fewer seeds that stick to the capillary paper. Any seeds that stick to the capillary paper can be placed back on top of the seed mat.

Also, by vacuum sealing the seed mats, the grow kits become an effective emergency food source when fresh greens might otherwise be unavailable. The seed mats are anticipated to last and seeds remain viable for at least two years if not longer.

Emergency food kits are facilitated by germinating inside (where light is not needed during the germination stage) and then moved outside to grow in natural light. Water sources include tap, treated or filtered water can be used to grow fresh microgreens in an emergency situation. The low water consumption and fast growth to harvest makes the grow kits advantageous for emergency or disaster food sources. Further, the use of natural light for growth, could allow for off-grid or no-power operation and situations.

The seed mats offer important advantages for reducing contaminants and allergens. The seed mats are designed for no to very low to non-detectible heavy metals including Nickel, suitable for growing greens for those with Nickel or other heavy metal allergies.

Grow bowls are clear, translucent, or transparent (e.g., glass as one example) so that the water level and general health of the roots can be visualized (both during filling and during growth to ensure the water level is satisfactory, particularly after the target growth period is passed and water may need to be added).

Non-clear or non-glass bowls or reservoirs may also be used.

During the manufacturing process, a picture-frame like tooling is used to keep the seeds within substantially the center of the grow mat. It is also possible to seed using a template with grooves or mesh openings to spread the seeds out, eliminating the need to use a tool or spread the seeds over the mat during the manufacturing assembly steps.

Another desirable feature of the GFY (Grow Feed Yourself) kit is pushing or flowing water through a seed pad which contains nutrient to start germination in a manner that minimizes nutrient near the seeds for germination and maximizes nutrient in the reservoir beneath the seed pad to feed growing roots. The nutrient may be placed on (e.g., in granular form) or within the pad (e.g., as evaporated liquid nutrient) and may be placed anywhere on the seed pad. The push or flow through method of water through the seed pad to start germination has advantages over any method of applying nutrient to other systems and is a unique hydroponic growing method.

In the GFY method, water dissolves solid nutrient as the water flows or is pushed through the porous seed pad and tray. Since nutrient laden water has a higher density than water only (e.g., saltwater, as an example has a specific gravity of ~1.02 g/mL at room temperature), it is pushed towards the bottom of the bowl and easily falls with gravity.

A visualization experiment was done using a brown nutrient solution. In the first few days (as would occur during germination) the concentration of nutrient (as seen through the glass bowl) as was readily visible as darker near the bottom of the glass bowl for a brown-tinted nutrient salt solution. Some nutrient remains undissolved on the side of the seed pad after pouring water through the seed pad. After about three to five days, nutrient salts are well diffused and mixed throughout the bowl, consistent with the approximate time for diffusion in stagnant liquid plus additional time for remaining nutrient on the side of the seeds to dissolve and flow into the bowl.

Some concentration of nutrient near the seeds or seed pad will occur during germination and that some nutrient solution may reach the seeds. It is understood that the amount of nutrient applied to the seed pad for the bowl reservoir is sufficient to last through the entire growth cycle and that this larger amount of nutrient is locally reduced in part or whole near the seeds during germination by pushing the nutrient away from the seeds when germination starts with the inventive water pouring seed setting method.

A very high salt or nutrient concentration on seeds during germination is not preferred for most seeds and can act to delay or stunt germination if the electrical conductivity (EC) or local salinity is too high. The nutrient solution partially mixes due to the low energy of pushing the water through the seed pad. Pouring water from a height as an example of about 4 inches adds about 0.5-J of potential energy for mixing. As visualized, when the dripping nutrient solution hits the bottom of the bowl it bounces back a bit while the rest of the water continues to drain through the seed pad. From visualization experiments, a darker brown color of nutrient was visible at the bottom of the bowl set with the inventive method which then dissipated over about 3 days as the concentration equalized due to diffusion.

In contrast, if nutrient is applied to a GFY seed pad that contains dried salt nutrient, which is then wetted using the same method used for the Hamama (commercially available hydroponic grow kit) seed quilt (the bowl is filled with water before the pad is placed into the reservoir and pressed into stagnant water), the nutrient filled the bowl more evenly, as visualized by a uniform and darker color of the nutrient water in glass bowl. Since the color of the water is proportional to the nutrient concentration (darker=more nutrient), in the Hamama approach of wetting a nutrient laden seed pad there is more nutrient near the seeds during the germination period (i.e., the first few days). As the salt dissolves in the stagnant Hamama-like press-in method of seed wetting system, the heavier nutrient-laden solution dissolves and stays closer to the seeds. A uniform brown color is immediately seen in the bowl during this experiment with a press-in versus the pour-through method of water addition. Thus, this experiment surprisingly resulted in a more uniform brown solution (higher nutrient concentration) with the press-in method of wetting the seed pad than for the flow or push-through inventive method described herein. The flow or push through inventive method resulted a darker concentration region localized near the bottom of the bowl, and this darker concentration region dissipated over about 3 days. Not to be bound by theory, but it is theorized that the inventive method of seed setting allows for sufficient nutrient for the entire growth cycle without this high nutrient concentration adversely affecting seeds during germination.

The mass diffusivity of salt in water is estimated to range from about $10^{-5}$ to $2 \times 10^{-5}$ cm$^2$/s (https://apps.dtic.mil/dtic/tr/fulltext/u2/613610.pdf). Using even the most optimistic value of diffusivity of $2 \times 10^{-5}$ cm$^2$/s, the time to mix by diffusion alone is about 5 days for a 3 cm diffusion distance (the estimated distance between the darker brown solution at the bottom of the bowl and the seed pad). Diffusion will certainly help mixing, but it is theorized that additional force or forces help to mix the nutrient solution. For example, the local temperature fluctuates between day and night by a few degrees. As temperature increases, density decreases and in a fixed volume this change in density can create local convective cells to enhance fluid mixing.

It is known for conventional (soil) crops that fertilizer can be applied before planting seeds, and it is often recommended that fertilizer be applied about 3-4 inches beneath the soil in order to have nutrient available to for roots to grow into, without allowing for the roots to be immediately exposed to too high of nutrient levels. It is also generally known that high salinity is not good for plant germination and growth, where plants generally do not grow well in brine or high salinity soils. Nutrient solutions are salt based and high concentration leads to poor growth outcomes.

While the response to nutrient during germination depends on the plant, it is widely recognized that placing the nutrient somewhat away from the germination location allows for healthy root growth, since the roots will grow in search of nutrient. The GFY approach uniquely adds nutrient substantially away from seeds in some embodiments, and by nature of water flowing through the nutrient on the seed pad, forces nutrient away from the germinating seeds during the critical first few days of growth. It is recognized that some seeds will not have an adverse reaction to the nutrient placed on top or underneath the seeds in the seed pad and that this nutrient is then dissolved and pushed into the reservoir as water is poured to start the germination process.

It is also noted that for some seeds, the nutrient can be added or sprinkled to the top or bottom of the seeds but that the act of pushing the water through the seed pad acts to pull some or much of the nutrient away from the seeds during germination. Some seeds will be more tolerant than others with respect to the location of nutrient.

Figure 9:
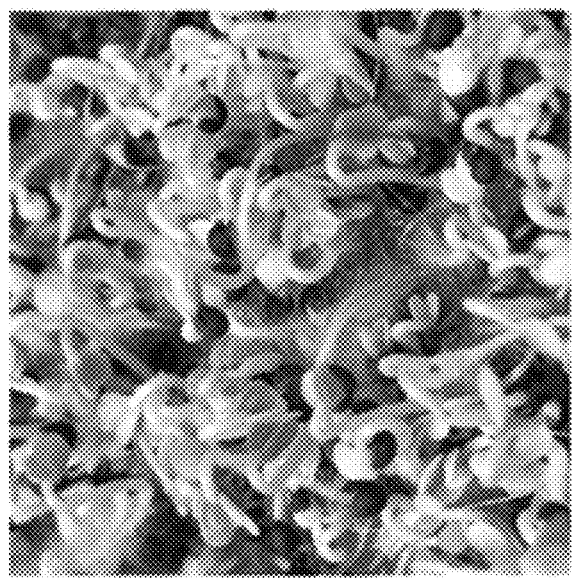
FIG. 9 shows seed germination after 3 days with nutrient using the flow through method
Figure 8:
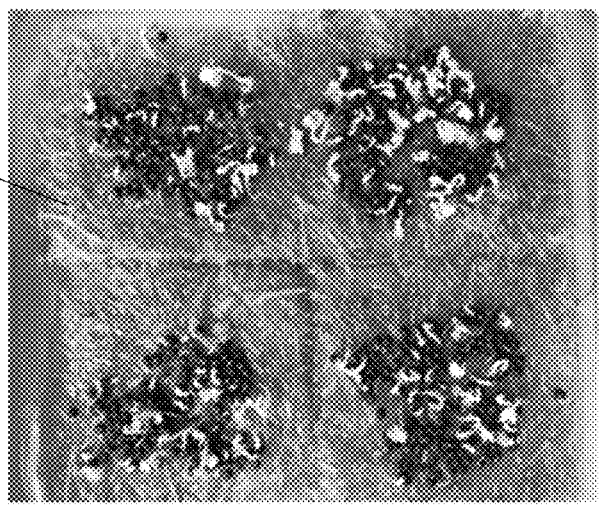
FIG. 8 shows seed germination after 3 days with nutrient using the press in method

After 3 days, germination of seeds sitting on a seed mat 70 was poor with the press-in method as shown in FIG. 8, whereas germination with the same Kale seeds is excellent with the flow through GFY method as seen in FIG. 9.

An experiment was done using a seed density of 3 grams per 100 $cm^2$ fiber mat with the press-in (not flow through) method of applying water in the top photo of 4 quadrants. Nutrient (about 0.9 grams) was added to the top of the seeds in two of the four 5-cm by 5-cm pads as shown, a higher 1.8 grams to one quadrant, and no nutrient was added to the fourth (upper left quadrant). Water samples were pulled to check for EC and the salt had diffused throughout the bowl after 3 days, including the intended control. With a high local nutrient concentration due to unintended mixing, even the control had poor germination. The flow-through test as shown also added 0.9 grams of nutrient to the seed pad with the same seed density which dissolved and fell into the reservoir resulting in good germination and growth. It is theorized that there are additional mixing forces that enhance diffusion of nutrient solution in a container. A high stagnant nutrient solution concentration may not be good for effective germination and growth even if diffusion can disperse the nutrient over the course of a few days.

REFERENCES

"If you want to encourage roots development without forcing flowering and fruiting, apply phosphorus and potassium before planting. Work the fertilizer several inches into the soil where developing roots will be able to reach them. Whenever you apply phosphorus and potassium later, after the first growths appear, the nutrients will stimulate the growth of flower and fruits as well." https://homeguides.sfgate.com/can-use-promote-root-growth-75498.html https://www.ctahr.hawaii.edu/mauisoil/cplacement.aspx https://cdn-ext.agnet.tamu.edu/wp-content/uploads/2017/02/fertilizing-a-garden.pdf The benefits of pushing for pouring water through the seed pad with nutrient applied is evaluated in Example 2. Minimizing constraints as seeds germinate and roots grow accelerates growth rate and plant size, thereby increasing the harvest fresh weight of greens. Constraints include limited space on top of the wetted seeds during the first few days of germination, either insufficient or too much nutrient on the seeds during germination and subsequent growth and running out of water during growth. All of these constraints stress the plants and slow down growth.

The inventive GFY system creates an air pocket of about at least 5 mm above the seeds or alternatively of about 2 or more seed diameters during germination such that seeds can expand or grow more freely during the first two to three days of germination. The inventive GFY system creates a less constrained space for roots to grow down during germination. The seed density does not exceed an average monolayer thickness on the seed pad when dry although it is understood that some seeds may be stuck together when wetted and may be two or three or more seeds high on top of the seed pad during germination in local areas. In such cases where seeds are stuck together in the vertical direction, there is correspondingly additional vacant lateral space on the seed pad for roots to grow down with gravity into the reservoir below the seed pad, because these vertically stacked seeds are no longer fully or partially touching the seed pad. The seed pad sits on top of a mesh tray through which roots may grow. Once the roots grow through the mesh tray they grow into the nutrient laden solution and continue to grow unabated until they reach the bottom of the bowl. When reaching the bottom of the bowl, the roots begin to grow laterally in search of additional nutrient. The mesh tray upon which the seed pad sits is comprised of a nontortuous straight path so that the plant experiences less wasted energy since the roots do not need to meander through a tortuous structure, such as that found in a foam, granular bed, soil, and the like.

The net effect of a less constrained growing system, which is set with water pouring through the seed pad at the start of the cycle and does not require additional water before harvest in an indoor environment, is larger plants as measured by wider leaves and a higher harvest density per m2 of seed pad area.

The inventive system allows for sufficient nutrient to be placed on the seed pad and for the nutrient to dissolve and drain into the reservoir under the mesh tray for availability to the growing root system. The simple method of pouring the water to dissolve and drain the nutrient allows the GFY system to have higher nutrient concentration than would be tolerable if instead the seeds sat in a stagnant or shallow solution.

There are prior grow kits. One such system is known as the Hamama system which includes a seed quilt for home grown microgreens. The Hamama system reports that water only needs to be added once, but this was found to not be true with repeated experimentation. Water was needed to be added at least a second time due to the high level of evaporation except in one instance when higher humidity was achieved in an enclosure and for this case the Hamama growth rate was low. Other seed kits include separate grow media, seeds, and a water spritzer such that the user needs to add water several times per day to germinate the seeds
Comparison to Hamama System
  Seed mat may include seed, nutrient, wicking paper, grow media
    Hamama does not contain nutrient—confirmed with EC measurement
  All parts of the seed mat are compostable
    Hamama appears to contain glues and coatings—which do not readily break down in a simple compost
  There is no glue on the seed mat to hold it together
    Hamama uses a glue to hold the top paper to the coco mat. The coco fiber mat also looks to be held in place with some adhesive polymeric binder as a material comprised of just coco coir will not hold together this way.
  Seed mat sealed with removable tape (other embodiments may include an origami-type fold of the brown paper to hold the pad together, but this method is laborious to manufacture)
    Hamama label does not affix to anything
  Removable tape seals the brown paper to itself. Optionally, it might overlap the capillary or top paper, but it does not touch the grow media or seeds.

Hamama quilts glue parts together and to the underlying coco mat
Water only added once before harvest
  Hamama requires additional water added during the grow cycle (even though advertising suggests no additional water is needed)
  GFY only requires water to be added once during the 9-day or longer growth cycle
Low water usage (g water per g fresh weight)
  Hamama and GFY for cases with no nutrient and no artificial light have comparable grams of water per gram of Fresh weight, or FW (harvest)
  GFY with nutrient and artificial light have much lower water usage—from 1.5 to 5× lower
High seed density (g/m2)
  Hamama has a seed density of ~200 grams per m2, where surface area includes the entire grow quilt as the plants expand out to cover this area
  GFY adds a seed density of 290 to about 1200 grams per m2, where the surface area is the entire surface area of the seed mat
High fresh weight harvest density (g/m2)
  The FW harvest density for the GFY system is higher for the comparison case without nutrient and artificial light, whereas the harvest density is higher and in some cases from 2× to 12× higher with the GFY system
High fresh weight growth rate in g/m2/d
High growth efficiency as calculated in two ways
  FW in g/m2/d per Water weight/FW
  FW/SW per m2/d per Water weight/FW
Remaining nutrient water in the bowl can be re-used or recycled to household plants (inside or outside)
  Hamama—there is no nutrient
  GFY—remaining nutrient water in the reservoir used to regrow many plants outside or inside
Some seed pads can be harvested multiple times (basil, romaine regrow)
  GFY—demonstrated, Hamama does not regrow after harvest
Some seed pads can be replanted in soil to regrow into mature plants (e.g., radish, romaine)
  Harvested seed pads can be planted to grow new plants
  New or unharvested seed pads can also be planted in soil either after germinated or before germination.
  Planting in soil can be done in containers or in the ground.

Example 1

Data were collected to directly compare one embodiment the GFY kit to the Hamama kit. Experimental setup and dimensions are described in Example 2.

For all tests, water only needs to be added at the start of the GFY growth cycle. Water was added until it reached the bottom of the mesh tray for the GFY system and water was added to the fill line in the Hamama system. In all cases except when humidity was kept artificially high (greater than 50%) inside a local enclosure (H-K-2 entry in table below, where the light box was mostly sealed to reduce evaporation loss and maintain high humidity). For this test the starting water exceeded the recommended levels with ¼-inch above the fill line, and water needed to be added to the Hamama kit before the end of the growth cycle. Tests were run without adding more water to the dry Hamama reservoir, and the plants wilted. Although the test location was in a location with low outside humidity (about 20% or less), the inside relative humidity during testing was 42% and stable. This relative humidity is well within the US average including San Francisco with reported 35-50% RH humidity inside homes.

| GrowFeedYourself (GFY) | From literature Lettuce | From literature Broccoli | From literature Kale | Microgreens, + Nutrient, + artificial light GFY Radish | with Nutrient and artifical light GFY Broccoli | with 2× Nutrient and artifical light GFY Broccoli |
|---|---|---|---|---|---|---|
| Product fresh weight (FW), g | 454 | 77 | 28 | 52 | 31.7 | 38.3 |
| Water, cups (starting) | | | | 2.2 | 2.2 | |
| Water, gallon | 22 | 11 | 2.26 | | | |
| Water, g | 83279 | 41640 | 8555 | 520 | 520 | 520 |
| Additional water (if any), g | | | | | | |
| Day more water added | | | | N/a | N/a | |
| room humidity (RH), % | | | | 42 | 42 | 42 |
| Water (ending), g | | | | 137 | 156 | 54 |
| Total water consumed, g | | | | 383 | 365 | 466 |
| Water (initial) to prod, g/g | | | | 10.0 | 16.4 | 13.6 |
| Water (consumed) to prod weight, g/g | 183.4 | 540.8 | 305.5 | 7.4 | 11.5 | 12.2 |
| water % in plant, estimated | 93 | | | 93.0 | 92.0 | 93.0 |
| Water (transpired or evap lost) to prod, g/g | | | | 6.4 | 10.6 | 11.2 |
| grams FW/grams water consumed | 0.0055 | 0.0018 | 0.0033 | 0.1356 | 0.0868 | 0.0822 |
| grams water used per gram FW | 183.4 | 540.8 | 305.5 | 7.4 | 11.5 | 12.2 |
| Seed Weight (SW), g | | | | 4 | 3 | 3 |
| X factor of water relative to mature plant | 1 | 1 | | | 47.0 | 44.5 |
| Days, seed to harvest | 60 | 90 | 60 | 6 | 8 | 9 |
| mat, m2 | 0.09290 | 0.02323 | 0.00929 | 0.01032 | 0.01032 | 0.01032 |
| FW growth, g/m2/d | 81 | 37 | 50 | 840 | 384 | 412 |
| FW/SW | | | | 13 | 10.57 | 12.77 |
| seed density, g/m2 | | | | 388 | 291 | 291 |
| FW density, g/m2 | | | | 5038 | 3071 | 3710 |
| FW/SW/day | | | | 2.17 | 1.32 | 1.42 |

-continued

| | | | | | |
|---|---|---|---|---|---|
| Growth efficiency, FW growth (g/m2/d)/ Water (g H2O/g FW) | 0.4 | 0.07 | 113.8 | 33.3 | 33.9 |
| Growth efficiency 2, FW/SW/m2/d per WW/FW | | | 28.5 | 11.1 | 11.3 |

| GrowFeedYourself (GFY) | No Nutrient, w/same light as Hamama GFY Broccoli | No Nutrient, no artificial light GFY Broccoli | No Nutrient, no artificial light GFY Kale | with Nutrient and artificial light GFY Kale | 1020 flat held with Tray-Bales BIG RADISH |
|---|---|---|---|---|---|
| Product fresh weight (FW), g | 24 | 25 | 16.5 | 35.8 | 1127 |
| Water, cups (starting) | | | 2.2 | 2.2 | |
| Water, gallon | | | | | 1.5 |
| Water, g | 509 | 500 | 520 | 520 | 5678 |
| Additional water (if any), g | | | | | |
| Day more water added | | N/a | N/a | N/a | N/a |
| room humidity (RH), % | 42 | 42 | 42 | 42 | 42 |
| Water (ending), g | 149 | 57 | 160 | 122 | 1410 |
| Total water consumed, g | 360 | 443 | 360 | 399 | 4268 |
| Water (initial) to prod, g/g | 21.2 | 20.0 | 31.5 | 14.5 | 5.0 |
| Water (consumed) to prod weight, g/g | 15.0 | 17.7 | 21.8 | 11.1 | 3.8 |
| water % in plant, estimated | 93.0 | 92.0 | 92.0 | 92.0 | 93.0 |
| Water (transpired or evap lost) to prod, g/g | 14.1 | 16.8 | 20.9 | 10.2 | 2.9 |
| grams FW/grams water consumed | 0.0667 | 0.0564 | 0.0458 | 0.0898 | 0.2641 |
| grams water used per gram FW | 15.0 | 17.7 | 21.8 | 11.1 | 3.8 |
| Seed Weight (SW), g | 3 | 3 | 3 | 3 | 90 |
| X factor of water relative to mature plant | 36.1 | 30.5 | 8.4 | 16.5 | |
| Days, seed to harvest | 9 | 8 | 9 | 9 | 6 |
| mat, m2 | 0.01032 | 0.01032 | 0.01032 | 0.01032 | 0.12903 |
| FW growth, g/m2/d | 258 | 303 | 178 | 385 | 1456 |
| FW/SW | 8.00 | 8.33 | 5.50 | 11.9 | 12.5 |
| seed density, g/m2 | 291 | 291 | 291 | 291 | 698 |
| FW density, g/m2 | 2325 | 2422 | 1598 | 3468 | 8734 |
| FW/SW/day | 0.89 | 1.04 | 0.61 | 1.33 | 2.09 |
| Growth efficiency, FW growth (g/m2/d)/ Water (g H2O/g FW) | 17.2 | 17.1 | 8.1 | 34.6 | 384.4 |
| Growth efficiency 2, FW/SW/m2/d per WW/FW | 5.7 | 5.7 | 2.7 | 11.5 | 4.3 |

| HAMAMA | from company on-line information - but not replicated Hamama | Kale - test 1, ambient indoor light H-K-1 | Broc - test 1, ambient indoor light H-B-1 | Broc - test 2, with added artificial light H-B-2 | Kale - test 2 with added artificial light H-K-2 |
|---|---|---|---|---|---|
| Product fresh weight at harvest FW, g | 85 | 56 | 50 | 67 | 41 |
| Water, cups (starting) | 3 | | | | |
| Initial Water, g (fill line at 580 g or above fill line for xtra water) | 710 | 580 | 850 | 800 | 847 |
| Additional water (if any), g | | 579 | 250 | 276 | |
| Day when more water added (dry) | | 5 | 8 | 9 | |
| room humidity (RH), % | | 42 | 42 | 42 | >50% in enclosure |
| Water (ending), g | 0 | 0 | 0 | 179 | 40 |
| Total water consumed, g | 710 | 1159 | 1100 | 897 | 807 |
| Water (initial) to prod, g/g | | | | | |
| Water (consumed) to prod weight, g/g | 8.35 | 20.70 | 22.00 | 13.39 | 19.68 |
| water % in plant | 92 | 92 | 93 | 93 | 92 |
| Water (transpired or evap lost) to prod, g/g | 7.4 | 19.8 | 21.1 | 12.5 | 18.8 |
| grams FW/grams water consumed | 0.120 | 0.048 | 0.045 | 0.075 | 0.051 |
| grams water/grams FW | 8.3 | 20.7 | 22.0 | 13.4 | 19.7 |
| SW, g | 10 | 10 | 10 | 10 | 10 |
| X factor of water relative to mature plant | | 8.9 | 24.6 | 40.4 | 9.3 |
| Days, seed to harvest | 10 | 9 | 8 | 9 | 9 |
| mat, m2 | 0.04645 | 0.04645 | 0.04645 | 0.04645 | 0.04645 |
| FW growth, g/m2/d | 183 | 134 | 135 | 160 | 98 |
| FW/SW | 8.5 | 5.6 | 5.0 | 6.7 | 4.1 |
| seed density, g/m2 | | 215 | 215 | 215 | 215 |
| FW density, g/m2 | 1831 | 1206 | 1076 | 1442 | 883 |

| | | | | | |
|---|---|---|---|---|---|
| FW/SW/day | 0.85 | 0.62 | 0.63 | 0.74 | 0.46 |
| Growth efficiency, FW growth (g/m2/d)/Water (g H2O/g FW) | | 6.5 | 6.1 | 12.0 | 5.0 |
| Growth efficiency 2, FW/SW/m2/d per WW/FW | | 0.6 | 0.6 | 1.2 | 0.5 |

Hamama Water Loss

Figure 10:
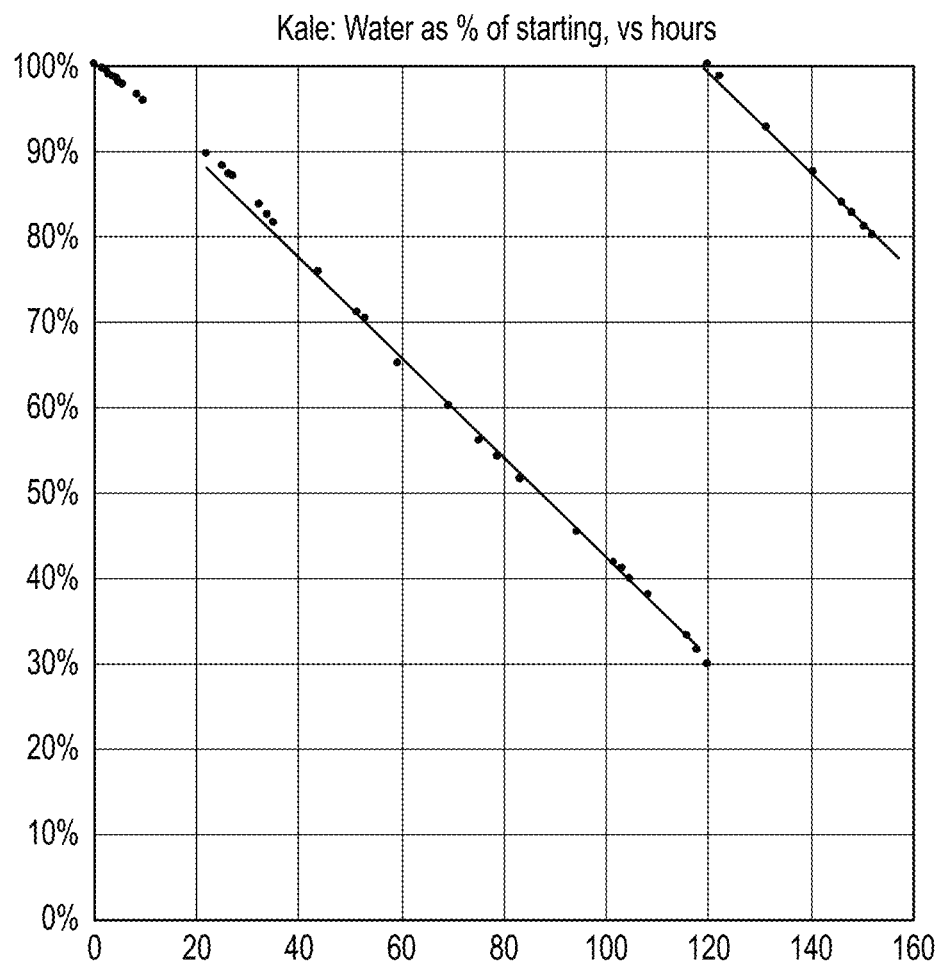
FIG. 10 shows the water loss from the Hamama microgreen system as a % of starting water vs hour since water first added.

Weight measurements were taken during the growth cycle. For Hamama, the weight drops linearly from the beginning—after water is added to the container. As shown in FIG. 10 for Kale, after 120 hours (5 days), additional water was added and water loss again proceeds linearly with time on stream. For this data, there was no standing water remaining in the Hamama tray after 5 days. At the start of the run, water was added to the "fill line" as marked inside the Hamama tray.

For the GFY, there was less than 0.2% water weight loss recorded in the first 72 hours (while covered with the humidity dome). One gram of water was measured loss in 72 hours with 520 grams of starting water over three days while the humidity wrap was covered.

Water Usage
- Hamama: ~13-22 grams of water per gram fresh weight (at harvest) depending on seed type
- GFY (with nutrient and artificial light): ~7-22 grams of water per gram of fresh weight, depending on seed type in the small bowls
- GFY with nutrient and artificial light in the big bowls from ~5 to 11 grams of water per gram of fresh weight with higher starting seed density (from 700 to 1000 grams/m2)
- Field lettuce (from literature sources): ~183 grams of water per gram of fresh weight
    - The GFY harvest for the light and nutrient case ranges from 7 to 11 grams of water per gram of fresh weight—this shows a water usage reduction of more than 90% over field grown greens.

Area Growth Rate of Edible Harvest
- Hamama: ~100-160 grams of FW per m2 grow pad area per day
- GFY: ~170-850 grams of FW per m2 grow pad area per day in the small bowls
- GFY: ~1500 to 15,000 grams of FW per m2 grow pad area per day in the tall bowls with higher starting seed density (from 700 to 1000 grams/m2)
- Growth Efficiency 1: FW/m2/d Per Water Weight/FW
- Hamama: ~5-12
- GFY small bowls: ~8-150
- GFY large bowls: ~50-400
- Growth Efficiency 2: FW/SW/m2/d Per WW/FW
- Hamama: ~0.5-1.2
- GFY small bowls: ~2.5-30
- GFY large bowls: 7-50

Figure 11:
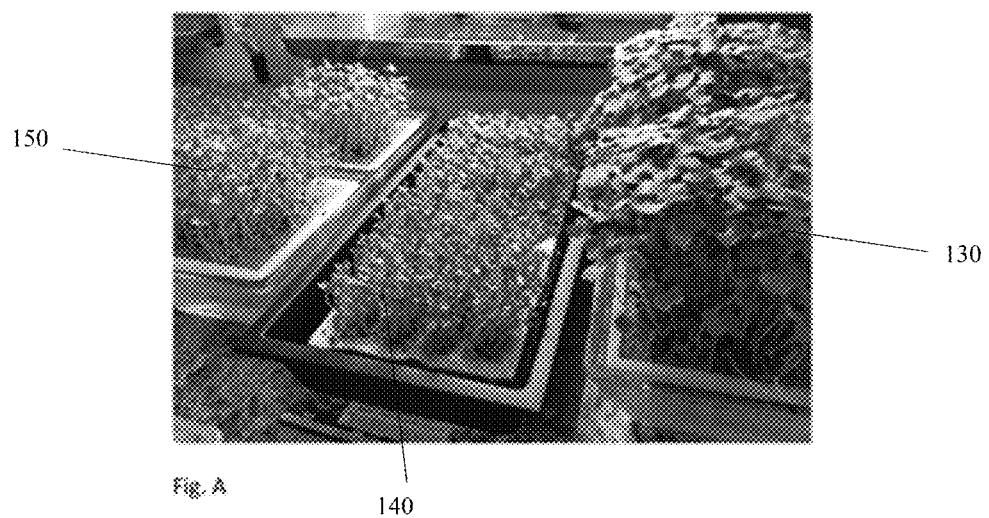
FIG. 11 shows a comparison of the GFY microgreens without nutrient nor non-ambient light (left) next to the Hamama microgreens (center) and the GFY microgreens grown with nutrient and artificial light (left).

Pictures of Broccoli are shown in FIG. 11 (left—2 GFY bowls with no nutrient nor artificial light; center—Hamama which does not include nutrient and same light as plants on the left; right—2 GFY bowls with nutrient and artificial light). Note—the plants on the right were moved from under the light (14 W LED) to the counter for pictures, then moved back to the light. All seeds started on the same day. Plants shown on day 6 after starting germination with the addition of water.

Figure 12:
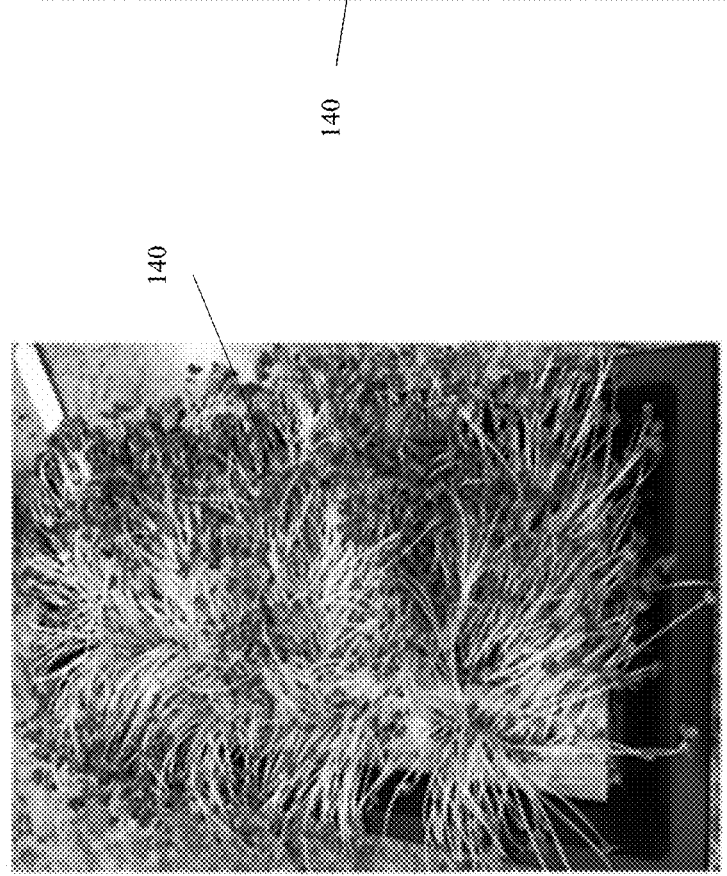
FIG. 12 shows the Hamama microgreens that ran out of water at 8 days.

Hamama—Broccoli on Day 8 shown in FIG. 12. Exceeded the recommended water when starting (a full ¼" above the top of the recommended fill line) to try and keep sufficient water during the entire growth cycle. The Hamama grown greens 140 still ran out of water on day 8 even when exceeding the recommended water fill point by about ¼ inch.

Figure 13:
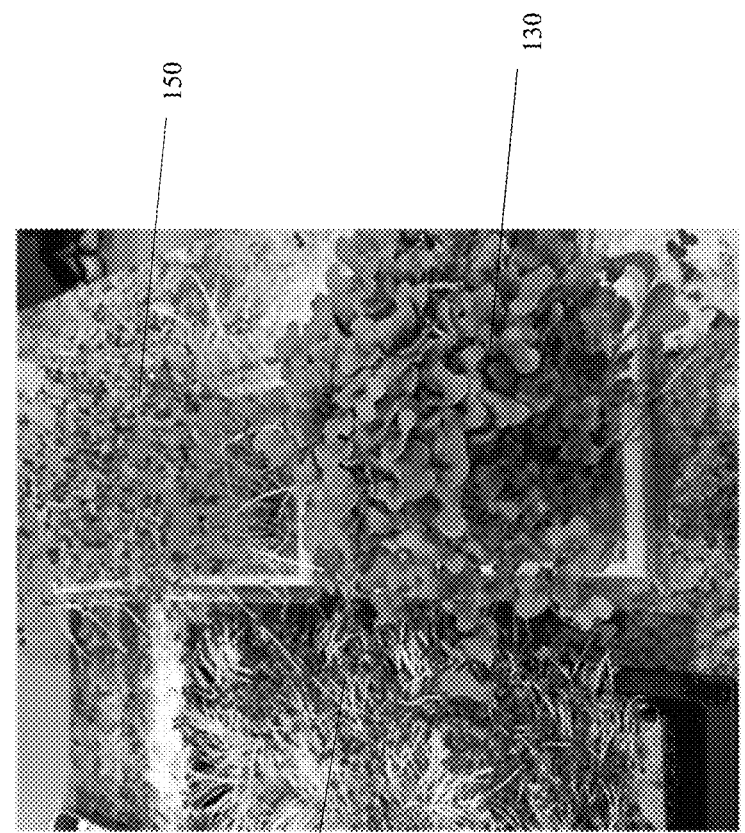
FIG. 13 shows the wilted Hamama greens on the left after 8 days and the GFY microgreens at 8 days in the top right as grown without nutrient and non-ambient light and the bottom right as grown with nutrient and artificial light.

Day 8 Comparison shown below. Added extra water to Hamama (to revive), no extra water added to GFY bowls. Comparison is shown in FIG. 13. Back right—GFY with no nutrient nor artificial light 150. Front right—GFY with nutrient and artificial light 130—moved to counter just for picture, then returned to the light.

Figure 14:
FIG. 14 shows six uniform broccoli microgreen bowls grown with a tray that allows for an air gap above the seeds during germination.

Picture of tall trays (1 cm taller than the seed mat) to allow for more oxygen during germination. As shown 6 trays of Broccoli microgreens started at the same time and just uncovered after three days and brought to light. All 6 are very uniform and were well germinated as shown in FIG. 14. The taller trays overcame a problem with the short trays by adding more air space for growth, oxygen transfer and germination.

Example 2

Experiments were run to compare the growth rate and water utilization for the GFY system with the Hamama growing system. The GFY system consists of square glass bowls with a roughly 5.5-inch per side exterior dimension. The interior opening is 128 mm or roughly 5.04 inches for an open surface area of 0.016384 m². A firm mesh tray made using PLA in a 3D printer is placed inside the bowl. The height of the tray is 1.7 cm where the thickness of the bottom mesh openings is about 0.2 cm. The interior open height above the mesh section is about 1.5 cm. When the seed pad is placed inside the tray, the remaining air gap from the top of the seed pad where the seeds sit to the top of the tray is about 1 cm. The mesh openings are 5 mm×5 mm in a grid pattern that covers the bottom of the tray. The firm mesh bottom allows for the seed pad to sit above the water reservoir during growth. It is recognized that the seed tray could be made from other materials or manufactured by other methods, including molding.

A seed pad consisting of a hemp fiber substrate (supplied as rolls or precut sheets by Terrafibre and further cut into the seed pad square shape https://terrafibre.ca) of 10 cm×10 cm was placed on top of a brown paper sheet of 15 cm by 15 cm with a 5 cm×5 cm square hole cut out of the center. Seeds were sprinkled on the top of the hemp fiber substrate, where 3 grams used for Kale and Broccoli and 4 grams for Radish. Powder nutrient from General Hydroponics (Maxi-grow 10-5-14) in the amount of ⅛ teaspoon was sprinkled on the side of the substrate after seeds are applied. The nutrient is from General Hydroponics and the growing nutrient contains N—P—K and micronutrients. The nutrient tool was placed on the edge of the substrate and the nutrient is gently tapped against the tool to quickly apply the nutrient along one side of the growing mat substrate. The nutrient was placed adjacent to the seeds. In some embodiments, the nutrient can be sprinkled on top of the seeds or generally placed anywhere on the seed pad fiber mat.

After adding the nutrient, a 10 cm by 12.5 cm capillary paper is placed on top of the seed mat, where one edge is folded up such that the remaining seed pad is roughly 10 cm×10 cm. The fold up section allows the user to easily grab and remove the capillary paper after setting the seeds with water to start the germination process.

The brown paper is folded inward on first two opposing sides to overlap the seed pad by about 2 cm. In a second step, the other two opposing sides are folded down to enclose the edges of the seed pad. A removable adhesive paper strip is then placed on two sides of the seed pad to hold the pad together such that the nutrient and seeds do not fall out. There is no adhesive applied to the fiber mat. The adhesive on the paper strip joins the brown paper to itself and may also affix to the capillary paper. The adhesive strip does not touch the fiber substrate.

Several seed pads are stacked together on top of cardboard. The stack of seed pads is then sandwiched between cardboard sheets (top and bottom) and vacuum sealed into a pack. The vacuum sealing allows for the seeds to be stored for extended periods of time (more than a year and from 1 to 5 years) and to be shipped without settling or moving around within the pad.

To set the seeds, the vacuum-sealed bag is cut open and a seed pad is removed. The seed pad is placed into the tray which was placed into the square bowl. The square bowl has a taper such that the tray rests just inside the inner lip of the bowl. The bottom of the tray is about 1 cm below the top of the bowl. The seed pad is placed with the capillary paper facing up. The adhesive strips are on this face of the seed pad.

The adhesive strips are removed by the user and can be placed on the bowl to remind the user what was planted. The adhesive strips have information related to the type of seed and optionally a reminder on how many days the seeds should be covered during germination and how many days to grow until harvest. The user may choose to write something unique on the adhesive paper strip relative to what they are growing, including start date or other notes.

The outer brown wrap is opened such that it creates a bowl or corral on the mesh tray. This allows the water when poured to fully wet the surface and seeds to start the germination process. This minimizes the water loss to flow around the seed pad and rather substantially forces the water to flow through the seed pad such that the nutrient is dissolved and moved into the reservoir or bowl 10.

The user pours water over the exposed capillary paper and seeds which are located underneath the capillary paper. The amount of water can vary from about 450 to 550 grams for a seed pad of about 10-cm by 10-cm with about 3 grams of seeds. Larger reservoirs could be used for higher seed density or larger seed pad area. The user pours water until the water just touches one bottom corner of the bottom of the tray. There will remain some water gap, partial or full, beneath the tray and the reservoir below. In one embodiment, the water touches one corner of the seed mat only after pouring over the seed pad.

As water is poured, it begins to dissolve the salt based nutrient solution and push it to the bottom of the reservoir. Not all nutrient will dissolve during the estimated 15 to 300 seconds that water is poured over the seeds to push the water and nutrient into the reservoir beneath the seed pad. The remaining undissolved nutrient will continue to dissolve in the wet seed pad and drip into the reservoir much like a time release nutrient over the growing cycle.

The inventive process acts to push water through the seed pad and into the reservoir below. The estimated potential energy from the water dropping roughly 10 cm in height is about 0.5-J. The nutrient solution will not be fully mixed with this low input energy, but the energy is sufficient to push some of the nutrient out of the seed pad and into the bottom of the reservoir where it will continue to mix by diffusion over several days.

It is preferred to push the nutrient away from the seed pad as it dissolves in the water. Some seeds are sensitive to the salt content or amount of nutrient during germination and will delay or reduce germination.

After water is applied to the bowl, the user picks up the capillary paper and removes it. Preferably the user will compost the capillary paper and brown paper after setting the seeds. If there are seeds stuck to the capillary paper, then the user may use the seed scraper to gently push the seeds back on the seed mat. The user may choose to spread the seeds around but also may keep them clumped together. The brown paper is then removed. An easy method is to rip the paper at one location and then remove along both sides. If the seed pad becomes slightly dislodged, the user can gently nudge back into location where it nestles within the tray.

The final step for germination is to place a cover over the bowl. For the example described, a wax-infused cotton fabric covers the bowl and is sealed with a rubber band around the edge of the bowl. This allows for sufficient oxygen above the seeds as needed for germination while also keeping high humidity as also needed for germination. In an alternate method, the wrap can be sealed with clips at the corner or even just press fit on the top of the bowl. The seal is not hermetic but sufficient to slow down the loss of water due to evaporation.

The bowl is left undisturbed (although it is also okay to open and look at the seeds several times per day) for 3 days. For the example below, Kale seeds are kept covered for 3 days as are Broccoli. Radish seeds are covered for 2 days, although they can also be kept covered for 3 days. It is generally understood, that the cover may be kept on one or more or two or more, or two to five days longer than the recommended recipe. Keeping the seeds covered for a longer period of time will decrease the growth rate in grams of Fresh Weight per m2 per day. After the seeds are germinated, they will want light, but the application of light can be delayed for days (i.e., the seeds can still remain under the cover) if the user forgets to uncover or start the lights.

After three days (for the experiment described here) the cover was removed, and the seeds were clearly germinated and ready for light.

The Hamama system was set following its user instructions, where water was added to the reservoir above the top of the fill line by about ¼-inch (about 847 grams of water as measured) and the seed quilt was placed into the solution. The quilt was pressed down for about 30 seconds and released as recommended. The EC of the solution was measured, and it matched the EC of the added tap water. It is understood that there is no nutrient in the Hamama system.

A series of experiments were conducted in parallel; all were set with Kale seeds.

Hamama—in GP2
  1—GFY, with nutrient in GP2
  2—GFY, with nutrient in GP2
  3—GFY, with nutrient in GP2
  4—GFY, with nutrient in GP1
  5—GFY, with nutrient in GP1
  6—GFY with nutrient, kept on the counter with only ambient light 7—GFY, with nutrient sprinkled on top of seeds in GP3
8—GFY, with nutrient sprinkled on top of seeds in GP3

GP2 consists of a light enclosure with a 14 W white LED that is kept on for 16 hours during the day and off for 8 hours each evening. The grow containers are set on a flat tray that is about 25 cm away from the light. The enclosure is covered with aluminum foil on three sides to reflect more light, to increase local humidity and to reduce water evaporation. In all previous runs, the Hamama system could not be run for 9 days without losing all water when placed on a counter with a room humidity of 42%. The light box with 3 sides closed with aluminum foil increased the local humidity and allowed the Hamama to run through a growth test without running out of water. There were more plants inside of GP2 which further created even higher humidity due to greater plant transpiration and water loss.

GP1 and GP3 were set up in an identical manner to GP2 except each only had two GFY bowls. There were fewer plants and less water due to transpiration loss in GP1 and GP3 and hence a lower effective local humidity—although the humidity is still higher than the room humidity.

Figure 15:
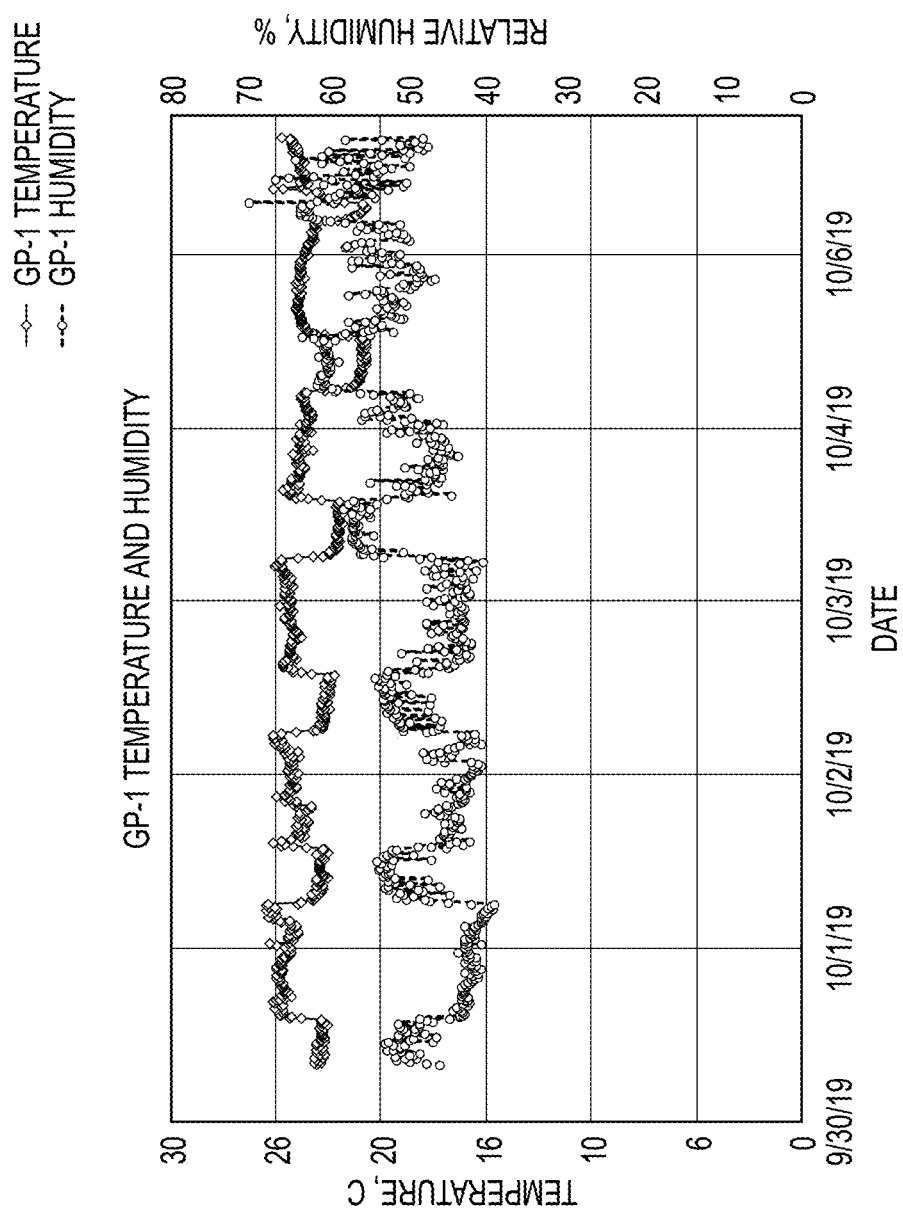
FIG. 15 shows temperature and humidity data during the growth cycle with lights on for 16 hours per 24-hour day in light box GP-1.

Data are plotted for the temperature and humidity inside the GP1 light box after the GFY plants are uncovered after 3 days during germination. The lights are on for 6 days (16:8-h Light:Dark diurnal cycle) as seen in FIG. 15. The humidity increases each evening as the plants transpire water into the local environment. As the humidity increases, the local temperature decreases in much the same manner as a swamp cooler or an evaporative cooler works to reduce ambient air temperatures (the LED light does not impart much heat when the lamp is on during the day). It can be seen that as the plant growth increases, and especially by the fourth day of growing in the light, that the humidity ratchets up each evening while the local temperature responds inversely.

The average temperature in GP1 over the 6-day growing cycle (with lights on for 6 days and no lights for the first 3 days) was 23.5 C and the average Relative Humidity (RH) was 49.2%. GP2 contains many more plants and biomass. There will be higher humidity in GP2 with greater water loss to the local environment with higher transpiration losses due to more plants.

Figure 16:
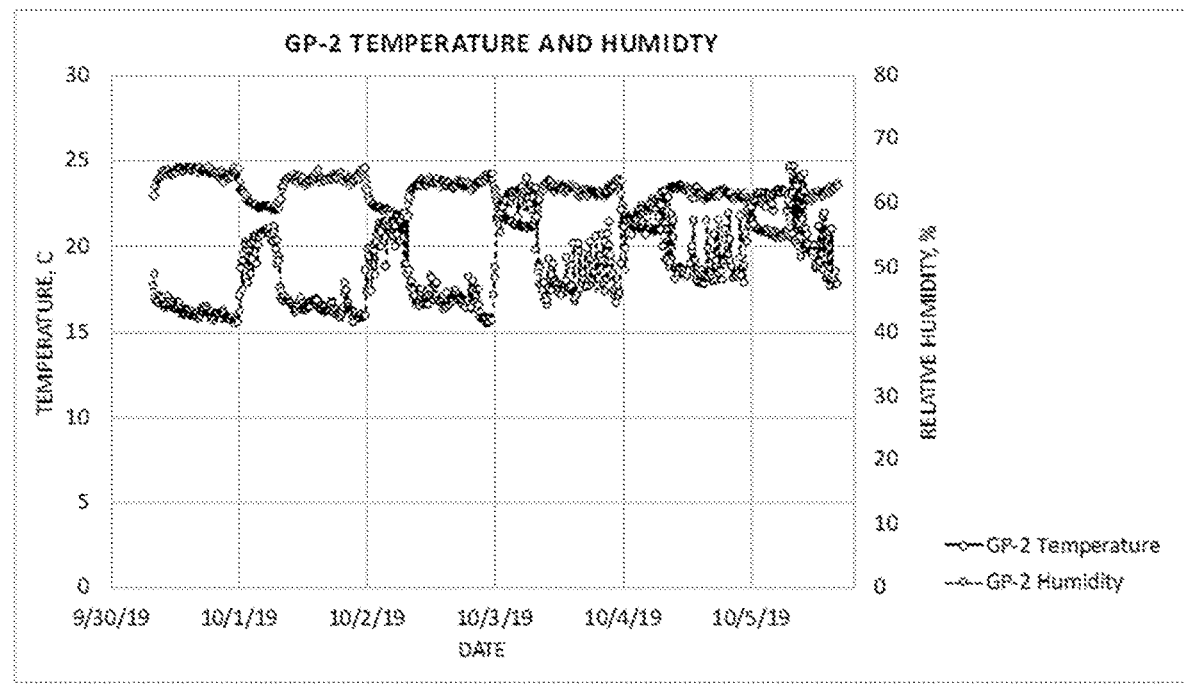
FIG. 16 shows temperature and humidity data during the growth cycle with lights on for 16 hours per 24-hour day in light box GP-2.

The average temperature in GP2 over the 6-day growing cycle (with lights on) was 23 C and the average Relative Humidity (RH) was 50.3% over the full growth cycle although the humidity at night was higher as shown in FIG. 16. The RH in the room was 42% showing that the partially enclosed light box was sufficient to raise the local humidity and keep the Hamama from running out of water for this case with additional starting water. The average RH in GP2 was higher than GP1 due to more plants and correspondingly higher transpiration losses which puts moisture into the air.

The temperature in GP1 (which contains fewer plants) is generally higher than GP2. It is also surprising that the system with more plants GP2 has a thermal lag of several hours relative to GP1. That is, the temperature plot for GP1 are offset from the temperature plot for GP2 due to the higher thermal mass inside the GP2 light box (i.e., the higher thermal mass in GP2 is due to more plants, more bowls, and more water as compared to that in GP1). This general phenomenon is known for very large bodies of water (temperatures near the ocean stay more constant) but is surprising for the thermal mass of this system.

GP2, which contains more plants, stays cooler when the lights are turned on and photosynthesis starts due to the higher thermal mass from the evening cooling cycle. The effect of lower temperature during the light cycle manifests as a lower growth rate than in the other light boxes which only contain 2 bowls. GP2 contains the Hamama which covers the surface area of 3 bowls along with 3 GFY bowls.

Experimental Results

Weight data were collected at the time of germination and each day throughout a 9-day growing cycle. Data were collected in the evening and morning to assess weight change during the night when the humidity was higher and temperature lower, along with weight change during the day.

Starting water weight in grams for each system.

| time, h | Hamana | 1 | 2 | 3 | 4 | 5 | 6 | 7 | 8 |
|---|---|---|---|---|---|---|---|---|---|
| 0 | 847 | 519 | 528 | 470 | 475 | 542 | 522 | 472 | 483 |

TABLE

Water weight as a % of starting water weight

| time, h | Hamana | Unit 1 | Unit 2 | Unit 3 | Unit 4 | Unit 5 | Unit 6 | Unit 7 | Unit 8 |
|---|---|---|---|---|---|---|---|---|---|
| 0.0 | 100.0 | 100.0 | 100.0 | 100.0 | 100.0 | 100.0 | 100.0 | 100.0 | 100.0 |
| 3.0 | 98.6 | 99.8 | 100.0 | 100.0 | 100.0 | 100.0 | 99.8 | 99.8 | 99.8 |
| 12.0 | 95.9 | 99.2 | 99.6 | 99.4 | 99.4 | 99.6 | 99.4 | 99.4 | 99.4 |
| 17.0 | 94.5 | 99.0 | 99.6 | 99.1 | 99.2 | 99.4 | 99.2 | 99.4 | 99.4 |
| 22.3 | 92.8 | 98.7 | 99.6 | 98.9 | 98.9 | 99.1 | 99.0 | 99.2 | 99.2 |
| 37.0 | 89.1 | 98.1 | 99.2 | 98.5 | 98.5 | 98.7 | 98.9 | 98.7 | 99.0 |
| 42.0 | 87.7 | 97.9 | 99.1 | 98.3 | 98.3 | 98.5 | 98.7 | 98.5 | 98.8 |
| 46.0 | 86.3 | 97.7 | 99.1 | 98.1 | 98.1 | 98.5 | 98.7 | 98.5 | 98.8 |
| 52.0 | 84.3 | 97.3 | 98.9 | 97.9 | 98.1 | 98.3 | 98.5 | 98.3 | 98.6 |
| 63.5 | 81.5 | 96.9 | 98.7 | 97.4 | 97.5 | 98.0 | 98.3 | 97.9 | 98.1 |
| 66.0 | 80.8 | 96.7 | 98.7 | 97.2 | 97.5 | 98.0 | 98.1 | 97.9 | 97.9 |
| 70.7 | 79.1 | 96.7 | 98.7 | 96.8 | 97.5 | 97.8 | 98.1 | 97.9 | 95.2 |
| 76.3 | 76.7 | 94.8 | 97.2 | 95.1 | 95.4 | 96.1 | 95.0 | 96.0 | 93.6 |
| 86.0 | 74.5 | 93.1 | 95.5 | 93.4 | 93.5 | 94.3 | 92.3 | 94.1 | 91.5 |
| 92.3 | 72.4 | 91.1 | 93.8 | 91.7 | 91.4 | 92.6 | 89.8 | 91.9 | 89.4 |
| 99.0 | 69.5 | 88.8 | 91.5 | 89.4 | 88.8 | 90.2 | 86.4 | 89.2 | 86.7 |
| 109.7 | 65.9 | 86.3 | 89.0 | 86.6 | 85.3 | 87.6 | 82.4 | 85.8 | 83.4 |
| 115.2 | 65.1 | 84.4 | 87.1 | 84.7 | 83.2 | 85.6 | 79.5 | 83.5 | 81.2 |
| 122.8 | 62.3 | 81.3 | 84.5 | 81.7 | 78.5 | 82.1 | 74.7 | 79.4 | 77.6 |
| 133.7 | 59.9 | 77.6 | 81.3 | 77.7 | 74.1 | 78.6 | 69.5 | 74.2 | 72.7 |
| 139.0 | 58.3 | 75.5 | 79.4 | 75.5 | 70.9 | 76.2 | 66.1 | 71.2 | 70.0 |

TABLE-continued

Water weight as a % of starting water weight

| time, h | Hamana | Unit 1 | Unit 2 | Unit 3 | Unit 4 | Unit 5 | Unit 6 | Unit 7 | Unit 8 |
|---|---|---|---|---|---|---|---|---|---|
| 147.5 | 54.5 | 71.5 | 75.9 | 70.6 | 65.3 | 72.0 | 61.3 | 65.3 | 64.2 |
| 158.8 | 51.8 | 66.7 | 71.6 | 64.9 | 58.9 | 67.2 | 56.5 | 57.4 | 56.9 |
| 164.8 | 49.4 | 63.2 | 68.4 | 60.2 | 53.5 | 63.1 | 52.5 | 52.5 | 52.6 |
| 171.0 | 46.8 | 58.6 | 64.4 | 54.9 | 47.6 | 58.7 | 49.0 | 46.8 | 47.4 |
| 181.1 | 43.8 | 53.2 | 59.3 | 48.5 | 40.2 | 53.1 | 44.4 | 38.8 | 39.8 |
| 186.3 | 41.9 | 49.7 | 56.4 | 44.9 | 36.0 | 50.4 | 41.4 | 33.5 | 35.4 |
| 192.0 | 39.2 | 44.9 | 52.1 | 39.4 | 31.2 | 46.9 | 37.4 | 26.5 | 29.0 |
| 195.5 | 37.7 | 42.4 | 50.0 | 36.6 | 28.0 | 44.8 | 35.6 | | |
| 205.5 | 34.8 | 36.6 | 44.7 | 30.0 | 20.4 | 39.1 | 31.6 | | |
| 210.0 | 33.2 | 33.1 | 41.7 | 26.0 | 16.2 | 36.3 | 29.1 | | |
| 214.0 | 30.8 | 29.1 | 36.9 | 20.9 | 12.4 | 33.4 | 26.2 | | |

All Data, weight as a percent of starting water weight vs starting time in hours.

Figure 17:
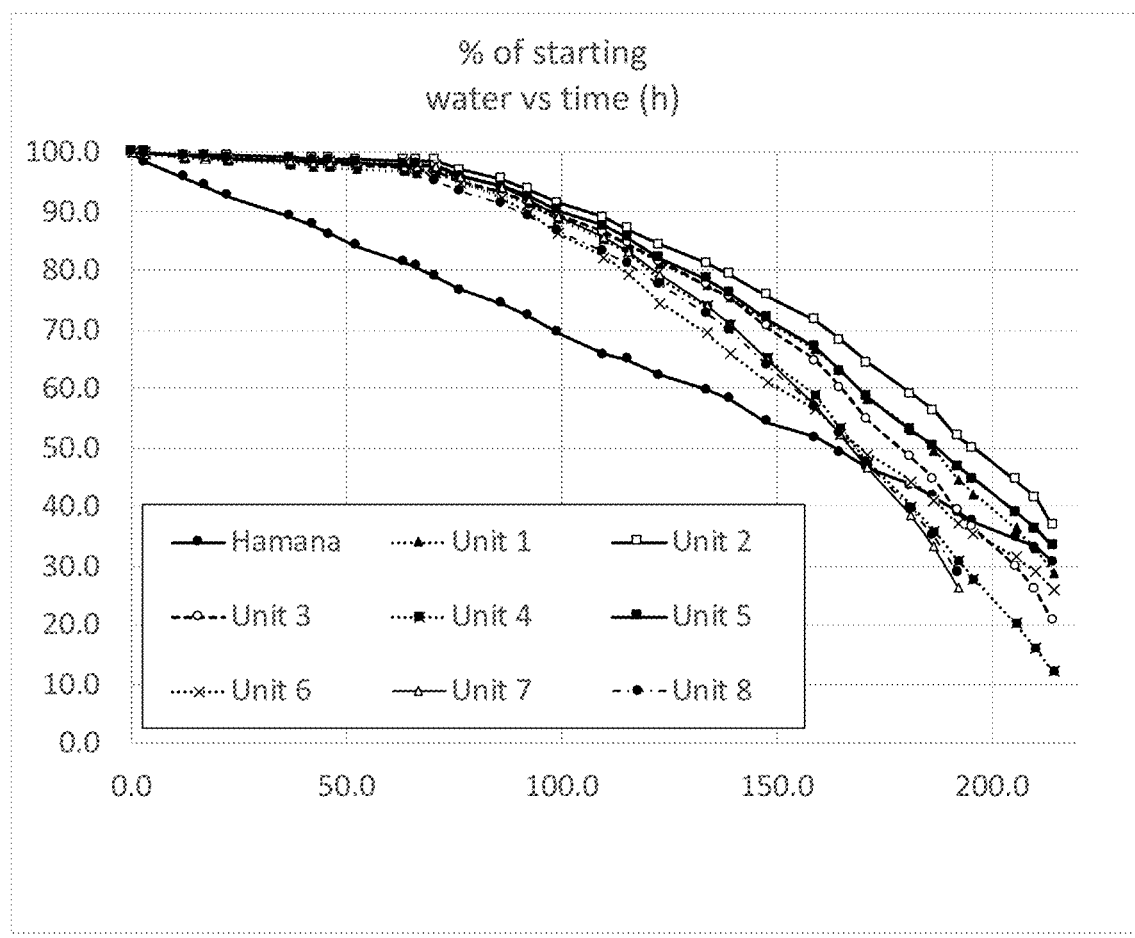
FIG. 17 shows the total weight as a % of the starting weight as a function of time in hours for Hamama microgreens as compared to 8 GFY experimental bowls.

Data for GP2 only showing weight loss as a percent of the starting water weight. The Hamama remains fairly linear throughout the growth cycle. The GFY system has very little weight loss in the first three days and then increases substantially as time proceeds. Growth increases with a second order (not a linear function) in GFY after about 6 total days, at which point the water loss drops more quickly and falls below the Hamana line. Data as shown is a plot of weight as a % of initial water versus time (in hours) since setting the seeds as seen in FIG. 17.

Comparing growth performance for all experimental data. A water mass balance was done where the total water loss was calculated as the starting water weight minus the measured remaining water weight in the bowl after harvest. The total weight change is the starting weight of the set bowl minus the final weight of the bowl with a credit for the 10-14 grams change when the wrap is removed for the GFY bowls after 3 days. The cover paper of the Hamama system was left at the side of its container after it was cut open to not affect the weight. From the mass balance, the non-harvest fresh weight could be calculated from the mass balance—this material includes the roots and remaining unharvested stems that are closest to the seed mat. Fresh weight was taken as the harvest as cut close to the seed mat line (but about 5 to 10 mm above the seed mat or quilt as is customary for harvesting microgreens where the harvest does not occur exactly at the mat line to avoid potential microbial contamination in the harvested greens).

| | Hamana - GP2 | Unit 1 - GP2 | Unit 2 - GP2 | Unit 3 - GP2 | Unit 4 - GP1 |
|---|---|---|---|---|---|
| Total weight change | 586 | 368 | 333 | 372 | 416 |
| Total water loss, g | 807 | 466 | 427 | 442 | 472 |
| Harvest FW, g | 41 | 29 | 27 | 32 | 33 |
| non FW weight increase, g | 180 | 69 | 67 | 38 | 23 |
| g_Water/g_FW | 19.7 | 16.1 | 15.8 | 13.8 | 14.3 |
| FWg/m2/d | 98 | 312 | 291 | 344 | 355 |
| FW/SW | 4.1 | 9.7 | 9.0 | 10.7 | 11.0 |
| Harvest FW g/m2 | 883 | 2809 | 2616 | 3100 | 3197 |
| g_roots/g_FW | 4.4 | 2.4 | 2.5 | 1.2 | 0.7 |
| growth efficiency 1 (FW g/m2/d)/water loss (g WW/g FW) | 5.0 | 19.4 | 18.4 | 24.9 | 24.8 |
| growth efficiency 2 (FW/SW/m2/d)/WW/FW | 0.50 | 6.48 | 6.13 | 8.31 | 8.28 |

| | Unit 5 - GP1 | Unit 6 - amb | Unit 7 - top, GP3 | Unit 8 - top, GP3 |
|---|---|---|---|---|
| Total weight change | 361 | 385 | 347 | 343 |
| Total water loss, g | 465 | 453 | 444 | 423 |
| Harvest FW, g | 26 | 21 | 35 | 33 |
| non FW weight increase, g | 78 | 47 | 62 | 47 |
| g_Water/g_FW | 17.9 | 21.6 | 12.7 | 12.8 |
| FWg/m2/d | 280 | 226 | 424 | 400 |
| FW/SW | 8.7 | 7.0 | 11.7 | 11.0 |
| Harvest FW g/m2 | 2519 | 2034 | 3391 | 3197 |
| g_roots/g_FW | 3.0 | 2.2 | 1.8 | 1.4 |
| growth efficiency 1 (FW g/m2/d)/water loss (g WW/g FW) | 15.6 | 10.5 | 33.4 | 31.2 |
| growth efficiency 2 (FW/SW/m2/d)/WW/FW | 5.22 | 3.49 | 11.14 | 10.39 |

| Averages | Hamana in GP2 | GFYinGP2 | GFYinGP1 | GFYin ambient | GFYinGP3 with top nutrient sprinkle |
|---|---|---|---|---|---|
| g_water/g_FW | 19.7 | 15.2 | 16.1 | 21.6 | 12.8 |
| FWg/m2/d | 98 | 316 | 318 | 226 | 412 |
| FW/SW | 4.1 | 9.8 | 9.8 | 7.0 | 11.3 |
| Harvest FWg/m2 | 883 | 2842 | 2858 | 2034 | 3294 |

-continued

|  |  |  |  |  |  |
|---|---|---|---|---|---|
| g_roots/g_FW | 4.4 | 2.0 | 1.8 | 2.2 | 1.6 |
| growth efficiency 1 (FW g/m2/d)/water loss (g WW/g FW) | 5.0 | 20.7 | 19.7 | 10.5 | 32.3 |
| growth efficiency 2 (FW/SW/m2/d)/WW/FW | 0.5 | 6.9 | 6.6 | 3.5 | 10.8 |
| Leaf width, mm | 9 | 15 | 15 | 8 | 18 |

The Hamama system produces substantially lower fresh weight to seed weight as compared to all methods of growing the GFY. The harvest FW/m² is also substantially lower in the Hamama system. The leaf width at harvest are substantially smaller in the Hamama and are comparable to the GFY grown without additional light.

The metric of grams of roots per gram of FW represents the non-useful biomass relative to the useful harvest. It is desirable to maximize the harvest product biomass rather than non-edible biomass. The Hamama system is less efficient and produces more roots than useful harvest as measured by Fresh Weight (FW).

It is generally understood that part of the advantage of the GFY system is the inclusion of nutrients whereas the Hamama does not appear to include nutrients (as determined by measuring the EC after setting the seeds which equals that of tap water used to set the seeds). Although a Hamama system could mix nutrient with the seeds inside the quilt, the method of setting the Hamama would leave the nutrient stagnant and on the seeds during germination. The flow method of the GFY system allows for adding nutrient which boosts growth without unduly stressing seeds, delaying, or inhibiting germination.

The growth rate in grams of FW/m²/day is higher in the GFY system under all cases. The growth efficiency-1 is defined by the fresh weight growth rate (g_FW/m²/d) divided by Water loss (grams_water/grams_FW or simplified as WW/FW) and is higher in the GFY system in all cases.

The growth efficiency-2 is defined by the fresh weight divided by the seed weight per m²/d divided by the water loss in grams of water lost per gram of FW at harvest. In all cases, the GFY system has a higher growth efficiency by this metric. The GFY system further produces more useful harvest fresh weight as noted with a lower ratio of grams of roots per grams of fresh weight metric.

For this experiment, the tests with the nutrient sprinkled on the top of the seeds (Units 7 and 8) outperformed the comparison (Units 4 and 5) that were grown under identical light box conditions and setup. It is theorized that the flow through or water push method to start germination acts to push most of the nutrient away from the seeds and into the reservoir, and hence does not create a penalty for starting with dry nutrient sprinkled on the seeds. It is also understood that some seeds are more sensitive to nutrient and salts during germination than other seeds.

An additional analysis was done to study the weight change in each system as a function of time. An estimated instantaneous change in weight (as measured in grams of weight lost) divided by the open surface area of the vessel (where evaporation can occur and is considered to be the full open area of either the Hamama vessel or the GFY bowl) divided by the time in hours (as taken between weight measurements).

The measure of the instantaneous change in weight in grams/m²/h is shown below.

| time, h | Hamama | Unit 1 | Unit 2 | Unit 3 | Unit 4 | Unit 5 | Unit 6 | Unit 7 | Unit 8 |
|---|---|---|---|---|---|---|---|---|---|
| 0.0 |  |  |  |  |  |  |  |  |  |
| 3.0 | 95.1 | 20.3 | 0.0 | 0.0 | 0.0 | 0.0 | 0.0 | 20.3 | 20.3 | 20.3 |
| 12.0 | 60.8 | 20.3 | 13.6 | 20.3 | 20.3 | 13.6 | 13.6 | 13.6 | 13.6 |
| 17.0 | 57.1 | 12.2 | 0.0 | 12.2 | 12.2 | 12.2 | 12.2 | 0.0 | 0.0 |
| 22.3 | 63.4 | 23.3 | 0.0 | 11.6 | 11.6 | 23.3 | 11.6 | 11.6 | 11.6 |
| 37.0 | 50.0 | 12.4 | 8.3 | 8.3 | 8.3 | 8.3 | 4.1 | 8.3 | 4.1 |
| 42.0 | 57.1 | 12.2 | 12.2 | 12.2 | 12.2 | 12.2 | 12.2 | 12.2 | 12.2 |
| 46.0 | 71.3 | 15.3 | 0.0 | 15.3 | 15.3 | 0.0 | 0.0 | 0.0 | 0.0 |
| 52.0 | 67.4 | 20.3 | 10.2 | 10.2 | 0.0 | 10.2 | 10.2 | 10.2 | 10.2 |
| 63.5 | 49.6 | 10.6 | 5.3 | 10.6 | 15.9 | 10.6 | 5.3 | 10.6 | 10.6 |
| 66.0 | 57.1 | 24.4 | 0.0 | 24.4 | 0.0 | 0.0 | 24.4 | 0.0 | 24.4 |
| 70.7 | 71.4 | 0.0 | 0.0 | 26.2 | 0.0 | 13.1 | 0.0 | 0.0 | 170.1 |
| 76.3 | 83.9 | 107.7 | 86.2 | 86.2 | 107.7 | 96.9 | 172.3 | 96.9 | 86.2 |
| 86.0 | 46.7 | 56.8 | 56.8 | 50.5 | 56.8 | 63.1 | 88.4 | 56.8 | 63.1 |
| 92.3 | 67.6 | 96.4 | 86.7 | 77.1 | 96.4 | 86.7 | 125.3 | 96.4 | 96.4 |
| 99.0 | 85.6 | 109.9 | 109.9 | 100.7 | 109.9 | 119.0 | 164.8 | 119.0 | 119.0 |
| 109.7 | 69.1 | 74.4 | 74.4 | 74.4 | 97.3 | 80.1 | 120.2 | 91.5 | 91.5 |
| 115.2 | 30.3 | 111.0 | 111.0 | 99.9 | 111.0 | 122.1 | 166.5 | 122.1 | 122.1 |
| 122.8 | 71.3 | 127.4 | 111.5 | 111.5 | 175.1 | 151.3 | 199.0 | 151.3 | 135.3 |
| 133.7 | 46.1 | 107.0 | 95.8 | 107.0 | 118.3 | 107.0 | 152.1 | 140.8 | 135.2 |
| 139.0 | 58.0 | 125.9 | 114.4 | 114.4 | 171.7 | 148.8 | 206.0 | 160.2 | 148.8 |
| 147.5 | 89.5 | 150.8 | 129.3 | 165.2 | 193.9 | 165.2 | 179.5 | 201.1 | 201.1 |
| 158.8 | 48.3 | 134.6 | 123.9 | 145.4 | 161.6 | 140.0 | 134.6 | 199.3 | 188.5 |
| 164.8 | 84.4 | 185.7 | 175.4 | 226.9 | 268.2 | 226.9 | 216.6 | 237.3 | 216.6 |
| 171.0 | 83.7 | 234.4 | 205.1 | 244.1 | 273.4 | 234.4 | 175.8 | 263.7 | 244.1 |
| 181.1 | 59.0 | 169.5 | 163.4 | 181.6 | 211.9 | 181.6 | 145.3 | 230.0 | 224.0 |
| 186.3 | 73.6 | 212.6 | 177.2 | 200.8 | 236.3 | 177.2 | 189.0 | 295.3 | 248.1 |
| 192.0 | 95.1 | 265.4 | 244.1 | 276.0 | 244.1 | 201.7 | 222.9 | 350.3 | 329.1 |

-continued

| time, h | Hamana | Unit 1 | Unit 2 | Unit 3 | Unit 4 | Unit 5 | Unit 6 | Unit 7 | Unit 8 |
|---|---|---|---|---|---|---|---|---|---|
| 195.5 | 88.3 | 226.7 | 191.8 | 226.7 | 261.6 | 191.8 | 156.9 | | |
| 205.5 | 57.1 | 183.1 | 170.9 | 189.2 | 219.7 | 189.2 | 128.2 | | |
| 210.0 | 74.0 | 244.1 | 217.0 | 257.7 | 271.3 | 203.5 | 176.3 | | |
| 214.0 | 118.9 | 320.4 | 381.5 | 366.2 | 274.7 | 244.1 | 228.9 | | |

All data show an effect where the change in weight reduces as the system is colder and picks up when the system is warmer. For a system that only loses water through evaporation, the normalized water loss rate in grams/m$^2$/h should be equal for all systems. Larger rates of water loss are due to greater transpiration losses which occur when there is more biomass resulting from a larger growth rate.

In the first three days, the Hamama system loses substantially more water with an average of 63.7 g/m2/h while the GFY loses between about 5 and 25 g/m2/h. After day 3, the Hamama average instantaneous weight change only increases slightly while the GFY system increases by more than two through the rest of the cycle. As the plants grow faster, they pull more water from the reservoir and transpire more for a greater instantaneous water loss.

| Weight change g/m2/h | Hamana | Unit 1 | Unit 2 | Unit 3 | Unit 4 | Unit 5 | Unit 6 | Unit 7 | Unit 8 |
|---|---|---|---|---|---|---|---|---|---|
| Average (t = 0 to uncover day 3) | 63.7 | 15.6 | 4.5 | 13.8 | 8.7 | 9.4 | 10.4 | 7.9 | 25.2 |
| Average (day 3 to harvest) | 71.5 | 162.2 | 151.3 | 165.1 | 183.0 | 156.5 | 167.4 | 175.7 | 165.6 |

Figure 18:
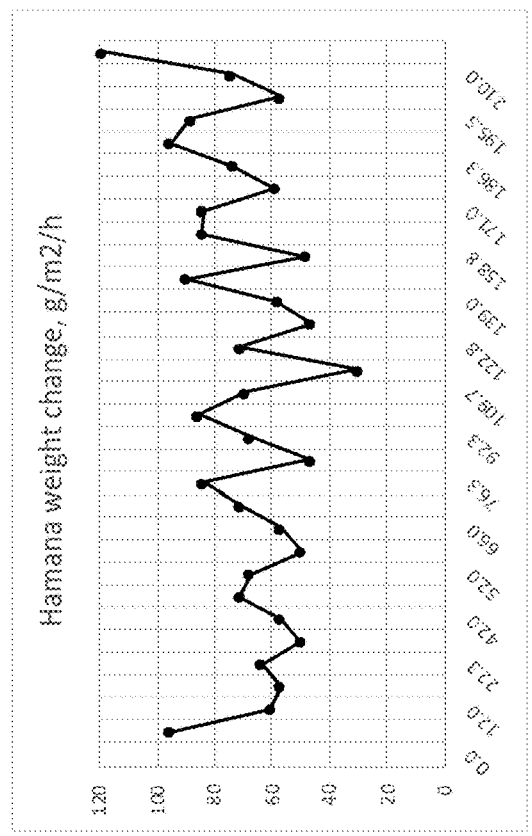
FIG. 18 shows a plot of Hamama instantaneous weight change in g/m$^2$/h vs time (in hrs) since setting the seeds.

Plot of Hamama instantaneous weight change in g/m$^2$/h vs time (in hrs) since setting the seeds is shown in FIG. 18, comparing the other GFY bowls (1, 2, and 3) in the GP2 enclosure (with Hamama). The results show a substantially larger instantaneous weight change in g/m$^2$/h and with higher fluctuations.

Figure 19:
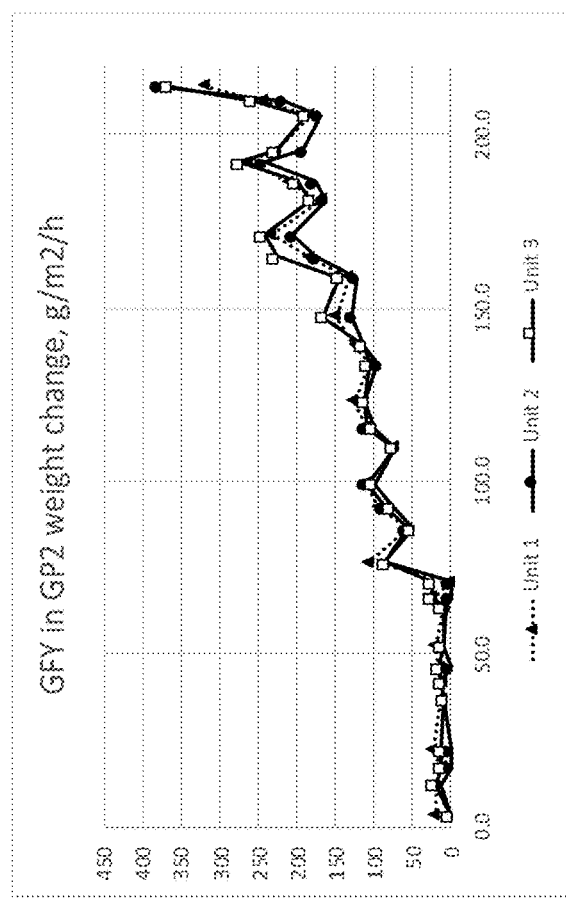
FIG. 19 shows plot of GFY instantaneous weight change in g/m2/h vs time in enclosure GP2.

FIG. 19 shows a plot of GFY instantaneous weight change in g/m2/h vs time (in hrs where t=0 represents seed setting with the addition of water). As seen, there is very little loss of water or weight change in the first three days when the GFY systems are covered as germination occurs. This is a distinct advantage for the GFY system to reduce water loss from evaporation before there is sufficient green biomass for photosynthesis which pulls water from the roots and where the leaves transpire.

Figure 20:
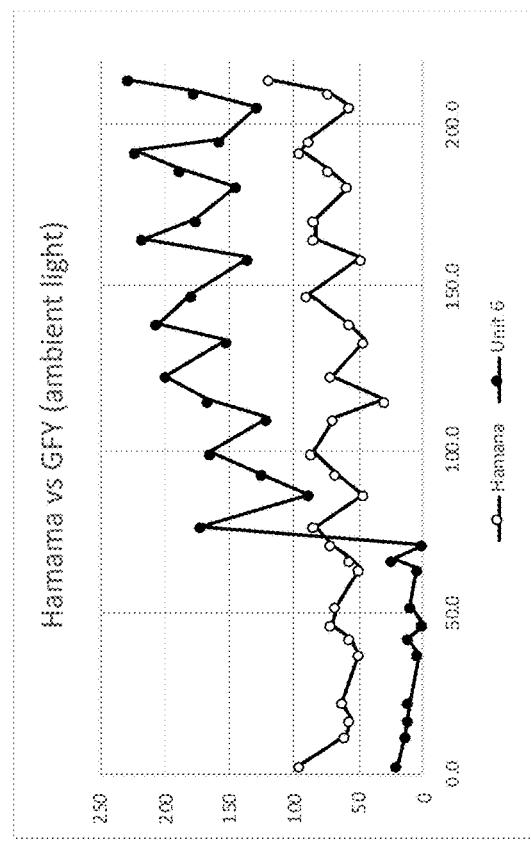
FIG. 20 shows the light boxes with fewer plants (GP1 and GP3) also had a larger instantaneous weight change than the Hamama system.

The light boxes with fewer plants (GP1 and GP3) also had a larger instantaneous weight change than the Hamama system as seen in FIG. 20. It is noted that samples 7 and 8 with the top seed sprinkle of nutrient were harvested after 8 not 9 days because they were fully grown, ready to harvest and water was low (about 20 grams of water remained). For this case, nutrient sprinkled on top of the seeds showed a higher growth rate. Data are plotted against time since setting seeds in hours.

Figure 21:
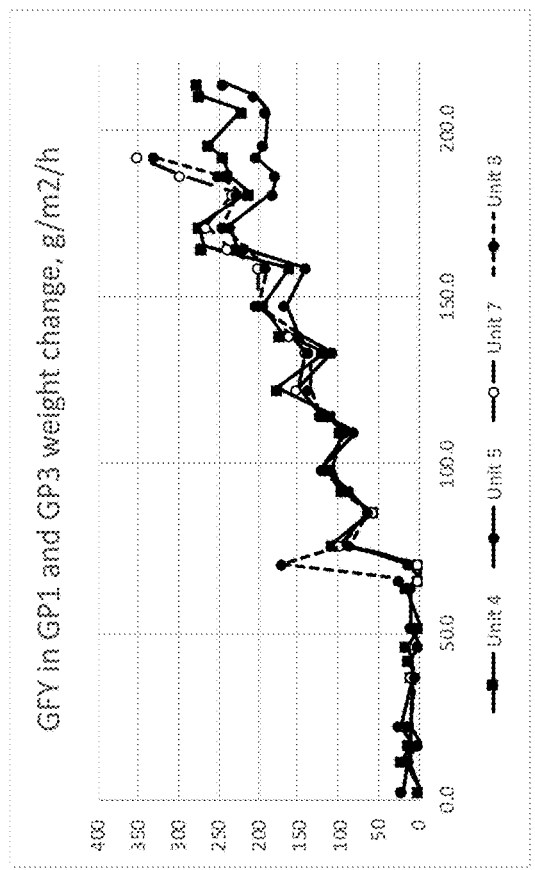
FIG. 21 shows a comparison of instantaneous weight change for the Hamama and GFY for the ambient light experiment.

A comparison of the Hamama and GFY results for the ambient light experiment is seen in FIG. 21. There is greater instantaneous weight change in the GFY, even without additional LED light. It is noted that a larger instantaneous weight change during the growing period when the plants are uncovered means a higher growth rate and higher productivity. A larger instantaneous weight change during the initial covered phase implies greater loss of water during evaporation.

Figure 22:
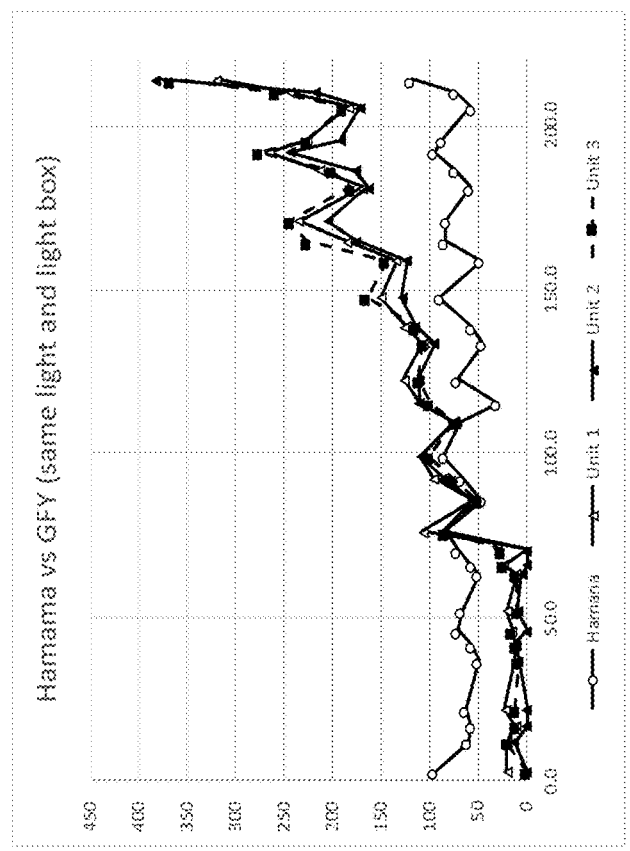
FIG. 22 shows a comparison of the instantaneous weight change for the Hamama and GFY under the same light and in the same light box.

Comparing all tests inside GP2 as seen in FIG. 22, shows that in the first 3 days there is substantially greater weight change in the Hamama, as water evaporates freely from the system. After three days when the GFY system is uncovered, the instantaneous weight change increases substantially in the GFY system reflecting higher growth and transpiration losses. Data are plotted against time since setting seeds in hours.

The GFY system is more efficient. The covered bowl during germination reduces evaporation water loss. Once the system is uncovered and plants are germinated, the instantaneous water loss is higher in the GFY system as more water is lost due to higher transpiration from the faster growing plants.

Further, the GFY system allows for sufficient nutrient to be added for a full growth cycle while setting the seeds without adversely affecting the germination due to the water push (also referred to as the pour or flow) method. This method removes or reduces the nutrient near the seeds during germination but retains the nutrient in a reservoir beneath the seed pad (e.g., toward the bottom of the glass bowl) such that growing roots find nutrients after germination.

Example 3

A series of trials were made using red cabbage seeds in both the GFY and Hamama systems. As background, the Hamama seed quilt is comprised of 16 separate seed cells. To better understand the differences between the GFY and Hamama systems, seeds (2.5 grams) were removed from four Hamama cells while leaving twelve cells undisturbed. These extracted seeds were sown in a GFY system using the standard GFY method of setting seeds as described in Example 2 and discussed in further detail below.

Next, four of the remaining twelve Hamama cells were carefully (surgically with an X-Acto knife) opened in one small section and nutrient placed inside the cells (on top of the seeds) to match the same nutrient in the GFY system. That is, the amount of General Hydroponics Maxi-grow 10-5-14 nutrient applied to each Hamama cell maintained the same ratio of nutrient mass to seed mass as that used for GFY system experiments in this example.

In parallel, four GFY bowls were set. Each square bowl was made of glass with a side width of 5.5 inches on top and taper to the bottom, which is about 3.5 inches square per side. It is understood that alternative dimensions for bowls can be used.

Three bowls were set with the standard GFY red cabbage seeds with a seed density of 3 grams per 4"×4" (10 cm×10 cm) seed pad. One of the four bowls used the 2.5 grams of seeds recovered from the Hamama seed quit, as described above. In all cases $\frac{1}{8}^{th}$ teaspoon of General Hydroponics Maxi-grow 10-5-14 nutrient was applied to the side of the seed pad, as described in Example 2. One of the standard GFY bowls was placed under a different light source (a 5 W red/blue grow light which was about 5" away from the grow bowl). All other bowls and the Hamama system were placed inside the grow box GP2. The grow box was mostly open, with aluminum foil covering just two sides (the short sides). The GP2 grow box has a 16"×12" growing area that is about 25 cm away from a 14 W LED light.

All GFY bowls were set with water pouring through the seed pad to push the nutrient into the bowl. The Hamama was set per instructions with water filling the container and the seed quilt gently pushed into the stagnant water.

All GFY bowls were uncovered after 3 days. Two of the Hamama cells were uncovered after 3 days (one of the two cells opened had nutrient added, while one did not), two additional cells were uncovered after 4 days (one of the cells had nutrient added, one did not), and the rest were uncovered after 5 days (including the final two cells that contained nutrient). The recommended time to keep the Hamama seed quilt covered is 5 to 6 days.

Temperature and humidity data were collected over 6 days after the bowls were first uncovered. Over this time period inside the grow box, the average relative humidity is 52.2% and the average temperature is 22.1 C. It is noted that even though the light box is less sealed than before (Example 2) the average humidity is slightly higher. The daily humidity in the room which contains the light box remains an average 42%.

the Hamama system loses weight fairly linearly. In contrast, the GFY system loses very little water in the first 3 days until the system is uncovered (this is consistent with Example 2 and all other experiments with the GFY system). It is advantageous to not substantially lose water during the germination phase due to evaporation so that water will be available later when the plants need water to grow and transpire. Further, if there is nutrient in the solution and water is evaporating before plants are growing the nutrient salt concentration will continue to rise. High salt concentrations are a known stress for plant growth although each particular plant will have its own limit.

After uncovering, the GFY system begins to lose weight as water transpires and evaporates. Near the harvest date the weight loss in the GFY system begins to accelerate (increasing slope of the % weight loss vs. time curve), indicative of increasing water loss due to plant transpiration, which correlates with a higher growth rate and an increasingly larger surface area of leaves.

Similar to Example 2, the Hamama system loses water fairly linearly. Meanwhile, the GFY loses very little water until uncovered, around hour 72. Note that the GFY weight change accelerates as plant growth increases in the last 24-72 hours before harvest. At 188 hours additional water was required in the dry Hamama system.

The GFY system consistently produces a higher fresh weight to seed weight ratio. The growth rate in terms of FY g/m$^2$/d is also consistently higher in the GFY system. The ratio of FW/SW per m$^2$ per day is also higher in the GFY system. Using two growth efficiency metrics, of FW g/m$^2$/d per g_water_consumed/g_FW and FW/SW per m$^2$/d per g_water/g_FW, the GFY system consistently outperforms the Hamama system.

|  | Hamana, with nutrient | GFY - 1 | GFY-2 | GFY-3 - under 5 W light | Hamama Seeds put into GFY system |
| --- | --- | --- | --- | --- | --- |
| Total weight change | 716 | 339 | 329 | 342 | 318 |
| Total water loss, g | 952 | 427 | 417 | 432 | 419 |
| Harvest FW, g | 75 | 34 | 33 | 35 | 33 |
| non FW weight increase, g | 161 | 54 | 55 | 55 | 68 |
| Additional water addded during run | 192 | 0 | 0 | 0 | 0 |
| hours from start when extra water added | 188 |  |  |  |  |
| Water remaining at harvest, g | 47 | 50 | 48 | 50 | 60 |
| g roots/g FW | 2.15 | 1.59 | 1.67 | 1.57 | 2.06 |
| SW | 7.5 | 3 | 3 | 3 | 2.5 |
| FW/SW | 10 | 11.33 | 11 | 11.67 | 13.2 |
| Water g/FW g | 12.7 | 12.6 | 12.6 | 12.3 | 12.7 |
| Number of growth days | 9 | 9 | 9 | 9 | 9 |
| Effective growing area, m2 | 0.03484 | 0.01032 | 0.01032 | 0.01032 | 0.01032 |
| growth rate g FW/m2/d | 239.2 | 366.0 | 355.2 | 376.7 | 355.2 |
| growth rate, (FW/SW)/m2/d | 31.89 | 121.99 | 118.40 | 125.58 | 142.08 |
| growth efficiency, gFW/m2/d/ (gWater/g FW) | 18.84 | 29.14 | 28.11 | 30.52 | 27.98 |
| growth efficiency-2, (FW/SW)/m2/d/(gWater/g FW) | 2.51 | 9.71 | 9.37 | 10.17 | 11.19 |

Even with the higher local humidity inside the grow box, the Hamama container ran out of water after 188 hours or 7.8 days. An additional 192 grams of water were added to the Hamama system to keep the plants alive. Previous runs have shown that if no additional water is added, the plants droop and stop growing. No additional water was required nor added to the GFY system during the 9-day growing cycle and each GFY bowl had remaining water at the time of harvest.

Figure 23:
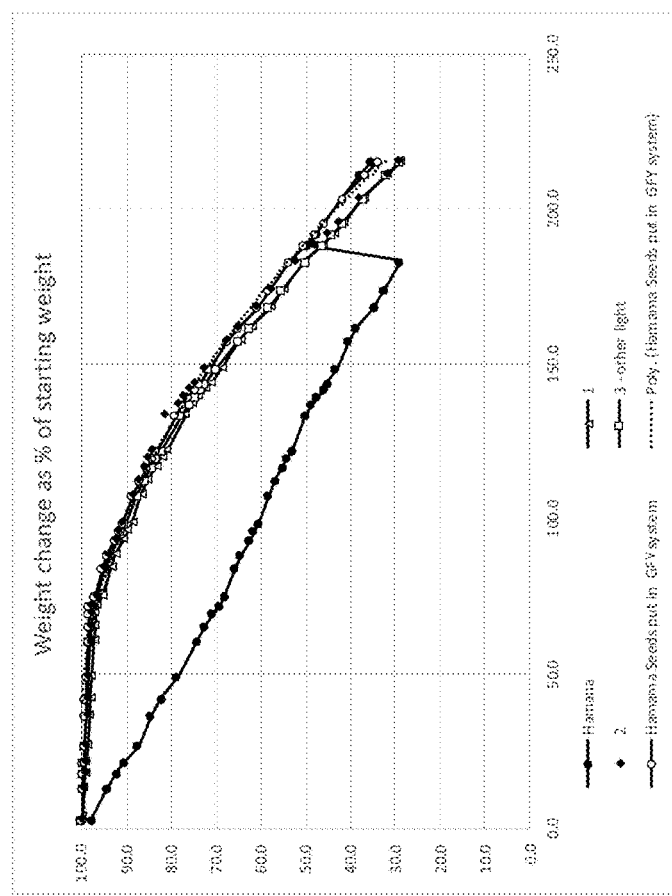
FIG. 23 shows the plot of percent weight loss as a function of time (in hours) since seed setting.

As can be seen in FIG. 23, the plot of percent of weight loss as a function of time (in hours) since setting the seeds, Consistent with the water loss data, the leaf width for the plants produced in the GFY system were larger than those produced in the Hamama system. It is desirable for the end user to have a higher fresh weight due to greens with larger leaves rather than longer stems.

The results from the experiment where Hamama seeds were placed in a GFY system are very similar to the results from GFY seeds placed in a GFY system—showing the improved performance that results from the GFY system itself. The differences between the GFY and Hamama systems are not due to the source of seeds.

| Days after uncovering | Hamama with Nutrient | Hamama without nutrient (but uncovered on day 3) | Unit 1 | Unit 2 | Unit 3 - other light | Hamama Seeds put in GFY system (+N) |
| --- | --- | --- | --- | --- | --- | --- |
| 2.00 | 9.00  | 9.00  | 14.00 | 14.00 | 14.00 | 14.00 |
| 3.00 | 9.00  | 11.00 | 15.00 | 15.00 | 14.00 | 15.00 |
| 4.00 | 11.00 | 13.00 | 17.00 | 17.00 | 15.50 | 17.00 |
| 5.00 | 12.00 | 13.50 | 19.00 | 19.00 | 18.00 | 19.00 |
| 6.00 | 14.00 | 17.00 | 21.00 | 20.00 | 18.00 | 20.00 |

It is noted that after 3 days covered, the leaves on red cabbage plants grown in the GFY system are larger than those grown in the Hamama system. The Hamama system has a confined cover that touches and holds the seeds in each cell. This confinement does not fully allow the seeds to expand and grow well during germination and thus reach their full potential size.

The Hamama seeds that did not receive nutrient but were uncovered after 3 days, in order to match the schedule for the removal of the humidity dome with the GFY system (recommended Hamama time is 5 or 6 days covered), grew larger leaves than nearby Hamama cells that contained nutrient and were also opened on the same day, as well those from cells opened on day 4 and 5. This said, in all cases, leaf sizes for plants grown in the Hamama system were smaller than those of plants grown in the GFY system, including aforementioned leaves on the cabbage plants uncovered in the Hamama system at day 3. This result supports the understanding that tight confinement of the seeds by the covering paper in the Hamama system is a contributing factor to lower growth and smaller leaves grown in a Hamama system as compared to those grown in a GFY system.

Next, the instantaneous weight change (in $g/m^2/h$) is plotted vs time (hours) for all 5 systems (four GFY systems and one Hamama system). There is very little water loss or weight change in the GFY system during the first three days because the GFY systems are covered with a humidity cloth (as described in Example 2). This is different than the instantaneous weight change profile of the Hamama system during the germination phase, where the Hamama system is losing water to evaporation during the first three days.

Following the initial germination period, the increase in weight change is larger for GFY systems than for the Hamama system because there is greater plant growth, and with that, greater loss of water due to plant transpiration. Meanwhile, the Hamama system continues to lose water due to evaporation and transpiration and the instantaneous weight change is lower than that of the GFY system. The lower instantaneous weight loss of the Hamama system supports the observations of smaller leaves and lower harvest weights for the Hamama system.

Figure 24:
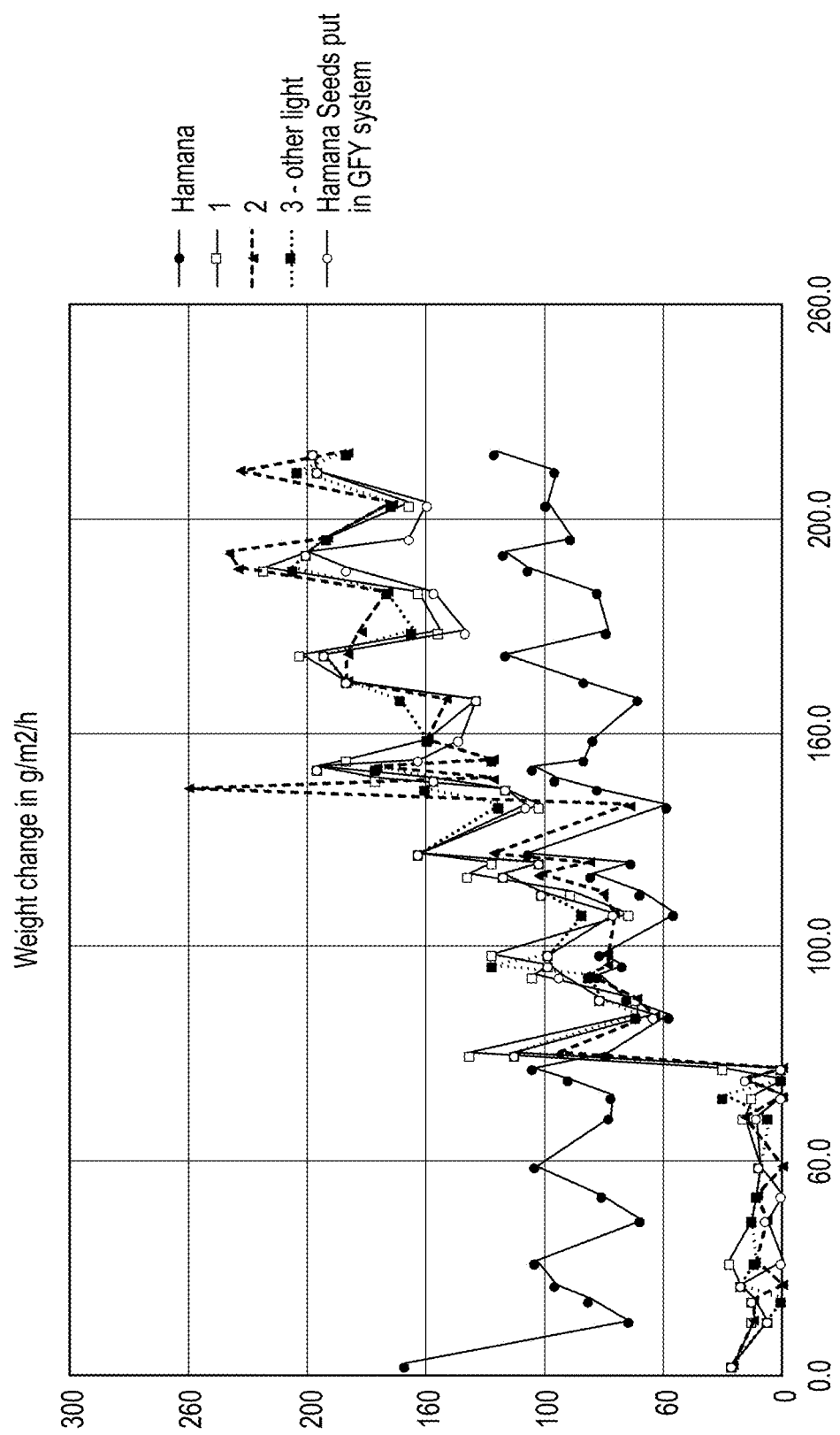
FIG. 24 shows a comparison of the instantaneous weight change for the Hamama and all GFY.

It is further noted that for all five systems a diurnal cycle can be seen. Specifically, plants lose less water at night (when the lights are off) in part due to higher local humidity and then lose more weight during the day (the light cycle is on for 16 hours and off for 8 hours) when photosynthesis and correspondingly, greater transpiration occurs. Data is plotted against time since setting seeds in hours as seen in FIG. 24.

Figure 25:
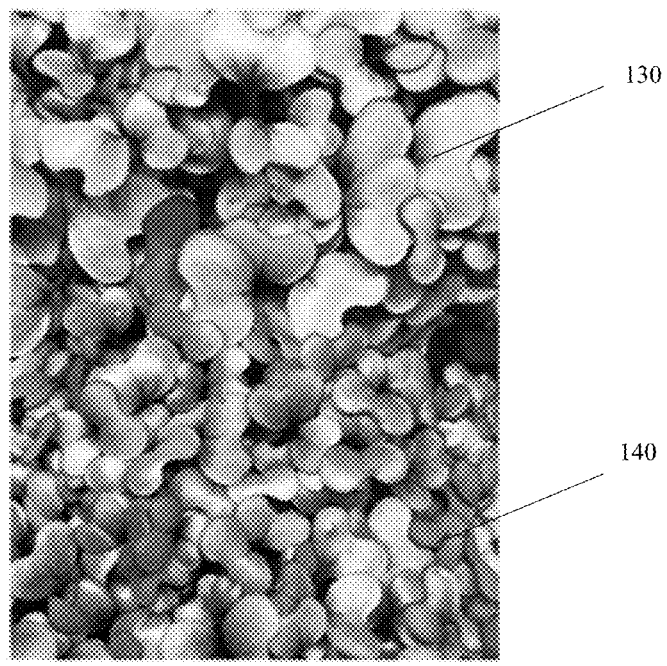
FIG. 25 shows a picture of the red cabbage leaves just before harvest with the larger GFY leaves on top and the smaller Hamama leaves on the bottom.

FIG. 25 shows a picture taken just before harvest of Example 3. The top half of the picture shows the larger red cabbage leaf width from the GFY system 130 and the bottom half of the picture shows the smaller leaf width 140 from the Hamama cells with equal nutrient. The larger GFY leaves can be seen in the top half of the picture and the smaller Hamama leaves are seen in the bottom half. The leaf width is larger for the same seeds (as removed from a Hamama seed quilt) when grown in the GFY system, suggesting that it is the GFY system, not the source of the seeds, that contributes to the larger leaf size in the GFY system.

In summary, this experiment tracked weight change (i.e., mass increase due to plant growth minus mass loss due to transpiration and evaporation), temperature, humidity, and leaf size versus time, allowing comparisons of:

Hamama seeds in a GFY system vs. Hamama seeds in a Hamama system

The influence of removing the upper restriction on seed growth in the Hamama system (the covering humidity paper in the Hamama system) at an earlier time, by uncovering cells at 3, 4 and 5 days in the Hamama system.

The influence of a different light source (a 5 W red/blue grow LED light) than the light used for Examples 1 and 2.

In all cases the GFY systems had larger leaves and weight changes consistent with the higher harvest weight as compared with the Hamama system. It is concluded from these experiments that the source of the seeds (GFY or Hamama) does not explain the superior performance of the GFY system, relative to the Hamama system. Different types of light can be used for the GFY system, where both a 14 W and 5 W red/blue LED were tested. The distance from the plants to the light source was reduced for the 5 W light and the growth rate was slightly larger. Adding nutrient to the Hamama cells did not replicate the superior growth in the GFY system. Therefore, the superiority of the GFY system is due to additional factors than just the type of light, seed source (GFY vs. Hamama-procured seeds), or the inclusion of nutrient in the Hamama system. One clue is that the non-nutrient Hamama cell harvested on day three grew larger than the other Hamama cells, suggesting that constraining the seeds during germination could be a contributing factor to the lower growth and smaller microgreen leaves observed in the Hamama system.

Example 4

Hamama seeds are constrained in three ways: from the top (due to the humidity paper used in the Hamama system to generate a mostly dark, humid region during the germination process) that mostly touches the seeds, the bottom (due to the relatively shallow box in which the Hamama seed quilt sits), and around the seeds (due to the high seed local density inside each cell of the Hamama seed quilt). In this example, experiments were performed to evaluate the impact of high seed density combined with the effect of no top constraint as in the GFY system or the closely covered (touching the seeds) humidity paper in the Hamama system.

Firstly, three GFY bowls were started on the same day to test the effect of a constrained top cover. For this test 10 grams of seeds were placed on a 10 cm×10 cm seed pad. After pouring water, the seed scraper removed seeds stuck to the capillary paper and push them on the seed pad. The plants were covered for 3 days and then uncovered, as shown in FIG. 26.

The bowl on the left was covered in exactly the same manner as the standard GFY system. In the middle bowl seeds were covered by and thus touching the Hamama humidity paper in a similar manner as the Hamama system, and then covered with the GFY humidity dome (i.e., the wax-infused cloth cover) was applied over the Hamama humidity paper and sealed at the top of the tall tray. The bowl on the right was covered only with the Hamama humidity paper (without the addition of the GFY humidity dome). All three bowls were uncovered after 3 days. The two semi-sealed bowls with the GFY wrap had excellent germination, while the seeds only covered with the Hamama paper were partially germinated and small. The unconstrained top from the fully GFY system shown (no Hamama humidity paper that touches the seeds) on the left had the largest plants at germination after 3 covered days.

Figure 27:
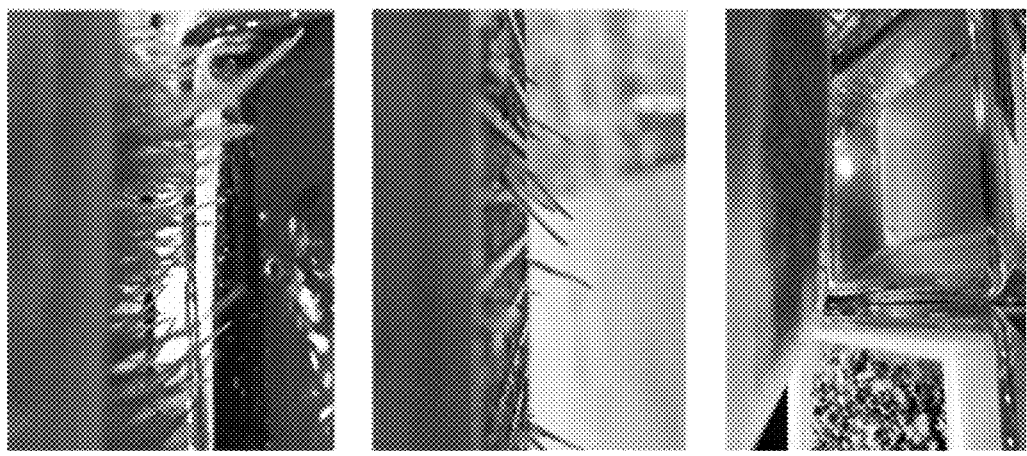
FIG. 27 shows the roots of the three systems from top to bottom as shown in FIG. 26 as seen from left to right are shown below just after uncovering. The top picture shows the GFY system with larger roots.
Figure 26:
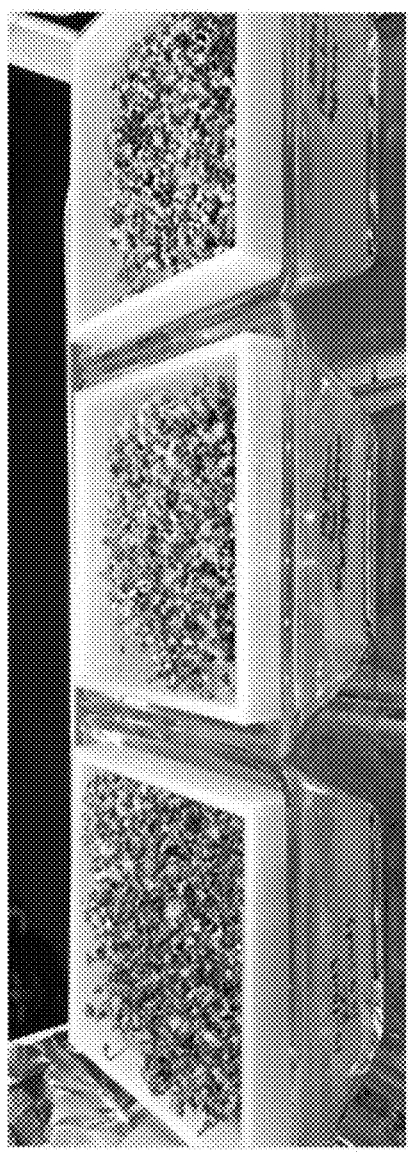
FIG. 26 shows as uncovered, three GFY bowls of red cabbage microgreens using just the GFY humidity dome (left), the GFY humidity dome over the Hamama humidity paper as it touches the seeds (middle) and just the Hamama humidity paper as it touches the seeds (right).

In FIG. 27, the roots of the three systems from top to bottom as shown in FIG. 26 as seen from left to right are shown below just after uncovering (each was covered for 3 days). The roots from the GFY system are also the largest and most healthy to support higher growth rates.

It is noted that when the Hamama humidity paper touches the seeds, it effectively allows less room for seed growth and root expansion during the germination process. As the seeds germinate, they swell and crack open to allow the radicle to emerge in search of water. The GFY humidity dome does not touch the seeds, which allows the seeds to expand, radicles to emerge and grow more freely, and roots to form and grow during and after the germination process. Meanwhile, prior experiments (e.g., Examples 1, 2 and 3) have shown that the GFY humidity dome (wrap) results in less water loss than only the Hamama humidity paper during the first three days of germination. It is also theorized that the humidity near the seeds is higher with the GFY system due to the lower water loss during germination and hence the air may be fully saturated or nearly so. Thus, both the higher humidity (afforded by the GFY humidity dome) and the space above the seeds positively improves germination and plant growth.

Figure 28:
FIG. 28 shows the bowls as seen in FIG. 26 after growing for 3 days under the light.

When the humidity coverings were removed after three days, the plants were left to grow. As shown after 3 days of growing under a 14 W LED light as seen in FIG. 28 the difference in growth is striking. The fully unconstrained seeds that germinated in the GFY system without anything touching the top of the seeds as seen on the left were larger than all others. The plants were harvested after 9 days (covered for 3 days and under light for 6 days). The harvest FW in grams was 74, 45, and 38 respectively for the three cases from left to right of 1) GFY only, 2) GFY wrap over the Hamama paper which touches the seeds, and 3) the Hamama paper only.

For the same seed source, nutrient amount, seed weight, and light experience, the GFY system produced nearly twice as much fresh weight (94% increase) over the system started only with the Hamama paper. The reduced constraint of a paper touching the seeds improved germination, growth, and harvest fresh weight.

It is noted that for this run with the higher seed density that the higher growth rate in the GFY-only system required additional water. It is anticipated that a deeper bowl with a larger reservoir would be sufficient for the higher seed density to avoid adding additional water before germination. For all cases, no additional nutrient was added beyond the starting ⅛ teaspoon dry on the seed pad before water is poured to start the germination process. It is also anticipated that the higher seed density could benefit from an increased amount of nutrient on the seed pad.

The unconstrained germination environment designed into the GFY system supports superior growth of stems and roots. The GFY humidity dome contributes to the superior performance of the GFY system (even when the Hamama humidity paper is touching the seeds, beneath the GFY humidity dome).

The other factor that could contribute to the superior performance of the GFY system is the depth of the container. A shallow container does not provide sufficient reservoir of water and nutrient for growth with a very high seed density and the shallow container could constrain root growth which reduces the overall harvest fresh weight (FW).

A first series of experiments were done with growth media placed directly on the bottom of petri dishes. By the very nature of these experiments, the roots are highly constrained by the plastic bottom of the petri dish immediately underneath the growth medium.

The petri dishes shown in the bottom part of the picture are 8 days old, two days older than the plants in the GFY bowls at the top of the same picture. The petri dishes were set with different seed densities (977, 595, 315, 110) g of seeds/m2, from left to right. Thus, the sample on the left contains roughly the same seed density as the GFY bowls visible in the same picture. Even though the cabbage in the petri dishes are two days older than the cabbage in the GFY bowls, the petri dish cabbage plants are substantially smaller in root size, leaf width, and stem length due to the constraints beneath the seed pad. Therefore, a shallow bowl or tray or tortuous root growth path beneath the seed pad may also slow plant growth and reduce harvest FW.

Example 5

To fully maximize plant growth, an example growth system could include a seed pad as described in previous examples, with a seed density ranging from 200 to 1500 g/m2 and nutrient added to each seed pad. This seed density is much higher than normally recommended or reported in the literature.

Reference values for microgreen seed density are noted below.
   https://www.johnny seeds.com/on/demandware.staticHLibrary-Sites-JSSSharedLibrary/default/ dwc5643d19/as sets/information/micro-greens-yield-trial-results-tech-sheet.pdf
   https://vtechworks.lib.vt.edu/bitstream/handle/10919/ 86642/Nolan FinalProject Hydrop onicMicrogreens.pdf?sequence=2

Johnny Seeds is a very well respected (a gold standard) source of seeds and growing information. To calculate the recommended seed density (g/m2) from the Johnny Seed's reference.
   Radish is 22.5 grams per 10"×20" (1020 tray) for a seed density 174 g/m2.
   Kale is 10 grams per 1020 tray for a seed density of 78 g/m2
   Red cabbage is 10.5 grams per 1020 tray for a seed density of 81 g/m2

The calculated growth rate of fresh weight FW g/m2/d for red cabbage is 130 g/m2/d, which is substantially below the GFY system (but similar to the Hamama system). Seed density as reported in the December 2018 study shows values less than about 100 g/m2.

The resulting seed pad sits in a non-tortuous straight-path mesh tray suspended over a reservoir. The reservoir may contain from about 200 grams to 2000 grams of water. The system is started by placing the seed pad in the tray and pouring water over seed pad such that associated nutrient is dissolved and drains into the reservoir below the seed pad. After the water is added to about the bottom of the mesh tray, the capillary wicking paper covering the seeds is removed to expose the wetted seeds to air. The bowl is then covered with a humidity wrap or dome which ensures that less than 5% of the starting water weight evaporates when covered. The wrap does not touch the seeds. The seeds are covered from 2 to 4 days or more depending on the selected seeds. After the humidity wrap or dome is removed, the system is placed under lights of at least 5 W and allowed to grow until harvest. Although the system is suitable for growing outdoors, if grown indoors at standard room temperature and humidity, the plants can grow for about 7 days following uncovering of the humidity dome, with no further addition of water. In one embodiment, the plants can grow from about 6 to 14 days without additional water after initial setting to start germination. It is noted that the bowls can be grown outside under natural or diffused natural light, but that higher evaporation may occur depending on the local temperature and relative humidity. For outdoor growth, additional water can be added more frequently. The user can observe the water level through the transparent bowl and add water up to but not exceeding the bottom of the mesh tray.

The amount of nutrient added to the seed pad may vary with the type of seed and may range from about 0.03 teaspoon to 2 teaspoons per 1000 g/m2 seed density or converted to a weight of about 0.2 grams to about 15 grams of nutrient per 1000 g/m2 seed density. A more preferred range is from about 0.3 to about 5 grams of nutrient per 1000 g/m2 seed density. The nutrient may be a dry general hydroponic growth media or equivalent nutrient for plant growth. The nutrient may be dry or a liquid that is first dried on the seed pad to create a dissolvable nutrient salt solution that drains into the reservoir beneath the seed pad. The resulting concentration of nutrient when added to the reservoir may be measured using EC, which will range from about 500 to 10,000 micro-Siemens/cm. Because the nutrient is pushed away from the seeds by the action of pouring water, the reservoir EC (below the seed pad) may be higher than what would otherwise be suitable if that measured concentration were instead maintained on the seeds during germination. More preferably, the range of EC is from about 1000 to about 7000.

The microgreen fresh harvest weight per 0.01 m2 pad surface area may range from about 10 grams to about 200 grams, only requiring water added once to the system (to start germination) for a range of average relative humidity from 15 to 60% (in an indoor environment).

In one inventive example, the reservoir can contain about 1200 grams of water at a depth of about 10 to 12 cm under a 10 cm×10 cm seed pad for an initial water weight of about 1200-grams. The initial EC is about 5000 microSiemens/cm after water is poured over the seed pad that contains a seed density of about 1000 g/m2. This configuration can produce about 100 grams of fresh weight harvest from a single bowl in about 6 to 10 days. In one example, after 9 days from setting red cabbage seeds, the growth rate is about 1000 gFW/m2/d. The growth rate per seed weight (FW/SW/m2/d) is about 100.

Example 6

Experiments were set with a larger bowl (glass, external square sides of about 15 cm and internal side length of 13 cm at the top and a taper to the bottom where the side dimension is about 10 cm, and an external height of about 12 cm and internal height of about 11 cm). The bowls when full of water hold approximately 1.2 to 1.3 L of water. Each was set with the GFY seed pad with either red cabbage or radish seeds with a high starting seed density and more water. No unit ran out of water during the run and could have continued growing for many more days. The GFY units were operated in a similar manner to Example 3, where light was provided by a 14 W LED on for 16 hours per day.

It is noted that Unit 2 of red cabbage was grown with a reduced distance from the bowl to the light to provide a higher light intensity. The distance to the light for this experiment was reduced to 15 cm (the other trials had a 25 cm distance to the light).

It was noted that during the covered stage (referred to the dark stage although it is recognized that some light may get through the cloth wrap), the seeds pushed up against the top of the cover due to the higher seed density. It is hypothesized that this stress effect during germination acted to slow the growth. It is also hypothesized that the level of nutrient was higher than anticipated and may have added stress to the plants.

Regardless, the total growth rate is higher than in previous examples and the water consumption in terms of grams of water consumed per gram of harvest fresh weight has been reduced. The Growth efficiency by both metrics (Fresh weight per m$^2$ per day divided by Water consumed/FW and Fresh weight per seed weight per m$^2$ per day divided by Water consumed/FW) have improved over earlier tests.

|  | Red cabbage Unit 1 | Red cabbage Unit 2 | Radish Unit 3 | Radish Unit 4 |
| --- | --- | --- | --- | --- |
| Seed weight, g | 8.2 | 8.2 | 8.2 | 8.2 |
| Nutrient weight, g | 3.78 | 3.78 | 3.78 | 3.78 |
| Water weight, g | 1200 | 1200 | 1200 | 1200 |
| Start time | Oct. 18, 2019 16:00 | Oct. 18, 2019 16:00 | Oct. 19, 2019 16:00 | Oct. 19, 2019 16:00 |
| EC at start | 5500 | 5500 | 5000 | 5000 |
| Uncover time | Oct. 21, 2019 11:30 | Oct. 21, 2019 11:30 | Oct. 21, 2019 11:30 | Oct. 21, 2019 11:30 |
| hrs dark | 67.5 | 67.5 | 43.5 | 43.5 |
| Harvest time | Oct. 27, 2019 16:00 | Oct. 27, 2019 16:00 | Oct. 25, 2019 15:30 | Oct. 26, 2019 14:30 |
| hrs light | 148.5 | 148.5 | 100 | 123 |

-continued

|  | Red cabbage Unit 1 | Red cabbage Unit 2 | Radish Unit 3 | Radish Unit 4 |
|---|---|---|---|---|
| Harvest FW, g | 63 | 71 | 117 | 141 |
| Water remaining, g | 486 | 461 | 555 | 360 |
| Water consumed, g | 714 | 739 | 645 | 840 |
| WW/FW (g/g) | 11.33 | 10.41 | 5.51 | 5.96 |
| FW/SW | 7.68 | 8.66 | 14.27 | 17.20 |
| area, m2 | 0.01032256 | 0.01032256 | 0.01032256 | 0.01032256 |
| Seed density, g/m2 | 794.4 | 794.4 | 794.4 | 794.4 |
| FW growth rate, g/m2/d | 678.1 | 764.2 | 1895.6 | 1968.9 |
| Fresh weight to seed weight growth rate FW/SW/m2/d | 82.7 | 93.2 | 231.2 | 240.1 |
| Growth efficiency 1, FW/m2/d/(WW/FW) | 59.8 | 73.4 | 343.9 | 330.5 |
| Growth efficiency 2, FW/SW/m2/d/(WW/FW) | 7.3 | 9.0 | 41.9 | 40.3 |
| Total days (from set to harvest) | 9.0 | 9.0 | 6.0 | 6.9 |
| EC at harvest | 6590 | 5683 |  | 5312 |

Example 7

The system as described in Example 6 where tall bowls were tested for other seeds (Kale, Broccoli, and Mustard) to confirm superior growth. All seeds grew well as measured by high growth rates, low water consumed per gram of fresh weight and high growth efficiency.

|  | Kale Unit 6 | Broc Unit 8 | Mustard Unit 9 | Mustard Unit 10 |
|---|---|---|---|---|
| Seed weight, g | 7.5 | 8.3 | 8.3 | 8.3 |
| Nutrient weight, g | 3.78 | 3.78 | 3.78 | 3.78 |
| Water weight, g | 1257 | 1147 | 1231 | 1200 |
| Start time | Oct. 22, 2019 11:00 | Oct. 22, 2019 11:00 | Oct. 22, 2019 11:00 | Oct. 22, 2019 11:00 |
| EC at start |  |  |  |  |
| Uncover time | Oct. 25, 2019 6:00 | Oct. 24, 2019 14:30 | Oct. 24, 2019 19:30 | Oct. 24, 2019 19:30 |
| hrs dark | 67 | 51.5 | 56.5 | 56.5 |
| Harvest time | Oct. 31, 2019 16:00 | Oct. 31, 2019 16:00 | Oct. 31, 2019 16:00 | Oct. 31, 2019 16:00 |
| hrs light | 154 | 169.5 | 164.5 | 164.5 |
| Harvest FW, g | 73 | 101 | 78 | 80 |
| Water remaining, g | 446 | 286 | 553 | 466 |
| Water consumed, g | 811 | 861 | 678 | 734 |
| WW/FW (g/g) | 11.11 | 8.52 | 8.69 | 9.18 |
| FW/SW | 9.73 | 12.17 | 9.40 | 9.64 |
| area, m2 | 0.01032256 | 0.01032256 | 0.01032256 | 0.01032256 |
| Seed density, g/m2 | 726.6 | 804.1 | 804.1 | 804.1 |
| FW growth rate, g/m2/d | 768.0 | 1062.6 | 820.6 | 841.6 |
| Fresh weight to seed weight growth rate FW/SW/m2/d | 102.4 | 128.0 | 98.9 | 101.4 |
| Growth efficiency 1, FW/m2/d/(WW/FW) | 69.1 | 124.6 | 94.4 | 91.7 |
| Growth efficiency 2, FW/SW/m2/d/(WW/FW) | 9.2 | 15.0 | 11.4 | 11.1 |
| Total days (from set to harvest) | 9.2 | 9.2 | 9.2 | 9.2 |
| EC at harvest | 7294 | 9870 | 6780 | 5427 |

Example 8

An experiment was run with an inverted glass bowl used as a humidity dome during germination as shown below over the tall bowls as described in Example 6.

Radish is well germinated in Unit 11 at 32 hours after starting the process with the addition of water. The top cover or humidity dome is an inverted shorter glass bowl (same cross section as the taller bowls described in Example 6 but 55 mm in external height and 50 mm in internal open height when inverted as a humidity dome) and shows the impact of internal humidity to aid the germination process. Condensation can be seen on the top and sides of the top bowl. Periodically there is an observation of small droplets falling to create a rainforest-like effect. It may be preferred to create or add droplet nucleation sites inside the humidity dome to better control or increase the rate of droplet formation and disengagement from the surface.

The growth performance was superior for radish seeds in comparison with Example 6 with the use of a lower nutrient starting weight. The data is included in the Example 9 summary table. The harvest density exceeds 10,000 grams of microgreens fresh weight per $m^2$ (11,915 $g/m^2$ as measured) and the ratio of root weight to harvest fresh weight is surprisingly low at less than 1 (0.667 as measured). The inventive system produces a high harvest or fresh weight and is more efficient by producing more edible product.

Example 9

An additional experiment was done using the same method to set seeds as described in Example 8. The light for Units 12 and 13 consisted of a 14W LED but the distance from the top of the mesh tray to the bottom of the light was about 14 cm. Unit 14 was grown for 1 day under a 14 W LED with a distance of 25 cm to the light and then moved outside to continue growing for 3 additional days under natural light. The bowl was placed outside in a fairly shady spot with about 3 hours per day of direct sunlight. Ambient outdoor temperatures ranged from about 50 F at night up to about 75 to 85 F during the day with about 10.5 hours of total daylight and about 15.5 hours from dusk to dawn. The outside relative humidity ranged from about 5 to 20% during the outdoor growth test.

The outdoor grown microgreens (Unit 14) grew worse than indoor grown greens, with a growth rate less than half. The roots were surprisingly small as well. Fewer hours of daylight and a shady spot along with lower local humidity may be contributing factors to lower growth.

about 1175 g of fresh weight harvest per $m^2$ of growing area per day. The harvest density was 10,365 $g/m^2$. The starting seed density was about 800 g/m2. The ratio of fresh weight to seed weight was about 13. Less than 8 grams of water were required per gram of harvest fresh weight. The data is included in the Example 11 table.

Example 11

The mesh trays were modified to conform to the inside of the tall bowls so that there was less open area for water evaporation. A square mesh tray with rounded corners of 129 mm per side was fit inside the 130 mm internal square dimension of the tall bowl as described in Example 6. The mesh region comprises a 15×15 array of 5-mm mesh square openings upon which the seed pad sits and through which roots grow to the reservoir beneath.

Prior to adding water, a second mesh tray (as described in Example 2) was inverted and placed on top of the opened seed pad. The capillary paper was removed before the second mesh tray was placed on the seed pad, and water was poured under a faucet to fill the bowl with water substantially flowing through the seed mat. The second mesh tray

|  | Radish Unit 11 | Radish Unit 12 | Radish Unit 13 | Radish Unit 14 |
| --- | --- | --- | --- | --- |
| Seed weight, g | 9.0 | 8.41 | 8.28 | 8.27 |
| Nutrient weight, g | 2.85 | 2.479 | 2.29 | 2.965 |
| Water weight, g | 1221 | 1207 | 1279 | 1324 |
| Start time | Oct. 26, 2019 8:40 | Oct. 28, 2019 13:30 | Oct. 28, 2019 13:30 | Oct. 28, 2019 13:30 |
| EC at start |  | 3850 | 3341 | 4026 |
| Uncover time | Oct. 28, 2019 9:50 | Oct. 30, 2019 16:00 | Oct. 30, 2019 16:00 | Oct. 30, 2019 16:00 |
| hrs dark | 49.17 | 50.50 | 50.50 | 50.50 |
| Harvest time | Nov. 1, 2019 15:00 | Nov. 3, 2019 14:00 | Nov. 3, 2019 14:00 | Nov. 3, 2019 14:00 |
| hrs light | 101.2 | 94.0 | 94.0 | 94.0 |
| Harvest FW, g | 123 | 111 | 97 | 46 |
| Water remaining, g | 586 | 602 | 673 | 888 |
| Water consumed, g | 635 | 605 | 606 | 436 |
| WW/FW (g/g) | 5.16 | 5.45 | 6.25 | 9.48 |
| FW/SW | 13.67 | 13.20 | 11.72 | 5.56 |
| area, m2 | 0.01032256 | 0.01032256 | 0.01032256 | 0.01032256 |
| Seed density, g/m2 | 871.9 | 814.7 | 801.6 | 800.8 |
| FW growth rate, g/m2/d | 1902.3 | 1786.0 | 1560.7 | 740.1 |
| Fresh weight to seed weight growth rate FW/SW/m2/d | 211.4 | 212.4 | 188.6 | 89.5 |
| Growth efficiency 1, FW/m2/d/(WW/FW) | 368.5 | 327.7 | 249.8 | 78.1 |
| Growth efficiency 2, FW/SW/m2/d/(WW/FW) | 40.9 | 39.0 | 30.2 | 9.4 |
| Total days (from set to harvest) | 6.3 | 6.0 | 6.0 | 6.0 |
| EC at harvest | 4727 | 3160 | 2745 | 4113 |

Figure 29:
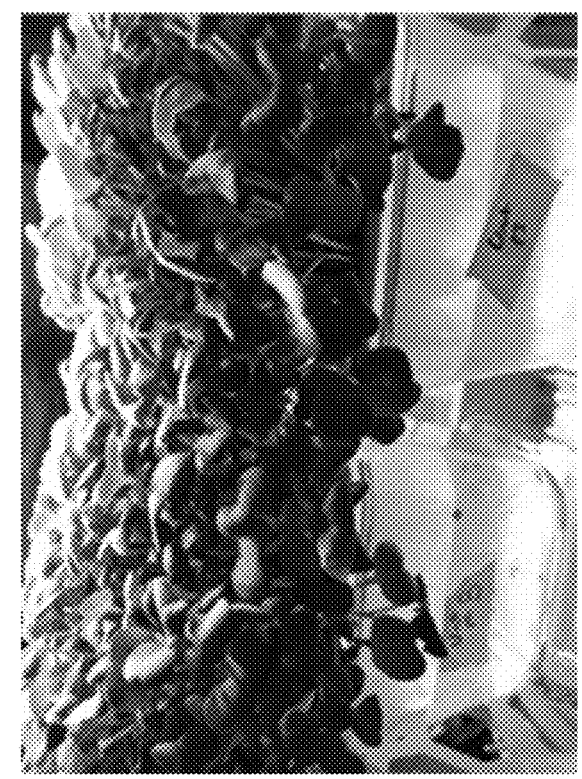
FIG. 29 shows exemplar GFY bowls from Units 12 and 13 as described in Example 9.

The roots in Unit 14 grown outside for 3 days prior to harvest were surprisingly small in comparison to similar units grown inside (Unit 12 and 13) for this experiment. It is noted that the tray does not conform well to bowl such that higher evaporation may occur. With that said, the water level in Unit 14 bowl grown outside is not below that of the greens grown inside in Units 12 and 13, which are shown in FIG. 29.

Example 10

Red cabbage seeds were grown in the tall bowls within an inverted glass bowl used as a humidity dome and as described in Example 8. The exemplar growth rate was acts to disperse and reduce the water intensity during filling to keep the seeds substantially on the fiber mat and avoid the need to remove and scrape the capillary paper for seeds after adding water. After filling the bowl with water substantially to the bottom of the mesh tray which is very close to the top of the tall bowl, the second mesh tray was removed, and the humidity dome added. The humidity dome was an inverted glass bowl as shown in Example 8. This method makes it easier to not overfill the water reservoir during setting and to wet the seeds and seed pad without overwatering to avoid leaving seeds drenched in standing water. It is recognized that the user may dump out a small amount of water and nutrient solution (less than about 10%) after filling.

The bowls (Units 16 and 17) were grown with Radish seeds under LED lights as described in Example 9 for Units 12 and 13.

The mesh tray substantially conforms to the inner hydraulic diameter of the bowl while creating a mesh region for roots to grow through and into the reservoir containing water and nutrient.

For the growth of radish microgreens in the exemplar system, fewer than 6 grams of water were required per gram of harvest fresh weight. For a seed density near 800 g/m2, the growth rate of fresh harvest is about 1670 g/m2/d. The ratio of fresh harvest weight to seed weight ranges between 12 and 15. The growth rate of FW/SW/d is greater than about 1.9 and about 1.9 to 2.5 for all radish grown in the tall bowls.

|  | Red Cabbage Unit 15 | Radish Unit 16 | Radish Unit 17 |
| --- | --- | --- | --- |
| Seed weight, g | 8.3 | 8.20 | 8.40 |
| Nutrient weight, g | 2.359 | 2.36 | 1.845 |
| Water weight, g | 1203 | 1200 | 1291 |
| Start time | Oct. 29, 2019 18:00 | Oct. 30, 2019 18:00 | Nov. 1, 2019 16:00 |
| EC at start | 3743 | 3500 | 2300 |
| Uncover time | Nov. 1, 2019 15:00 | Nov. 1, 2019 15:00 | Nov. 3, 2019 12:00 |
| hrs dark | 69.00 | 45.00 | 44.00 |
| Harvest time | Nov. 7, 2019 13:45 | Nov. 6, 2019 15:30 | Nov. 7, 2019 14:00 |
| hrs light | 142.7 | 120.5 | 98.0 |
| Harvest FW, g | 107 | 119 | 103 |
| Water remaining, g | 369 | 508 | 682 |
| Water consumed, g | 834 | 692 | 609 |
| WW/FW (g/g) | 7.79 | 5.82 | 5.91 |
| FW/SW | 12.97 | 14.51 | 12.26 |
| area, m2 | 0.01032256 | 0.01032256 | 0.01032256 |
| Seed density, g/m2 | 799.2 | 794.4 | 813.8 |
| FW growth rate, g/m2/d | 1174.9 | 1671.8 | 1686.4 |
| Fresh weight to seed weight growth rate FW/SW/m2/d | 142.4 | 203.9 | 200.8 |
| Growth efficiency 1, FW/m2/d/(WW/FW) | 150.7 | 287.5 | 285.2 |
| Growth efficiency 2, FW/SW/m2/d/(WW/FW) | 18.3 | 35.1 | 34.0 |
| Total days (from set to harvest) | 8.8 | 6.9 | 5.9 |
| EC at harvest | 2596 | 2830 | 1975 |

The use of the new conforming tray and inverted bowl cover as shown in this example, produced similarly high growth rates and low water usage as those in Units 12 and 13 as described in Example 9. It is theorized that the conforming mesh tray will help reduce water usage when growing microgreens outside where humidity may be lower or temperatures higher than inside.

Example 12

Alternate Method of Growing Plants with Limited Water and Easy Germination

Seed mats are assembled with grow media in series with nutrient placed between or alternatively nutrient added to the top of the grow mat away from the seeds. Seeds are placed on top of the second media followed by a capillary paper. Water is poured over the capillary paper. The container is covered with a wrap or humidity dome for 3 to 7 days to allow germination to occur. No additional water is needed during germination. The bowl is placed under a light after the wrap is removed. As shown below (from left to right): Romaine, Thai Basil, Arugula. These plants consume water for transpiration and some evaporation loss. Roots grow into the water. The plants will be allowed to grow to a mature size (more than 5 cm and more than 10 or 15 cm preferred) before harvests can start. Harvests will be partial, whereby outer leaves are cut for leafy greens (Romaine and Arugula and also dill) while cuts for basil and other herbs is made above a node to allow regrowth.

It is anticipated that these plants will grow and continue to produce multiple harvests such that the plants live and produce for least 8 weeks with 12 to 26 weeks possible. There is enough nutrient added in the seed mats to allow growth for 8 to 26 weeks but not so much nutrient that the salt concentration is too high to allow growth. The plants may continue to grow in the jar containers or may be transplanted outside into a deep water hydroponic or bucket growing system.

Each seed mat (different seeds) will have different amount of nutrient as some seeds/plants need more or less and some are inhibited with more or less nutrient. A range of EC can be defined such that the EC (electrical conductivity) in the reservoir is at least 1500 after water is added and can range from 1500 to about 8000 (micro-Siemens/cm) at the start of the growth cycle. EC is higher than tap water due to the inclusion of nutrient in the seed pad which dissolves as water is poured and falls with water into the reservoir contained beneath the seed pad. With time, the EC will change due to two effects. As nutrients are taken up by the plant, the EC which reflects the amount of nutrient will reduce as it is consumed by growing plants. Meanwhile, as water evaporates, salts will increase thereby increasing EC. The actual EC during the full growth cycle will range from about 1000 to 8000 (micro-Siemens/cm).

Figure 30:
FIG. 30 shows an alternate method of easy plant growing using mesh pots and a smaller seed pad.

When the water level drops to less than half, or about from 1 cm above the bottom of the bowl to about half, additional water can be added. The mesh pot or any other tray can be lifted slightly to accommodate water addition. Alternatively, water can be added near the root zone inside the mesh pot and will drain through to the reservoir below. As water is added near the top, it flows over any undissolved nutrient from the original seed setting process to add additional nutrient for continued growth as shown in FIG. 30. Plants growing to mature stage for larger leaves and multiple partial harvest are shown. The pictures are taken a week apart (and some of the containers were rearranged to put the plants in descending height). As shown on the right picture (from left to right) are Romaine, Arugula, and Thai Basil.

Example 13

Additional Element to Reduce Labor for Easy Growing—Tray Bales

Small tabs with two y-ends or open ends are used such that they create a tray assembly whereby a mesh tray is held above a second solid bottom tray for easy growing microgreens or other plants through the use of the inventive device, the Tray Bale. After setting the seeds, the roots grow through the mesh tray and into the nutrient-water below the mesh tray. The user only needs to add water at the time of setting before a harvest. After setting, the tray is preferably covered with a third tray (inverted tray, preferably solid and only used during germination) to reduce evaporation loss and keep a dark environment for seed germination. After germination, the top tray is removed and the 10"×20" (e.g. 1020) tray assembly is kept under light until the plants are ready to harvest.

Similar to the other GFY systems, water is added before germination and is sufficient until harvest. The user does not need to add water daily either from the top or bottom of the reservoir, nor does the user need an expensive watering system that can break, leak, or internally grow unwanted biofilms that are difficult to clean. Roots grow through a fibrous grow mat and through a supporting mesh into the water-nutrient reservoir.

In one embodiment, the user adds about 1.5 gallons of nutrient filled water to the bottom reservoir at a concentration of about 1 tsp of nutrient per gallon of water. After the top mesh tray that holds the grow medium and seeds is placed on top of the bottom reservoir and held using the inventive Tray Bales, then the seeds may be wetted using a spray bottle or spritzing method. Alternatively, the user could pour the water with optional nutrient over the seeds during the seed setting process. The user may choose to spritz again on a second day. No further water is added and growth proceeds until harvest. The seeds must be wetted to start the germination process, but they must not be sitting in standing or pools of water else they will have insufficient oxygen to germinate and might mold. The most optimal water height when setting the seeds is just to the bottom of the top mesh tray in the inventive tray assembly.

The Tray-Bale method was used to grow the Big Radish tray in the data set comparing the Hamama and GFY square bowl method as presented in Example 1.

Figure 31:
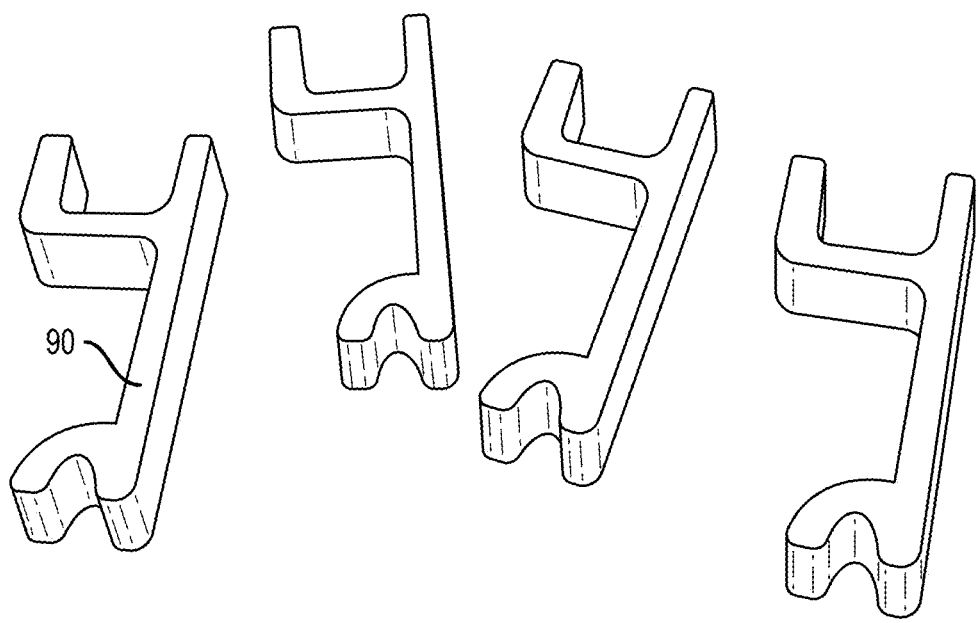
FIG. 31 shows a Tray Bale which is used as an interconnect between two traditional nested microgreen 10×20 trays so as to keep the trays separated during the microgreen growth cycle.
Figure 32:
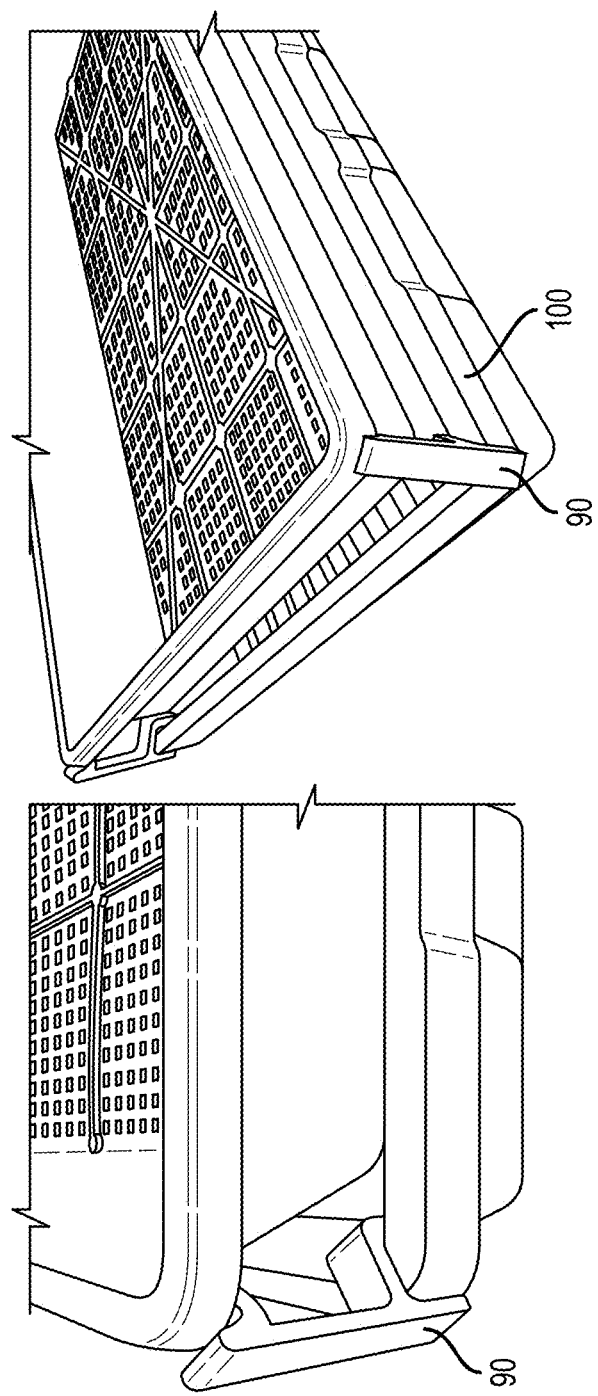
FIG. 32 shows four Tray Bales placed in the corners as shown to hold up the top tray so as to create a reservoir or bowl to hold water and nutrient during a growing cycle to avoid daily watering and to create more space for root growth which improves harvest fresh weight (FW).

Picture of Tray Bales 90 are shown in FIGS. 31 and 32 where 4 or more are added to hold a mesh tray above a solid tray 100 such that daily watering is eliminated. The Tray Bales have open ends to allow for a nested assembly of trays. The larger square shape end fits over the corner of the 10×20" bottom tray to create a snug fit. The other end is v-shaped such that the lip of the top mesh tray fits in a snug manner inside. The assembled tray can be shaken to ensure stability so that it won't easily fall down.

The Tray-Bales 90 as shown were made from plastic (PLA, HIPS, ABS, or other) by 3-D printing. They could be made by molding or any other manufacturing process. The Tray-Bales can be washed after use and re-used tens to hundreds or more times. For the Tray Bales as shown, about 1.5 gallons of water (with nutrient) are contained in the reservoir beneath the mesh tray. Growing media such as a porous or fibrous grow mat such as made with hemp, bamboo or other material or loose coco coir or granulated soil as formed into a layer can be placed inside the mesh tray. Seeds are placed on top of the growing media and fully wet to start germination but are not kept in standing water. Roots grow through the mesh tray into the reservoir to avoid daily or other cycle of watering. The user sets seeds at the start, uncovers a blackout tray (such as an inverted tray, preferably solid, as placed on top) after germination in 2 to 4 days and then keeps the tray under light until harvesting microgreens.

For the exemplar data described as Big Radish in the Example 1 table, the inventive tray assembly had the following dimensions. The total height of each standard 1020 tray is 60.3 mm. The thickness of the tray material is about 1 mm. The internal height of the bottom (solid bottom) tray is 59.3 mm. The standard 1020 tray (as one can purchase on Amazon or a hydroponic store) has a bottom partial raised section of 6 mm height to create channels that allow water to spread throughout the tray. The total open height in the bottom tray when accounting for the standard internal channels in the bottom tray is about 53.3 mm. For prior art application of two nested trays (mesh tray inside of the solid bottom tray), the mesh tray rests on top of the internal channels thus leaving a modest about 6 mm space or opening between the two trays and this opening is only present for a portion of the nested assembly. Part of the nested assembly has about 0 mm open space due to the mesh tray sitting on the ridges or channel tops found at the bottom of the bottom tray. In the inventive tray assembly, four Tray Bales are used (one at each corner) to create a gap to allow the bottom tray to hold standing water and nutrient sufficient for the microgreen growth trial so that daily watering is not needed. The roots continue to grow unabated into the open plenum that is now held between the two trays. For the example results as described in Example 1 in Big Radish, the total mesh assembly has a height of about 103.2 mm. The open gap or plenum between the bottom of the top mesh tray and the bottom tray is defined as the difference in the total inventive assembly of about 103.2 mm subtracted by the total height of the mesh tray of about 60.3 mm subtracted by the about 1 mm of tray thickness for about a total 41.9 mm. The open gap or plenum between the bottom of the top mesh tray and the top of the internal channels in the bottom of the bottom tray is about 35.9 mm. This open plenum or gap for growing is maintained by the use of the inventive Tray Bales. It is recognized that the Tray Bales could be made slightly smaller or larger to create a gap or open plenum for enhanced growth and reduced water addition for this application. The range of open gap for the tested example as defined from the bottom of the top tray and the internal top of the bottom tray is about 35.9 mm for the inventive tray assembly. The range of allowable open gaps or plenum is from about 5 mm to about 60 mm. A preferred range of open gap or plenum is about 10 mm to about 55 mm. A more preferred range of open gap or plenum between the trays in the inventive tray assembly is about 30 to about 50 mm. It is desired to keep the top mesh tray nested slightly into the bottom tray during operation to reduce open surface area for evaporation and thereby allow the inventive process to operate without the need to add water daily. It is recognized that the user can add water, but the process does not require daily water addition.

The Tray Bales are placed in each of the four corners of the tray to maintain the open gap and create a stable assembly during operation. It is not desirable for the Tray Bales to fall over during operation and hurt the greens or create a mess. The U-shape or more rectilinear bottom of the Tray Bale has an open dimension of about 13 mm. The standard 1020 growing trays have a lip with corners that flair slightly in thickness. The top thickness of the lip around the standard tray in the corner is about 9.7 mm and the bottom width of the lip around the tray is about 14 mm in the corners. The opening of the tray bale at about 13 mm allows it to easily slip over the top of the about 9.7 mm corner and then pinch the plastic mesh lip which has a non-pinched width of about 14 mm. The net result is that the Tray Bale sits up on the corner without falling over for easily assembly. Four Tray Bales are placed such that one in each corner before the top mesh tray is added to the inventive tray assembly. The height of the outer lip or overhang on each standard 1020 tray is about 14 mm. Away from the corners, the bottom width of the top lip of the standard 1020 tray is about 12.6 mm so that the 13 mm opening at one end of the Tray Bale is larger and will not pinch to create a snug fit. The sizing was created to follow the theme of lean manufacturing poka-yoke so that the user could only place the four Tray Bales in the corners where they are designed to go. It is recognized, that the inventive assembly could be created with alternate sized features on the U-shape bottom so that the Tray Bales could pinch along the sides of the 1020 bottom tray but the user would need to be more thoughtful about where they are placed so as to balance the trays for stability in the inventive tray assembly.

The other end of the Tray Bale is designed with a v-shape so that the mesh tray which also contains a lip can easily fit within the v-shape. Given manufacturing tolerances the v-shape was selected for ease of assembly so that the lip of the top mesh tray could rest inside the v-shape even if it did not exactly touch the bottom of the v-shape. The total part height is 53 mm or preferably in the range of 30 to 80 mm. The height of the open section in the U end (approximately square-shaped end) that fits on the bottom tray is 13 mm or preferably in the range of 5 to 25 mm or 10-15 mm. The height of the v-shape where the mesh tray will nest is 5 mm or preferably in the range of 3 to 15 mm, or 3 to 10 mm. The top opening of the v-shape is 6 mm preferably in the range of 2 to 15 mm or 3 to 10 mm. The width of the Tray Bale part is 9 mm preferably in the range of 3 to 20 or 5 to 20 mm throughout the part. The thickness of each straight section of the part is 3 mm. The distance from the bottom of the v-shape to the top of the U-shape is 35 mm preferably in the range of 10 to 100, 20 to 70, or 30 to 50 mm. It is recognized that other dimensions could be used for the Tray Bales so that the open plenum filled with water and optional nutrient wherein root growth occurs for microgreens growing in the top tray in the inventive nested tray assembly is between 5 and 60 mm with the preferred range from about 10 to 55 mm. If there were larger or taller standard trays available, then the range of open plenum or gap for root growth could be increased but only to a distance that allows a nesting of trays so that the bottom of the top tray does not exceed the top of the bottom tray.

It is advantageous to reduce time watering plants (e.g. daily task) or adding an expensive self-watering system with lines, timers, and nozzles. Watering lines from a pump system need to be cleaned and can be a source of biofilm. The user can set and forget the system until harvest.

The inventive grow kits described herein allow the user to add water during setup and avoid any daily maintenance or watering while also avoiding costly pumps, tubing, timers, nozzles etc. for delivering water and nutrient to plants. The user only needs to clean the reservoir after use and can recycle any remaining water. For a traditional microgreen farm with commonly used 10×20 trays on racks, the labor savings can be tremendous. Typically, after seeds germinate, a microgreen farm requires labor to ensure the microgreens are watered (or if an automatic watering system is used—at extra capital cost—downtime is needed occasionally to clean the automatic watering system). With Tray-Bales, traditional microgreen farms need only to conduct a cursory visual inspection (which takes seconds per tray) during the period between germination and harvest.

Example 14

In one embodiment, the seed pad is set on a mesh tray and a removable frame part or parts also called a bumper or bumpers are placed around the seed pad during the seed setting step to assist the water corral. The removable bumper(s) may optionally be flexible or bendable such that they create a partial or whole picture frame around the seed pad when water is added to start the germination process. Flexible bumper(s) may be adjusted to be slightly smaller or larger to accommodate tolerance in the outer dimension of the seed pad. When the paper wrap opens up to form a bowl, the bumper(s) help to hold open the corral. Water is added or poured on top of the seed pad and the paper bowl or corral helps to guide the water to flow through the seed pad and into the reservoir below. The additional temporary frame or bumper helps to keep the water flowing through the seed pad such that it can wet the seeds and dissolve the nutrient into the reservoir beneath the mesh tray. After the water is poured as noted by reaching near the bottom of the mesh tray, or at the bottom of the mesh tray, or at a height along the length of the mesh tray, or even overflowing the bowl, then the removable bumper is removed and stored for future use. The capillary paper is removed from the seeds. The paper bowl is also torn away leaving the fully wetted seed pad sitting on top of the mesh tray just inside the first bowl. A second bowl is then inverted and placed on top of the second bowl to create a humidity dome throughout germination. In a preferred embodiment, the first and second bowls are transparent so that the user can watch germination progress without needed to reopen the system to take a look at the seeds under an opaque or semi-opaque cover.

Figure 33:
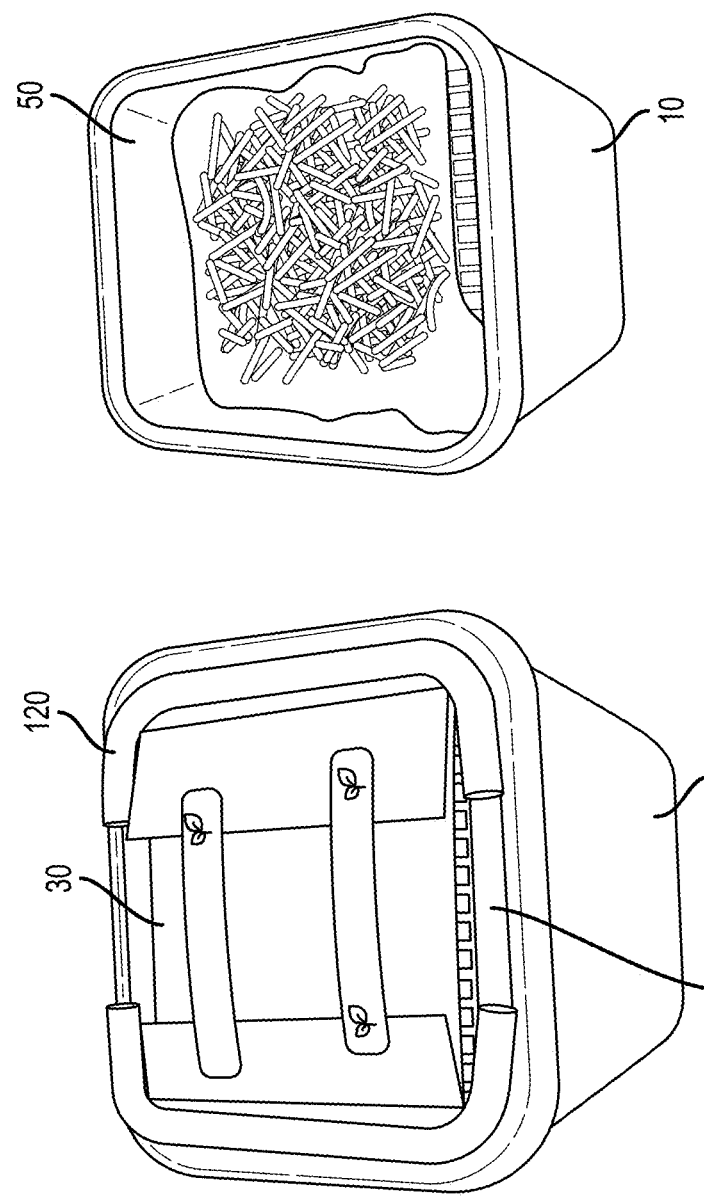
FIG. 33 shows the seed pad sits atop a mesh tray that fits inside a reservoir.

As shown in FIG. 33, the seed pad 30 sits atop a mesh tray 20 that fits inside a reservoir 10. The system may be placed inside a sink for easy access to water from a faucet to set the seeds in one embodiment. Two temporary bumpers 120 are placed around the edge of the seed tray to assist with holding the corral in place as water is added. Each bumper 120 as shown is 7-in long and is bent into a c-shape to partially encircle the seed pad. The seed pad as shown has two labels that are removed prior to adding water. The brown paper is opened up slightly to create a corral for water. Water is added through the faucet and is poured over the seed pad to fully wet the seeds and to dissolve the nutrient into the reservoir below the mesh tray. After water fills the reservoir, the bumpers are removed along with the paper wrap and the capillary paper to expose the wetted seeds to air. The second bowl is inverted and placed on top of the first bowl to create a humidity dome 50 with sufficient head space for good germination. For Broccoli as shown, the second bowl remains on top of the first bowl for about 3 days. When removed the open first bowl 10 with germinated seeds is placed under a light source and allowed to grow without any additional water needed before harvest.

Example 15

Figure 34:
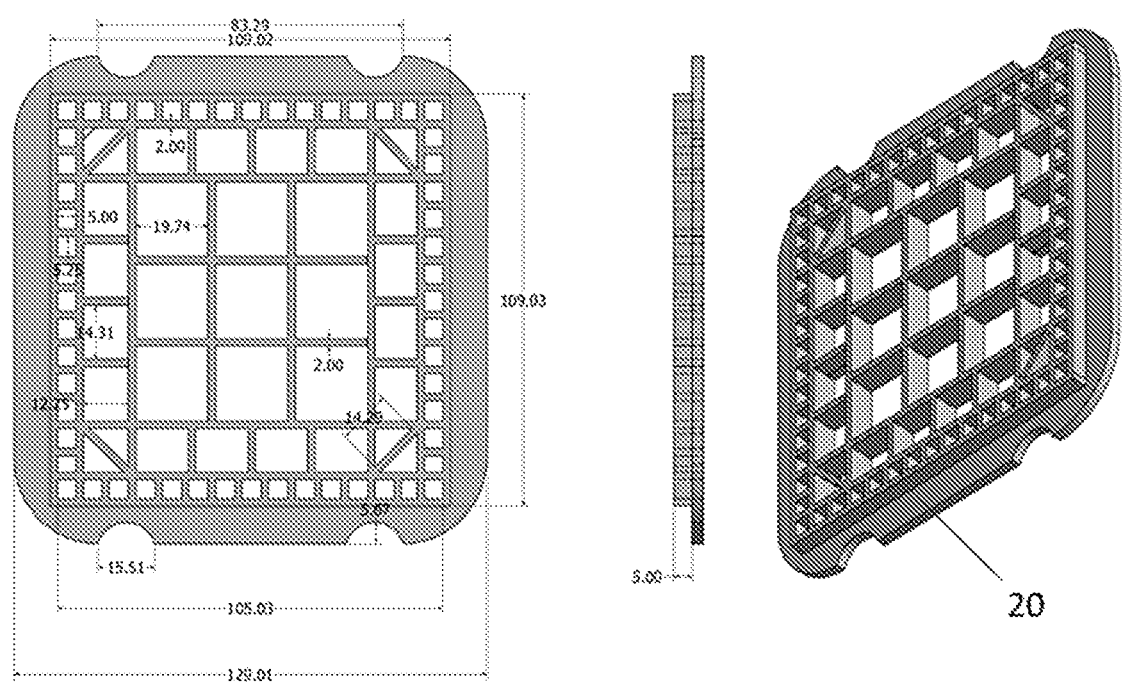
FIG. 34 shows the raised tray as demonstrated in Example 15. All dimensions are in mm.

The tray was modified to reduce the amount of material, improve the ease of use when applying the initial charge of water, and to improve the growth rate per area per time. The tray is designed with at least a first base height and second raised height, whereby the second height is taller than the first. The second height is placed away from the edge of the tray on at least a portion of at least one side. The raised second section acts to keep the seed pad above the height of the bowl so that when water is added, the seed pad cannot receive too much water, which can inhibit seed germination. The raised mesh tray 20 is shown in FIG. 34.

For the experiments as run, the first base height of the tray is 3 mm and the second base height is 8 mm which includes 3 mm of base height and 5 mm of a raised second height so that the top of the tray sits above the plane of the bowl in which it is placed. The bowl dimensions in which the tray is placed are described in Example 11. Dimensioned drawings of the inventive tray are included, where the inner part of the tray includes 9 rectangles with a side of 19.74 mm. There are 20 intermediate rectangles with dimensions of 12.25 mm by 14.31 mm. The corner rectangles include a cross bar to keep the edge of the hemp seed mat from drooping into the tray. The final third and smallest array consist of 56 rectangles, each of 5 mm×5.25 mm. The smallest apertures comprise a partial open region that extend beyond the area covered with the seed pad. The partial open region on the side of the smallest apertures helps to provide additional drain area for water when setting the seed pad.

The trays also include 4 partial ellipses on the edge to make it easy to remove the tray when the growth cycle is complete and serve as a means for overflow water to drain either back into the bowl or over the side when setting the seed pad.

The central region of the tray has larger apertures to allow more room for root growth. For mechanical stability of the tray, three primary types of apertures are included. It is understood that alternative inventive combinations are allowed that maintain an open area for root growth greater than 50% beneath the seed pad.

A raised tray was designed and tested to improve ease of use and it surprisingly improved the growth rate. The tray with at least two heights also proved to be more resilient to warping. The flat trays when shipped without appropriate support or after extended use and cleaning in very hot water can bow or lose flatness which reduces effectiveness for growing greens.

Figure 35:
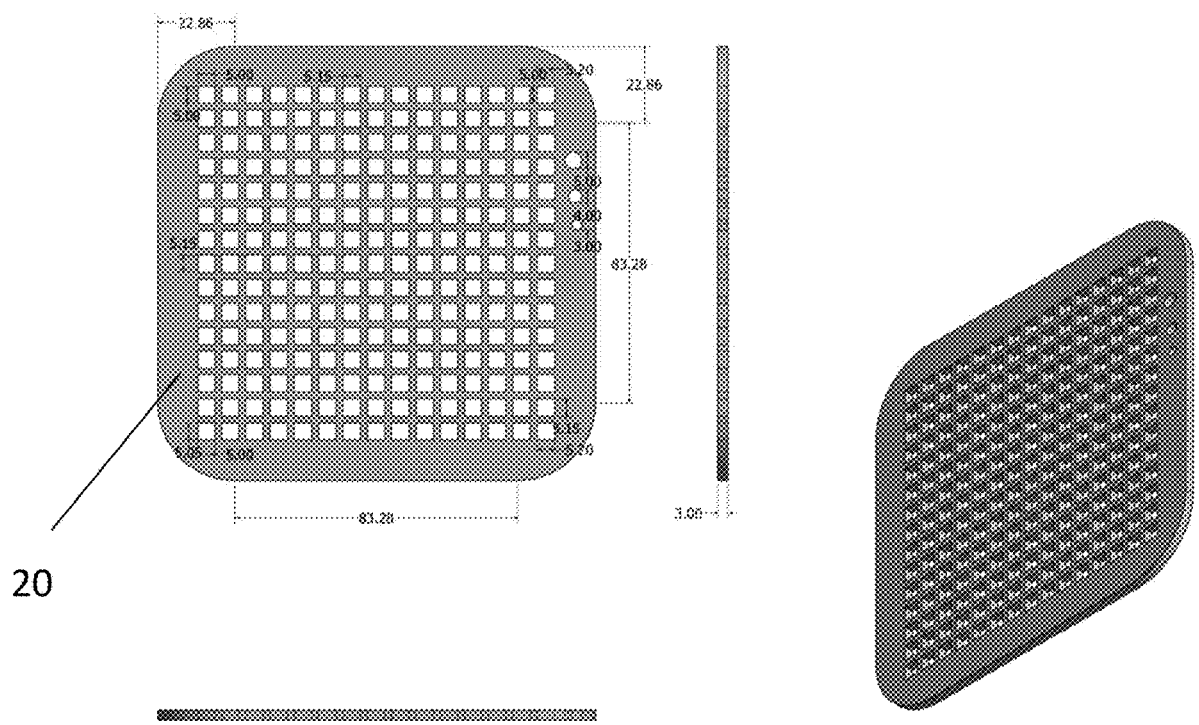
FIG. 35 shows the flat tray as demonstrated in Example 15. All dimensions are in mm.

A flat tray was tested under similar conditions to the raised tray and growth performance compared. The flat tray as shown in FIG. 35 includes 225 apertures which have a side dimension about 5 mm. Some of the apertures are slightly larger to accommodate spacing with external tray dimensions that are identical to the raised tray.

The role of specific tray inventive features is described.

Raised inner section acts to raise the seed pad above the top of the growing bowl so as to avoid overfilling with water. The flat tray had inconsistent growth at times which required some art from the user to stop the water at just the right time. Some runs with the flat tray resulted in drowning the seeds and very poor growth. The user adds water, as from a faucet, until water reaches or overflows the open edge of the partial ellipses. The water level cannot overflow the seed pad and as such a small air gap is retained as set by the height difference between the raised and flat section on the tray.

Open edge apertures (semi-ellipse) act to minimize overfilling the bowl with water by allowing easy draining when setting the seed pads. These holes Also helpful for ease of use to pick up the tray after growing is complete.

Open growth region is created by the apertures underneath the seed pad are more than 50% open to allow more room for healthy root growth and corresponding increase the plant growth rate. Visually, the roots grown underneath the raised tray were larger than those grown using the flat tray.

The overall open surface area not covered with the seed pad during operation is small and less than 5% for this example. Reduced open surface area lowers the amount of water lost by evaporation during the growth process.

Surprisingly, the raised tray had a slightly larger open area during the growth phase (when covered with a seed pad) than the flat tray which would suggest a greater loss of water due to evaporation, but the effective water consumption in terms of grams of water consumed per gram of microgreen fresh weigh (FW) is improved and lower for the raised tray. The design with the larger open area in the growth region facilitates improved root and plant growth which makes for more effective water use.

TABLE X1

Tray comparison for comparison growth data

| Tray Design | Raised | Flat |
| --- | --- | --- |
| Total tray cross sectional area*, mm2 | 16649 | 16649 |
| Total AC in raised section or seed pad region, mm2 | 11874 | 11874 |
| Total AC for seed pad, mm2 | 10323 | 10323 |
| Total open area in tray, mm2 | 8679 | 5664 |
| Total open area in growth region, mm2 | 8403 | 5625 |
| Open area in tray when covered with seed pad, mm2 | 782 | 545 |
| open area in growth area (for roots), % | 70.8% | 47.4% |
| open area total in tray (to reduce material), % | 52.1% | 34.0% |
| surface open when covered with seed pad (for evaporation), % | 4.7% | 3.3% |

*estimated as a square tray, neglecting slightly rounded corners for this example Each experiment was run in a similar manner with the same size bowls and lights (as described in Example 11). Two types of nutrients were evaluated to confirm the observation of improved growth with the inventive tray. GH is the Maxi-Grow growth nutrient mix from General Hydroponics. Lotus Grow Pro is a nutrient from Lotus Nutrients (https://lotusnutrients.com/products/lotus-hydroponic-nutrients-grow-pro-series) and has a slightly different N—P—K ratio (8-4-13 for Lotus and 10-5-14 from General Hydroponics, GH). In addition, the Lotus nutrient is described by the manufacturer as containing a Nickel content from very low to none. The nutrient impact was corroborated by a lack of allergic reaction from a highly Nickel sensitive individual who consumed microgreens grown with the Lotus-based nutrient in the inventive system while the same individual had an allergic reaction to the greens as grown in the same system when used with the GH nutrient.

In these experiments, the nutrient is measured and placed in the bowl before adding water. It is noted that the commercial product may be designed so that the self-contained seed pad includes both seeds and nutrient. Seeds were measured and dispersed on top of the hemp mat (cut into 100-mm×100-mm square from a larger Terrafibre mat) and then covered with the capillary paper (coffee filter). Water is added until it slightly overflows the tray and runs out the sides of the bowl. By this manner, water reaches top of the first section of the tray but cannot reach the second or raised section of the tray. After the water is added, the capillary paper is removed from the seed area and the seeds scraped as needed with the seed scraper. The tall bowl which contains the water, tray, nutrient, and seed pad is then covered with the second short bowl in an inverted manner to create nearly a hermetic seal. It is recognized that some evaporation may occur during the seed germination phase, but it is generally limited to less than 2% of the starting water.

The system is left covered and unperturbed for 2 days (radish) or 3 days (all other seed types). When the top tray is removed, the bowl with a germinated seed pad and tray is then placed underneath lights. For the tests as conducted, the Light consists of a 14 W white LED and both bowls are placed in an equidistant manner under the light to avoid experimental bias. The lights remain on for 16 hours per day and off for 8 hours per day.

Data tables are below for 6 different cultivars (radish, wasabina mustard, cauliflower, red cabbage, broccoli, and mustard). Two types of nutrient were compared (GH and Lotus). Two trays were evaluated as described previously (Flat and Raised). Experiments were replicated within one location and conducted at two separate physical locations as set at roughly the same time to confirm findings. The starting EC measurements were somewhat different between the two locations due to the use of tap water which includes more Calcium and Magnesium in one of the locations. The inventive product is designed to be robust to general tap water mineral content at any user location.

|  | Radish Unit 1 | Radish Unit 2 | Radish Unit 3 | Radish Unit 4 |
|---|---|---|---|---|
| Seed weight, g | 9.9 | 9.9 | 9.9 | 9.9 |
| Nutrient weight, g | 1.46 | 1.37 | 1.46 | 1.37 |
| Tray type (flat or Raised) | Flat | Flat | Raised | Raised |
| Nutrient type | GH | GH | GH | GH |
| Water weight, g | 1271 | 1274 | 1236 | 1287 |
| Start time | Jun. 4, 2020 16:30 | Jun. 4, 2020 16:30 | Jun. 4,2020 16:30 | Jun. 4, 2020 16:30 |
| EC at start | 1636 | 1680 | 1732 | 1839 |
| Uncover time | Jun. 6, 2020 17:00 | Jun. 6, 2020 17:00 | Jun. 6, 2020 17:00 | Jun. 6, 2020 17:00 |
| hrs dark | 48.50 | 48.50 | 48.50 | 48.50 |
| Harvest time | Jun. 11, 2020 16:20 | Jun. 11, 2020 16:20 | Jun. 11, 2020 16:20 | Jun. 10, 2020 16:30 |
| hrs light | 119.3 | 119.3 | 119.3 | 95.5 |
| Harvest FW, g | 125 | 134 | 133 | 130 |
| Water remaining, g | 464 | 417 | 405 | 407 |
| Water consumed, g | 807 | 857 | 831 | 880 |
| gram water per gram FW, WW/FW (g/g) | 6.46 | 6.40 | 6.25 | 6.77 |
| FW/SW | 12.63 | 13.54 | 13.43 | 13.13 |
| seed pad area, m2 | 0.01032256 | 0.01032256 | 0.01032256 | 0.01032256 |
| Seed density, g/m2 | 959.1 | 959.1 | 959.1 | 959.1 |
| Harvest density, FW g/m2 | 12109.4 | 12981.3 | 12884.4 | 12593.8 |
| FW growth rate, g/m2/d | 1731.6 | 1856.3 | 1842.5 | 2099.0 |
| Fresh weight to seed weight growth rate FW/SW/m2/d | 174.9 | 187.5 | 186.1 | 212.0 |
| Growth efficiency 1, FW/m2/d/(WW/FW) | 268.2 | 290.3 | 294.9 | 310.1 |
| Growth efficiency 2, FW/SW/m2/d/(WW/FW) | 27.1 | 29.3 | 29.8 | 31.3 |
| Total days (from set to harvest) | 7.0 | 7.0 | 7.0 | 6.0 |
| EC at harvest | 1910 | 1610 | 2250 | 1550 |
|  | | Radish | | |
| FLAT TRAY: Avg growth rate (g/m2/d) | 1794.0 | g water/g FW | 6.43 | |
| RAISED TRAY: Avg growth rate (g/m2/d) | 1970.7 | g water/g FW | 6.51 | |

The radish microgreens showed the least difference in growth rate between the Flat and Raised tray as well as a statistically insignificant difference in water consumption as defined by grams of water consumed per gram of product fresh weight (FW). The raised tray had about a 10% increase in growth rate.

|  | Wasabina Unit 1 | Wasabina Unit 2 | Wasabina Unit 3 | Wasabina Unit 4 |
|---|---|---|---|---|
| Seed weight, g | 8.4 | 8.4 | 8.4 | 8.4 |
| Nutrient vol, tsp | 0.375 | 0.375 | 0.375 | 0.375 |
| Tray type (flat or Raised) | Raised | Flat | Raised | Flat |
| Nutrient type | Lotus | Lotus | Lotus | Lotus |
| Water weight, g | 1213 | 1202 | 1213 | 1212 |
| Start time | Aug. 15, 2020 8:35 | Aug. 15, 2020 8:45 | Aug. 15, 2020 8:55 | Aug. 15, 2020 9:05 |
| EC at start | 1346 | 1421 | 1434 | 1474 |
| Uncover time | Aug. 18, 2020 9:35 | Aug. 18, 2020 9:35 | Aug. 18, 2020 9:35 | Aug. 18, 2020 9:35 |
| hrs dark | 73.00 | 72.83 | 72.67 | 72.50 |
| Harvest time | Aug. 24, 2020 10:50 | Aug. 24, 2020 11:00 | Aug. 24, 2020 11:05 | Aug. 24, 2020 11:10 |
| hrs light | 145.3 | 145.4 | 145.5 | 145.6 |
| Harvest FW, g | 69 | 33 | 78 | 40 |
| Water remaining, g | 599 | 750 | 583 | 775 |
| Water consumed, g | 614 | 452 | 630 | 437 |
| gram water per gram FW, WW/FW (g/g) | 8.90 | 13.70 | 8.08 | 10.93 |
| FW/SW | 8.21 | 3.93 | 9.29 | 4.76 |
| seed pad area, m2 | 0.01032256 | 0.01032256 | 0.01032256 | 0.01032256 |
| Seed density, g/m2 | 813.8 | 813.8 | 813.8 | 813.8 |
| Harvest density, FW g/m2 | 6684.4 | 3196.9 | 7556.3 | 3875.0 |
| FW growth rate, g/m2/d | 735.1 | 351.5 | 831.2 | 426.4 |
| Fresh weight to seed weight growth rate FW/SW/m2/d | 87.5 | 41.9 | 99.0 | 50.8 |
| Growth efficiency 1, FW/m2/d/(WW/FW) | 82.6 | 25.7 | 102.9 | 39.0 |
| Growth efficiency 2, FW/SW/m2/d/(WW/FW) | 9.8 | 3.1 | 12.3 | 4.6 |
| Total days (from set to harvest) | 9.1 | 9.1 | 9.1 | 9.1 |
| EC at harvest | 1029 | 1351 | 965 | 1346 |
| Wasabina |  |  |  |  |
| FLAT TRAY: Avg growth rate (g/m2/d) | 389.0 | g water/g FW | 12.31 |  |
| RAISED TRAY: Avg growth rate (g/m2/d) | 783.1 | g water/g FW | 8.49 |  |

The raised tray for wasabina microgreens substantially outperformed the flat tray for maximizing growth rate (grams of fresh greens per m² of seed pad per day of growth) by about a factor of 2 and reducing the amount of water consumed in grams of water per grams of fresh weight by 31%.

|  | Cauliflower Unit 1 | Cauliflower Unit 2 | Cauliflower Unit 3 | Cauliflower Unit 4 |
|---|---|---|---|---|
| Seed weight, g | 8.4 | 8.4 | 8.4 | 8.4 |
| Nutrient vol, tsp | 0.375 | 0.375 | 0.375 | 0.375 |
| Tray type (flat or Raised) | Raised | Flat | Raised | Flat |
| Nutrient type | Lotus | Lotus | Lotus | Lotus |
| Water weight, g | 1233 | 1236 | 1230 | 1200 |
| Start time | Aug, 2, 2020 6:45 | Aug. 2, 2020 6:51 | Aug. 2, 2020 7:00 | Aug. 2, 2020 7:10 |
| EC at start | 1346 | 1440 | 1470 | 1525 |
| Uncover time | Aug. 5, 20202 6:55 | Aug. 5, 2020 6:55 | Aug. 5, 2020 6:55 | Aug. 5, 2020 6:55 |
| hrs dark | 72.17 | 72.07 | 71.92 | 71.75 |
| Harvest time | Aug. 11, 2020 6:43 | Aug. 11, 2020 6:50 | Aug. 11, 2020 6:55 | Aug. 11, 2020 7:00 |
| hrs light | 143.8 | 143.9 | 144.0 | 144.1 |
| Harvest FW, g | 63 | 2 | 64 | 8 |
| Water remaining, g | 615 | 985 | 647 | 923 |
| Water consumed, g | 618 | 251 | 583 | 277 |
| gram water per gram FW, WW/FW (g/g) | 9.81 | 125.50 | 9.11 | 34.63 |
| FW/SW | 7.50 | 0.24 | 7.62 | 0.95 |
| seed pad area, m2 | 0.01032256 | 0.01032256 | 0.01032256 | 0.01032256 |
| Seed density, g/m2 | 813.8 | 813.8 | 813.8 | 813.8 |
| Harvest density, FW g/m2 | 6103.1 | 193.8 | 6200.0 | 775.0 |
| FW growth rate, g/m2/d | 678.2 | 21.5 | 689.2 | 86.2 |
| Fresh weight to seed weight growth rate FW/SW/m2/d | 80.7 | 2.6 | 82.0 | 10.3 |

-continued

|  | Cauliflower Unit 1 | Cauliflower Unit 2 | Cauliflower Unit 3 | Cauliflower Unit 4 |
|---|---|---|---|---|
| Growth efficiency 1, FW/m2/d/(WW/FW) | 69.1 | 0.2 | 75.7 | 2.5 |
| Growth efficiency 2, FW/SW/m2/d/(WW/FW) | 8.2 | 0.0 | 9.0 | 0.3 |
| Total days (from set to harvest) | 9.0 | 9.0 | 9.0 | 9.0 |
| EC at harvest | 1082 | 1623 | 1125 | 1572 |
| Cauliflower | | | | |
| FLAT TRAY: Avg growth rate (g/m2/d) | 53.9 | g water/g FW | 80.06 | |
| RAISED TRAY: Avg growth rate (g/m2/d) | 683.7 | g water/g FW | 9.46 | |

For this experiment, the flat trays grew poorly and in general were more prone to inconsistent growth due to variability in the starting water level.

|  | Red Cabbage Unit 1 | Red Cabbage Unit 2 | Red Cabbage Unit 3 | Red Cabbage Unit 4 |
|---|---|---|---|---|
| Seed weight, g | 8.4 | 8.4 | 8.4 | 8.4 |
| Nutrient vol, tsp | 0.375 | 0.375 | 0.375 | 0.375 |
| Tray type (flat or Raised) | Raised | Flat | Raised | Flat |
| Nutrient type | Lotus | Lotus | Lotus | Lotus |
| Water weight, g | 1237 | 1277 | 1235 | 1237 |
| Start time | Jul. 21, 2020 6:17 | Jul. 21, 2020 6:25 | Jul. 21, 2020 6:38 | Jul. 21, 2020 6:49 |
| EC at start | 1555 | 1525 | 1706 | 1640 |
| Uncover time | Jul. 24, 2020 8:45 | Jul. 24, 2020 8:45 | Jul. 24, 2020 8:45 | Jul. 24, 2020 8:45 |
| hrs dark | 74.47 | 74.33 | 74.12 | 73.93 |
| Harvest time | Aug. 1, 2020 5:48 | Aug. 1, 2020 5:58 | Aug. 1, 2020 6:05 | Aug. 1, 2020 6:10 |
| hrs light | 189.0 | 189.2 | 189.3 | 189.4 |
| Harvest FW, g | 83 | 35 | 88 | 32 |
| Water remaining, g | 320 | 678 | 383 | 723 |
| Water consumed, g | 917 | 599 | 852 | 514 |
| gram water per gram FW, WW/FW (g/g) | 11.05 | 17.11 | 9.68 | 16.06 |
| FW/SW | 9.88 | 4.17 | 10.48 | 3.81 |
| seed pad area, m2 | 0.01032256 | 0.01032256 | 0.01032256 | 0.01032256 |
| Seed density, g/m2 | 813.8 | 813.8 | 813.8 | 813.8 |
| Harvest density, FW g/m2 | 8040.6 | 3390.6 | 8525.0 | 3100.0 |
| FW growth rate, g/m2/d | 732.3 | 308.8 | 776.6 | 282.5 |
| Fresh weight to seed weight growth rate FW/SW/m2/d | 87.2 | 36.8 | 92.5 | 33.6 |
| Growth efficiency 1, FW/m2/d/(WW/FW) | 66.3 | 18.0 | 80.2 | 17.6 |
| Growth efficiency 2, FW/SW/m2/d/(WW/FW) | 7.9 | 2.1 | 9.5 | 2.1 |
| Total days (from set to harvest) | 11.0 | 11.0 | 11.0 | 11.0 |
| EC at harvest | 955 | 1640 | 1019 | 1680 |
| Red Cabbage | | | | |
| FLAT TRAY: Avg growth rate (g/m2/d) | 295.6 | g water/g FW | 16.59 | |
| RAISED TRAY: Avg growth rate (g/m2/d) | 754.5 | g water/g FW | 10.37 | |

The raised tray produced more than double the growth rate using the Lotus nutrient for red cabbage.

|  | Broccoli Unit 1 | Broccoli Unit 2 | Broccoli Unit 3 | Broccoli Unit 4 |
|---|---|---|---|---|
| Seed weight, g | 8.4 | 8.4 | 8.4 | 8.4 |
| Nutrient weight, g | 1.4 | 1.4 | 1.4 | 1.4 |
| Tray type | Flat | Flat | Raised | Raised |

|  | Broccoli Unit 1 | Broccoli Unit 2 | Broccoli Unit 3 | Broccoli Unit 4 |
|---|---|---|---|---|
| Nutrient type | GH | GH | GH | GH |
| Water weight, g | 1272 | 1279 | 1255 | 1252 |
| Start time | Jun. 12, 2020 12:30 | Jun. 12, 2020 12:30 | Jun. 12, 2020 12:30 | Jun. 12, 2020 12:30 |
| EC at start |  |  |  |  |
| Uncover time | Jun. 15, 2020 12:30 | Jun. 15, 2020 12:30 | Jun. 15, 2020 12:30 | Jun. 15, 2020 12:30 |
| hrs dark | 72.00 | 72.00 | 72.00 | 72.00 |
| Harvest time | Jun. 21, 2020 12:30 | Jun. 21, 2020 12:30 | Jun. 21, 2020 12:30 | Jun. 21, 2020 12:30 |
| hrs light | 144.0 | 144.0 | 144.0 | 144.0 |
| Harvest FW, g | 76 | 35 | 89 | 82 |
| Water remaining, g | 209 | 592 | 122 | 232 |
| Water consumed, g | 1063 | 687 | 1133 | 1020 |
| gram water per gram FW, WW/FW (g/g) | 13.99 | 19.63 | 12.73 | 12.44 |
| FW/SW | 9.05 | 4.17 | 10.60 | 9.76 |
| area, m2 | 0.01032256 | 0.01032256 | 0.01032256 | 0.01032256 |
| Seed density, g/m2 | 813.8 | 813.8 | 813.8 | 813.8 |
| Harvest density, FW g/m2 | 7362.5 | 3390.6 | 8621.9 | 7943.8 |
| FW growth rate, g/m2/d | 818.1 | 376.7 | 958.0 | 882.6 |
| Fresh weight to seed weight growth rate FW/SW/m2/d | 97.4 | 44.8 | 114.0 | 105.1 |
| Growth efficiency 1, FW/m2/d/(WW/FW) | 58.5 | 19.2 | 75.3 | 71.0 |
| Growth efficiency 2, FW/SW/m2/d/(WW/FW) | 7.0 | 2.3 | 9.0 | 8.4 |
| Total days (from set to harvest) | 9.0 | 9.0 | 9.0 | 9.0 |
| EC at harvest | 1490 | 2200 | 1690 | 1855 |
|  | Broccoli |  |  |  |
| FLAT TRAY: Avg growth rate (g/m2/d) | 597.4 | g water/g FW | 16.81 |  |
| RAISED TRAY: Avg growth rate (g/m2/d) | 920.3 | g water/g FW | 12.58 |  |

The raised tray produced more than 50% higher growth rate than the flat tray for broccoli with the GH nutrient.

|  | Mustard Unit 1 | Mustard Unit 2 | Mustard Unit 3 | Mustard Unit 4 |
|---|---|---|---|---|
| Seed weight, g | 8.4 | 8.4 | 8.4 | 8.4 |
| Nutrient weight, g | 1.3 | 1.3 | 1.3 | 1.3 |
| Tray type | Flat | Flat | Raised | Raised |
| Nutrient type | GH | GH | GH | GH |
| Water weight, g | 1249 | 1264 | 1259 | 1269 |
| Start time | Jun. 25, 2020 10:30 | Jun. 25, 2020 10:30 | Jun. 25, 2020 10:30 | Jun. 25, 2020 10:30 |
| EC at start |  |  |  |  |
| Uncover time | Jun. 28, 2020 9:30 | Jun. 28, 2020 9:30 | Jun. 28, 2020 9:30 | Jun. 28, 2020 9:30 |
| hrs dark | 71.00 | 71.00 | 71.00 | 71.00 |
| Harvest time | Jul. 4, 2020 17:20 | Jul. 4, 2020 17:20 | Jul. 4, 2020 17:20 | Jul. 4, 2020 17:20 |
| hrs light | 151.8 | 151.8 | 151.8 | 151.8 |
| Harvest FW, g | 54 | 54 | 66 | 58 |
| Water remaining, g | 534 | 568 | 458 | 503 |
| Water consumed, g | 715 | 696 | 801 | 766 |
| gram water per gram FW, WW/FW (g/g) | 13.24 | 12.89 | 12.14 | 13.21 |
| FW/SW | 6.43 | 6.43 | 7.86 | 6.90 |
| area, m2 | 0.01032256 | 0.01032256 | 0.01032256 | 0.01032256 |
| Seed density, g/m2 | 813.8 | 813.8 | 813.8 | 813.8 |
| Harvest density, FW g/m2 | 5231.3 | 5231.3 | 6393.8 | 5618.8 |
| FW growth rate, g/m2/d | 563.4 | 563.4 | 688.6 | 605.2 |
| Fresh weight to seed weight growth rate FW/SW/m2/d | 67.1 | 67.1 | 82.0 | 72.0 |
| Growth efficiency 1, FW/m2/d/(WW/FW) | 42.6 | 43.7 | 56.7 | 45.8 |
| Growth efficiency 2, FW/SW/m2/d/(WW/FW) | 5.1 | 5.2 | 6.8 | 5.5 |

-continued

|  | Mustard Unit 1 | Mustard Unit 2 | Mustard Unit 3 | Mustard Unit 4 |
|---|---|---|---|---|
| Total days (from set to harvest) | 9.3 | 9.3 | 9.3 | 9.3 |
| EC at harvest | 1630 | 1590 | 1470 | 1650 |
| Mustard | | | | |
| FLAT TRAY: Avg growth rate (g/m2/d) | 563.4 | g water/g FW | 13.06 | |
| RAISED TRAY: Avg growth rate (g/m2/d) | 646.9 | g water/g FW | 12.67 | |

The raised tray increased the growth rate by about 15% over the flat tray.

|  | Red Cabbage Unit 1 | Red Cabbage Unit 2 | Red Cabbage Unit 3 | Red Cabbage Unit 4 |
|---|---|---|---|---|
| Seed weight, g | 8.4 | 8.4 | 8.4 | 8.4 |
| Nutrient weight, g | 1.4 | 1.4 | 1.4 | 1.4 |
| Tray type | Flat | Flat | Raised | Raised |
| Nutrient type | GH | GH | GH | GH |
| Water weight, g | 1259 | 1283 | 1269 | 1273 |
| Start time | Jun. 25, 2020 11:05 | Jun. 25, 2020 11:05 | Jun. 25, 2020 11:05 | Jun. 25, 2020 11:05 |
| EC at start | | | | |
| Uncover time | Jun. 28, 2020 9:30 | Jun. 28, 2020 9:30 | Jun. 28, 2020 9:30 | Jun. 28, 2020 9:30 |
| hrs dark | 70.42 | 70.42 | 70.42 | 70.42 |
| Harvest time | Jul. 4, 2020 17:10 | Jul. 4, 2020 17:10 | Jul. 4, 2020 17:10 | Jul. 4, 2020 17:10 |
| hrs light | 151.7 | 151.7 | 151.7 | 151.7 |
| Harvest FW, g | 52 | 56 | 95 | 95 |
| Water remaining, g | 660 | 656 | 436 | 476 |
| Water consumed, g | 599 | 627 | 833 | 797 |
| gram water per gram FW, WW/FW (g/g) | 11.52 | 11.20 | 8.77 | 8.39 |
| FW/SW | 6.19 | 6.67 | 11.31 | 11.31 |
| area, m2 | 0.01032256 | 0.01032256 | 0.01032256 | 0.01032256 |
| Seed density, g/m2 | 813.8 | 813.8 | 813.8 | 813.8 |
| Harvest density, FW g/m2 | 5037.5 | 5425.0 | 9203.1 | 9203.1 |
| FW growth rate, g/m2/d | 544.4 | 586.3 | 994.6 | 994.6 |
| Fresh weight to seed weight growth rate FW/SW/m2/d | 64.8 | 69.8 | 118.4 | 118.4 |
| Growth efficiency 1, FW/m2/d/(WW/FW) | 47.3 | 52.4 | 113.4 | 118.5 |
| Growth efficiency 2, FW/SW/m2/d/(WW/FW) | 5.6 | 6.2 | 13.5 | 14.1 |
| Total days (from set to harvest) | 9.3 | 9.3 | 9.3 | 9.3 |
| EC at harvest | 1730 | 1540 | 1310 | 1340 |
| Red Cabbage | | | | |
| FLAT TRAY: Avg growth rate (g/m2/d) | 565.3 | g water/g FW | 11.36 | |
| RAISED TRAY: Avg growth rate (g/m2/d) | 994.6 | g water/g FW | 8.58 | |

The raised tray increased the growth rate by about 75% over the flat tray with about 24% less water consumed per gram of fresh weight greens harvested.

|  | Red Cabbage Unit 1 | Red Cabbage Unit 2 | Red Cabbage Unit 3 | Red Cabbage Unit 4 |
|---|---|---|---|---|
| Seed weight, g | 8.4 | 8.4 | 8.4 | 8.4 |
| Nutrient weight, g | 1.4 | 1.4 | 1.4 | 1.4 |
| Tray type | Flat | Flat | Raised | Raised |
| Nutrient type | GH | GH | GH | GH |
| Water weight, g | 1275 | 1280 | 1250 | 1257 |

|                                              | Red Cabbage Unit 1 | Red Cabbage Unit 2 | Red Cabbage Unit 3 | Red Cabbage Unit 4 |
|---|---|---|---|---|
| Start time                                   | Jul. 6, 2020 16:45 | Jul. 6, 2020 16:45 | Jul. 6, 2020 16:45 | Jul. 6, 2020 16:45 |
| EC at start                                  |                    |                    |                    |                    |
| Uncover time                                 | Jul. 9, 2020 17:40 | Jul. 9, 2020 17:40 | Jul. 9, 2020 17:40 | Jul. 9, 2020 17:40 |
| hrs dark                                     | 72.92              | 72.92              | 72.92              | 72.92              |
| Harvest time                                 | Jul. 15, 2020 20:00| Jul. 15, 2020 20:00| Jul. 15, 2020 20:00| Jul. 15, 2020 20:00|
| hrs light                                    | 146.3              | 146.3              | 146.3              | 146.3              |
| Harvest FW, g                                | 50                 | 62                 | 92                 | 88                 |
| Water remaining, g                           | 666                | 576                | 451                | 464                |
| Water consumed, g                            | 609                | 704                | 799                | 793                |
| gram water per gram FW, WW/FW (g/g)          | 12.18              | 11.35              | 8.68               | 9.01               |
| FW/SW                                        | 5.95               | 7.38               | 10.95              | 10.48              |
| area, m2                                     | 0.01032256         | 0.01032256         | 0.01032256         | 0.01032256         |
| Seed density, g/m2                           | 813.8              | 813.8              | 813.8              | 813.8              |
| Harvest density, FW g/m2                     | 4843.8             | 6006.3             | 8912.5             | 8525.0             |
| FW growth rate, g/m2/d                       | 530.2              | 657.5              | 975.6              | 933.2              |
| Fresh weight to seed weight growth rate FW/SW/m2/d | 63.1         | 78.3               | 116.1              | 111.1              |
| Growth efficiency 1, FW/m2/d/(WW/FW)         | 43.5               | 57.9               | 112.3              | 103.6              |
| Growth efficiency 2, FW/SW/m2/d/(WW/FW)      | 5.2                | 6.9                | 13.4               | 12.3               |
| Total days (from set to harvest)             | 9.1                | 9.1                | 9.1                | 9.1                |
| EC at harvest                                | 1780               | 1570               | 1340               | 1170               |
| Red Cabbage                                  |                    |                    |                    |                    |
| FLAT TRAY: Avg growth rate (g/m2/d)          | 593.8              | g water/g FW       | 11.77              |                    |
| RAISED TRAY: Avg growth rate (g/m2/d)        | 954.4              | g water/g FW       | 8.85               |                    |

The raised tray again outperformed the flat tray in a full replicate of the red cabbage run with about a 60% increase in the growth rate and 25% decrease in the amount of water required per gram of fresh greens harvested.

|                                              | Cauliflower Unit 1 | Cauliflower Unit 2 | Cauliflower Unit 3 | Cauliflower Unit 4 |
|---|---|---|---|---|
| Seed weight, g                               | 8.4                | 8.4                | 8.4                | 8.4                |
| Nutrient weight, g                           | 1.4                | 1.4                | 1.4                | 1.4                |
| Tray type                                    | Flat               | Flat               | Raised             | Raised             |
| Nutrient type                                | GH                 | GH                 | GH                 | GH                 |
| Water weight, g                              | 1268               | 1273               | 1265               | 1265               |
| Start time                                   | Aug. 2, 2020 12:40 | Aug. 2, 2020 12:40 | Aug. 2, 2020 12:40 | Aug. 2, 2020 12:40 |
| EC at start                                  |                    |                    |                    |                    |
| Uncover time                                 | Aug. 5, 2020 14:00 | Aug. 5, 2020 14:00 | Aug. 5, 2020 14:00 | Aug. 5, 2020 14:00 |
| hrs dark                                     | 73.33              | 73.33              | 73.33              | 73.33              |
| Harvest time                                 | Aug. 11, 2020 17:30| Aug. 11, 2020 17:30| Aug. 11, 2020 17:30| Aug. 11, 2020 17:30|
| hrs light                                    | 147.5              | 147.5              | 147.5              | 147.5              |
| Harvest FW, g                                | 67                 | 40                 | 81                 | 89                 |
| Water remaining, g                           | 586                | 787                | 511                | 486                |
| Water consumed, g                            | 682                | 486                | 754                | 779                |
| gram water per gram FW, WW/FW (g/g)          | 10.18              | 12.15              | 9.31               | 8.75               |
| FW/SW                                        | 7.98               | 4.76               | 9.64               | 10.60              |
| area, m2                                     | 0.01032256         | 0.01032256         | 0.01032256         | 0.01032256         |
| Seed density, g/m2                           | 813.8              | 813.8              | 813.8              | 813.8              |
| Harvest density, FW g/m2                     | 6490.6             | 3875.0             | 7846.9             | 8621.9             |
| FW growth rate, g/m2/d                       | 705.4              | 421.1              | 852.8              | 937.0              |
| Fresh weight to seed weight growth rate FW/SW/m2/d | 84.0         | 50.1               | 101.5              | 111.6              |
| Growth efficiency 1, FW/m2/d/(WW/FW)         | 69.3               | 34.7               | 91.6               | 107.1              |
| Growth efficiency 2, FW/SW/m2/d/(WW/FW)      | 8.2                | 4.1                | 10.9               | 12.7               |

|                                         | Cauliflower Unit 1 | Cauliflower Unit 2 | Cauliflower Unit 3 | Cauliflower Unit 4 |
|---|---|---|---|---|
| Total days (from set to harvest) | 9.2 | 9.2 | 9.2 | 9.2 |
| EC at harvest | 1895 | 1720 | 1850 | 1760 |
| Cauliflower | | | | |
| FLAT TRAY: Avg growth rate (g/m2/d) | 563.3 | g water/g FW | 11.16 | |
| RAISED TRAY: Avg growth rate (g/m2/d) | 894.9 | g water/g FW | 9.03 | |

For cauliflower and the GH nutrient, the raised tray increased the growth rate by 59% and decreased the water consumption per gram of fresh weight by 19%.

|                                         | Wasabina Unit 1 | Wasabina Unit 2 | Wasabina Unit 3 | Wasabina Unit 4 |
|---|---|---|---|---|
| Seed weight, g | 8.4 | 8.4 | 8.4 | 8.4 |
| Nutrient weight, g | 1.4 | 1.4 | 1.4 | 1.4 |
| Tray type | Flat | Flat | Raised | Raised |
| Nutrient type | GH | GH | GH | GH |
| Water weight, g | 1226 | 1241 | 1249 | 1218 |
| Start time | Aug. 15, 2020 16:30 | Aug. 15, 2020 16:30 | Aug. 15, 2020 16:30 | Aug. 15, 2020 16:30 |
| EC at start | | | | |
| Uncover time | Aug. 18, 2020 16:30 | Aug. 18, 2020 16:30 | Aug. 18, 2020 16:30 | Aug. 18, 2020 16:30 |
| hrs dark | 72.00 | 72.00 | 72.00 | 72.00 |
| Harvest time | Aug. 24, 2020 16:50 | Aug. 24, 2020 16:50 | Aug. 24, 2020 16:50 | Aug. 24, 2020 16:50 |
| hrs light | 144.3 | 144.3 | 144.3 | 144.3 |
| Harvest FW, g | 94 | 82 | 119 | 101 |
| Water remaining, g | 524 | 617 | 504 | 481 |
| Water consumed, g | 702 | 624 | 745 | 737 |
| gram water per gram FW, WW/FW (g/g) | 7.47 | 7.61 | 6.26 | 7.30 |
| FW/SW | 11.19 | 9.76 | 14.17 | 12.02 |
| area, m2 | 0.01032256 | 0.01032256 | 0.01032256 | 0.01032256 |
| Seed density, g/m2 | 813.8 | 813.8 | 813.8 | 813.8 |
| Harvest density, FW g/m2 | 9106.3 | 7943.8 | 11528.1 | 9784.4 |
| FW growth rate, g/m2/d | 1010.2 | 881.3 | 1278.9 | 1085.5 |
| Fresh weight to seed weight growth rate FW/SW/m2/d | 120.3 | 104.9 | 152.3 | 129.2 |
| Growth efficiency 1, FW/m2/d/(WW/FW) | 135.3 | 115.8 | 204.3 | 148.8 |
| Growth efficiency 2, FW/SW/m2/d/(WW/FW) | 16.1 | 13.8 | 24.3 | 17.7 |
| Total days (from set to harvest) | 9.0 | 9.0 | 9.0 | 9.0 |
| EC at harvest | 1420 | 1500 | 1335 | 1440 |
| Wasabina | | | | |
| FLAT TRAY: Avg growth rate (g/m2/d) | 945.8 | g water/g FW | 7.54 | |
| RAISED TRAY: Avg growth rate (g/m2/d) | 1182.2 | g water/g FW | 6.78 | |

For wasabina with the GH nutrient, the raised tray increased the growth rate by 25% and decreased the water consumption per gram of fresh weight harvested by 10%.

The comparison run for wasabina greens using the Lotus nutrient reveal that the system grown with this second nutrient is slightly less productive than the GH nutrient and that the raised tray continues to outperform the flat tray when grown under similar conditions.

It is theorized that the improvement in growth from the raised tray results from the increase in open area underneath the seed pad, where the raised tray has about 71% open area and the flat tray has about 47% open area. The larger open area provides more room for roots to grow through the hemp seed mat and into the nutrient solution contained in the bowl and underneath the tray. The roots continue to grow into the bowl throughout the growth cycle. Less constrained roots make it easier to bring water and nutrients to the greens growing on top of the seed mat thereby increasing the growth rate in grams FW per $m^2$ per day. Water is more efficiently used for growing plants when the roots are less constrained.

What is claimed:
1. A grow kit, comprising:
a seed mat having a top surface and comprising a fibrous mat comprising a nutrient, a cover, and seeds disposed between the cover and the fibrous mat, wherein a paper wrap is disposed around the fibrous mat, wherein the fibrous mat has a bottom and sides, and wherein the paper wrap comprises two opposing sides that are folded over the top surface down to enclose the edges of the seed mat, and the paper wrap is configured to be openable to be disposed around the sides and bottom of the fibrous mat and be operable to unfold to create a corral for the seed mat to temporarily retain water above the seed mat when water is poured onto the seed mat; a bowl; and a mesh tray configured to be seated onto a top portion of the bowl and to hold the seed mat.

2. The grow kit of claim 1 further comprising tray bales.

3. The grow kit of claim 1 wherein the corral further incorporates a temporary or removable frame or frames that fully or partially encircle the seed mat to assist the corral to guide water through the seed mat during a seed setting process.

4. The grow kit of claim 1 further comprising a humidity cover.

5. The grow kit of claim 4 wherein the humidity cover is configured to be placed over the bowl.

6. The grow kit of claim 5 wherein the humidity cover comprises a piece of cloth coated with a hydrophobic material.

7. The grow kit of claim 1 wherein the nutrient is disposed on the seed mat but does not cover the seeds.

8. The grow kit of claim 1 further comprising a seed scraper having an L-shape with one shorter, larger diameter leg and a longer, smaller diameter leg.

9. The grow kit of claim 8 where the shorter leg is in the shape of a triangular prism.

10. The grow kit of claim 1 further comprising a seed spreader.

11. The grow kit of claim 1 further comprising a seed spreading frame.

12. The grow kit of claim 1 wherein all parts of the seed mat are compostable.

13. The grow kit of claim 1 wherein there is no glue or adhesive on the seed mat.

14. The grow kit of claim 1 wherein a removable tape seals the paper wrap to itself.

15. The grow kit of claim 1 wherein the seed mat is vacuum sealed.

16. A grow kit, comprising:

a seed mat having a top surface and comprising a fibrous mat comprising a nutrient, a cover, and seeds disposed between the cover and the fibrous mat, wherein a paper wrap is disposed around the fibrous mat, wherein the fibrous mat has a bottom and sides, and wherein the paper wrap comprises two opposing sides that are folded over the top surface down to enclose the edges of the seed mat, and the paper wrap is configured to be openable to be disposed around the sides and bottom of the fibrous mat and be operable to unfold to create a corral for the seed mat to temporarily retain water above the seed mat when water is poured onto the seed mat; a bowl; and a mesh tray configured to be seated onto a top portion of the bowl and to hold the seed mat; and wherein the nutrient is a granular nutrient that is on one side of the fibrous mat and adjacent the seeds.

* * * * *